US012690043B2

(12) United States Patent
Ouchi et al.

(10) Patent No.:  US 12,690,043 B2
(45) Date of Patent:       Jul. 21, 2026

(54) TERMINAL APPARATUS, BASE STATION APPARATUS, AND COMMUNICATION METHOD

(71) Applicant: SHARP KABUSHIKI KAISHA, Sakai City (JP)

(72) Inventors: Wataru Ouchi, Sakai City (JP); Toshizo Nogami, Sakai City (JP); Taewoo Lee, Sakai City (JP); Tomoki Yoshimura, Sakai City (JP); Shoichi Suzuki, Sakai City (JP); Huifa Lin, Sakai City (JP); Daiichiro Nakashima, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 395 days.

(21) Appl. No.: 17/798,297

(22) PCT Filed: Feb. 10, 2021

(86) PCT No.: PCT/JP2021/005008
§ 371 (c)(1),
(2) Date: Aug. 8, 2022

(87) PCT Pub. No.: WO2021/162045
PCT Pub. Date: Aug. 19, 2021

(65) Prior Publication Data
US 2023/0068855 A1      Mar. 2, 2023

(30) Foreign Application Priority Data

Feb. 13, 2020    (JP) ................................. 2020-022478

(51) Int. Cl.
*H04W 72/23*          (2023.01)
(52) U.S. Cl.
CPC .................................. *H04W 72/23* (2023.01)

(58) Field of Classification Search
CPC . H04W 72/23; H04W 74/08; H04W 72/0453; H04W 72/0446; H04W 74/0833; H04W 76/28; H04L 5/0092; H04L 5/0055
See application file for complete search history.

(56) References Cited

U.S. PATENT DOCUMENTS

2019/0342135 A1* 11/2019 Kwak ............... H04W 72/0446
2020/0045569 A1*  2/2020 Seo ........................ H04W 72/23
(Continued)

FOREIGN PATENT DOCUMENTS

CN            113439480 A  *  9/2021  ............. H04W 72/23
WO     WO-2017217509 A1 * 12/2017  ............... H01B 1/00

OTHER PUBLICATIONS

Motorola Mobility, Lenovo, Feature lead summary #2 1, 3, 5, 7 for NR-U DL Signals and Channels[online], 3GPP TSG RAN WG1 #99 R1-1913416, Nov. 25, 2019, Internet<URL:https://www.3gpp.org/ftp/tsg_ran/WG1_ (Year: 2019).*

(Continued)

*Primary Examiner* — Ayaz R Sheikh
*Assistant Examiner* — Louis Samara
(74) *Attorney, Agent, or Firm* — ScienBiziP, P.C.

(57)          ABSTRACT

A terminal apparatus including a higher layer configured to configure a configuration related to a search space set and a configuration related to a PDCCH, and a receiver configured to monitor the PDCCH based on the search space set. In a case that one or multiple group indexes are allocated to the search space set and that neither monitoring of the PDCCH corresponding to the search space set with a group index of 0 among the one or multiple group indexes nor monitoring of the PDCCH corresponding to the search space set with a group index of 1 among the one or multiple group indexes is performed, the receiver initiates monitoring of the (Continued)

PDCCH corresponding to the search space set with a group index of 0 among the one or multiple group indexes.

3 Claims, 16 Drawing Sheets

(56) References Cited

U.S. PATENT DOCUMENTS

| | | | | |
|---|---|---|---|---|
| 2020/0196383 A1* | 6/2020 | Tsai | ........................ | H04W 76/11 |
| 2021/0298029 A1* | 9/2021 | Liu | .................... | H04W 72/0453 |
| 2021/0320821 A1* | 10/2021 | Lee | ..................... | H04L 25/0204 |
| 2022/0061031 A1* | 2/2022 | Park | .................. | H04W 74/0808 |
| 2022/0132563 A1* | 4/2022 | Kim | ....................... | H04W 74/08 |
| 2022/0150946 A1* | 5/2022 | Tsai | ....................... | H04W 76/28 |
| 2023/0354351 A1* | 11/2023 | Dahlman | .............. | H04L 5/0092 |

OTHER PUBLICATIONS

Samsung, Introduction of shared spectrum channel 2, 4, 6, 8 access[online], 3GPP TSG RAN WG1 #99 R1-1913632, Dec. 6, 2019, Internet<URL:https://www.3gpp.org/ftp/tsg_ran/WG1_ (Year: 2019).*
NTT DOCOMO, "New SID Proposal: Study on New Radio Access Technology", RP-160671, 3GPP TSG RAN Meeting #71, Göteborg, Sweden, Mar. 7-10, 2016.
"3GPP TR 38.889 V0.0.2 (May 2018), 3rd Generation Partnership Project; Technical Specification Group Radio Access Network; Study on NR-based access to unlicensed spectrum; (Release 15)"
Samsung, "Summary on CA aspects", R1-1807617, 3GPP TSG RAN WG1#93, Busan, Korea, May 21-25, 2018.
Motorola Mobility et al., "Feature lead summary #2 for NR-U DL Singnals and channels", R1-1913416, 3GPP TSG RAN WG1 #99, Reno, United States, Nov. 18-22, 2019.
Samsung, "Introduction of Shared spectrum channel access", R1-1913632, 3GPP TSG-RAN WG1 Meeting #99, Reno, USA, Nov. 18-22, 2019.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

| PUCCH format | Length in OFDM symbols $N^{PUCCH}_{symb}$ |
|:---:|:---:|
| 0 | 1 - 2 |
| 1 | 4 - 14 |
| 2 | 1 - 2 |
| 3 | 4 - 14 |
| 4 | 4 - 14 |

FIG. 4

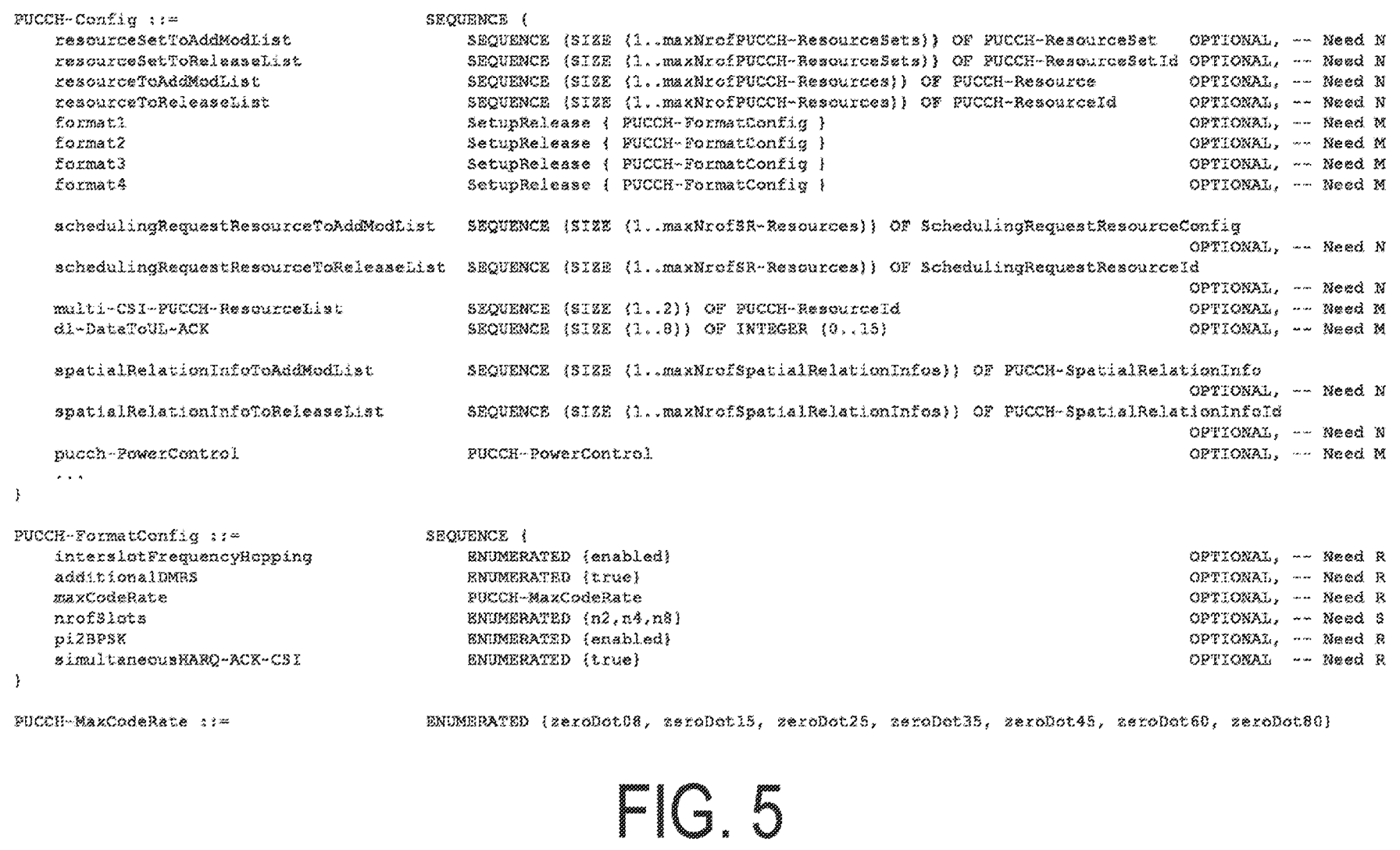

```
PUCCH-Config ::=
    SEQUENCE (
        resourceSetToAddModList         SEQUENCE (SIZE {1..maxNrofPUCCH-ResourceSets)) OF PUCCH-ResourceSet         OPTIONAL,     -- Need N
        resourceSetToReleaseList        SEQUENCE (SIZE {1..maxNrofPUCCH-ResourceSets)) OF PUCCH-ResourceSetId        OPTIONAL,     -- Need N
        resourceToAddModList            SEQUENCE (SIZE {1..maxNrofPUCCH-Resources)) OF PUCCH-Resource                OPTIONAL,     -- Need N
        resourceToReleaseList           SEQUENCE (SIZE {1..maxNrofPUCCH-Resources)) OF PUCCH-ResourceId              OPTIONAL,     -- Need N
        format1                         SetupRelease { PUCCH-FormatConfig }                                          OPTIONAL,     -- Need M
        format2                         SetupRelease { PUCCH-FormatConfig }                                          OPTIONAL,     -- Need M
        format3                         SetupRelease { PUCCH-FormatConfig }                                          OPTIONAL,     -- Need M
        format4                         SetupRelease { PUCCH-FormatConfig }                                          OPTIONAL,     -- Need M schedulingRequestResourceToAddModList    SEQUENCE (SIZE {1..maxNrofSR-Resources)) OF SchedulingRequestResourceConfig
                                                                                                                     OPTIONAL,     -- Need N
        schedulingRequestResourceToReleaseList   SEQUENCE (SIZE {1..maxNrofSR-Resources)) OF SchedulingRequestResourceId multi-CSI-PUCCH-ResourceList    SEQUENCE (SIZE {1..2)) OF PUCCH-ResourceId                                   OPTIONAL,     -- Need N
        dl-DataToUL-ACK                 SEQUENCE (SIZE {1..8)) OF INTEGER (0..15)                                    OPTIONAL,     -- Need M spatialRelationInfoToAddModList          SEQUENCE (SIZE {1..maxNrofSpatialRelationInfos)) OF PUCCH-SpatialRelationInfo     OPTIONAL,     -- Need M
        spatialRelationInfoToReleaseList         SEQUENCE (SIZE {1..maxNrofSpatialRelationInfos)) OF PUCCH-SpatialRelationInfoId
                                                                                                                     OPTIONAL,     -- Need N
        pucch-PowerControl              PUCCH-PowerControl                                                           OPTIONAL,     -- Need M
        ...
    }

PUCCH-FormatConfig ::=
    SEQUENCE {
        interslotFrequencyHopping       ENUMERATED {enabled}                                                        OPTIONAL,     -- Need R
        additionalDMRS                  ENUMERATED {true}                                                           OPTIONAL,     -- Need R
        maxCodeRate                     PUCCH-MaxCodeRate                                                           OPTIONAL,     -- Need R
        nrofSlots                       ENUMERATED {n2,n4,n8}                                                       OPTIONAL,     -- Need S
        pi2BPSK                         ENUMERATED {enabled}                                                        OPTIONAL,     -- Need R
        simultaneousHARQ-ACK-CSI        ENUMERATED {true}                                                          OPTIONAL,     -- Need R
    }

PUCCH-MaxCodeRate ::=    ENUMERATED {zeroDot08, zeroDot15, zeroDot25, zeroDot35, zeroDot45, zeroDot60, zeroDot80}
```

FIG. 5

```
-- A set with one or more PUCCH resources
PUCCH-ResourceSet ::=          SEQUENCE {
    pucch-ResourceSetId            PUCCH-ResourceSetId,
    resourceList                   SEQUENCE (SIZE (1..maxNrofPUCCH-ResourcesPerSet)) OF PUCCH-ResourceId,
    maxPayloadMinus1               INTEGER (4..256)                                OPTIONAL    -- Need R
}

PUCCH-ResourceSetId ::=        INTEGER (0..maxNrofPUCCH-ResourceSets-1)

PUCCH-Resource ::=            SEQUENCE {
    pucch-ResourceId               PUCCH-ResourceId,
    startingPRB                    PRB-Id,
    intraSlotFrequencyHopping      ENUMERATED { enabled }                          OPTIONAL,   -- Need R
    secondHopPRB                   PRB-Id                                          OPTIONAL,   -- Need R
    format                         CHOICE {
        format0                        PUCCH-format0,
        format1                        PUCCH-format1,
        format2                        PUCCH-format2,
        format3                        PUCCH-format3,
        format4                        PUCCH-format4
    }
}

PUCCH-ResourceId ::=          INTEGER (0..maxNrofPUCCH-Resources-1)
```

FIG. 6

```
PUCCH-format0 ::=         SEQUENCE {
     initialCyclicShift         INTEGER (0..11),
     nrofSymbols                INTEGER (1..2),
     startingSymbolIndex        INTEGER (0..13)
}

PUCCH-format1 ::=         SEQUENCE {
     initialCyclicShift         INTEGER (0..11),
     nrofSymbols                INTEGER (4..14),
     startingSymbolIndex        INTEGER (0..10),
     timeDomainOCC              INTEGER (0..6)
}

PUCCH-format2 ::=         SEQUENCE {
     nrofPRBs                   INTEGER (1..16),
     nrofSymbols                INTEGER (1..2),
     startingSymbolIndex        INTEGER (0..13)
}

PUCCH-format3 ::=         SEQUENCE {
     nrofPRBs                   INTEGER (1..16),
     nrofSymbols                INTEGER (4..14),
     startingSymbolIndex        INTEGER (0..10)
}

PUCCH-format4 ::=         SEQUENCE {
     nrofSymbols                INTEGER (4..14),
     occ-Length                 ENUMERATED {n2,n4},
     occ-Index                  ENUMERATED {n0,n1,n2,n3},
     startingSymbolIndex        INTEGER (0..10)
}
```

FIG. 7

```
-- A set with one or more PUCCH resources
PUCCH-ResourceSet-r16 ::=          SEQUENCE {
    pucch-ResourceSetId-r16            PUCCH-ResourceSetId-r16,
    freqResourceAllocType-r16          ENUMERATED {type1, type2}          OPTIONAL
    resourcelist                       SEQUENCE (SIZE (1..maxNrofPUCCH-ResourcesPerSet)) OF PUCCH-ResourceId,
    maxPayloadMinus1                   INTEGER (4..256)                   OPTIONAL, -- Need R
                                                                          OPTIONAL
}

PUCCH-ResourceSetId-r16 ::=        INTEGER (0..maxNrofPUCCH-ResourceSets-r16-1)

PUCCH-Resource-r16 ::=             SEQUENCE {
    pucch-ResourceId-r16               PUCCH-ResourceId-r16,
    startingPRB                        PRB-Id,
    intraslotFrequencyHopping          ENUMERATED { enabled }            OPTIONAL,  -- Need R
    secondHopPRB                       PRB-Id                            OPTIONAL,  -- Need R
    format                             CHOICE {
        format0                            PUCCH-format0-r16,
        format1                            PUCCH-format1-r16,
        format2                            PUCCH-format2-r16,
        format3                            PUCCH-format3-r16,            OPTIONAL,  -- Need R
        format4                            PUCCH-format4-r16
    }                                                                     OPTIONAL,  -- Need R
}

PUCCH-ResourceId ::=               INTEGER (0..maxNrofPUCCH-Resources-1)
PUCCH-ResourceId-r16 ::=           INTEGER (0..maxNrofPUCCH-Resources-r16-1)     OPTIONAL
```

FIG. 8

```
-- A set with one or more PUCCH resources
PUCCH-ResourceSet-r16 ::=        SEQUENCE {
    pucch-ResourceSetId-r16          PUCCH-ResourceSetId-r16,
    resourceList                     SEQUENCE (SIZE (1..maxNrofPUCCH-ResourcesPerSet)) OF PUCCH-ResourceId,
    maxPayloadMinus1                 INTEGER (4..256)                                    OPTIONAL, -- Need R
}                                                                                        OPTIONAL, PUCCH-ResourceSetId-r16 ::=      INTEGER (0..maxNrofPUCCH-ResourceSets-r16-1)

PUCCH-Resource-r16 ::=           SEQUENCE {
    pucch-ResourceId-r16             PUCCH-ResourceId-r16,
    startingPRB                      PRB-Id,
    freqResourceAllocType-r16        ENUMERATED {type1, type2}                           OPTIONAL,
    intraSlotFrequencyHopping        ENUMERATED { enabled }                              OPTIONAL, -- Need R
    secondHopPRB                     PRB-Id                                              OPTIONAL, -- Need R
    format                           CHOICE {
                                         PUCCH-format0-r16,
                                         PUCCH-format1-r16,
                                         PUCCH-format2-r16,
                                         PUCCH-format3-r16,
                                         PUCCH-format4-r16                               OPTIONAL, -- Need R
    }
}                                                                                        OPTIONAL, PUCCH-ResourceId ::=             INTEGER (0..maxNrofPUCCH-Resources-1)
PUCCH-ResourceId-r16 ::=         INTEGER (0..maxNrofPUCCH-Resources-r16-1)               OPTIONAL,
```

FIG. 9

| DCI format 1_0 field | No. of bits |
|---|---|
| Identifier for DCI formats | 1 |
| Frequency domain resource assignment | ~14 |
| Time domain resource assignment | 4 |
| VRB-to-PRB maping | 1 |
| Modulation and coding scheme | 5 |
| New data indicator | 1 |
| Redundancy version | 2 |
| HARQ process number | 4 |
| Downlink assignment index | 2 |
| TPC command for scheduled PUCCH | 2 |
| PUCCH resource indicator | 3 |
| PDSCH-to-HARQ_feedback timing indicator | 3 |
| Total | ~42 |

(a) for NR

| DCI format 1_0 field | No. of bits |
|---|---|
| Identifier for DCI formats | 1 |
| Frequency domain resource assignment | ~14 |
| Time domain resource assignment | 4 |
| VRB-to-PRB maping | 1 |
| Modulation and coding scheme | 5 |
| New data indicator | 1 |
| Redundancy version | 2 |
| HARQ process number | 4 |
| Downlink assignment index | 2 |
| TPC command for scheduled PUCCH | 2 |
| PUCCH resource indicator | 3~5 |
| PDSCH-to-HARQ_feedback timing indicator | 3 |
| PUCCH starting position | ~2 |
| Channel access type | ~2 |
| Channel access priority class | ~2 |
| Total | 42~50 |

(b) for NR-U

FIG. 10

| Channel Access Priority Class (p) | $m_p$ | $CW_{min,p}$ | $CW_{max,p}$ | $T_{mcot,p}$ | Allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |
| ... | | | | | |
| p | X | CW#0 | CW#W-1 | Y ms | {CW#0, CW#1, ..., CW#5, CW#6, ..., CW#W-1} |

| Value | PUCCH starting position |
|-------|-------------------------|
| 00 | current symbol (e.g. symbol 0) |
| 01 | 25 us in current symbol |
| 10 | (25 us + TA) in current symbol |
| 11 | next symbol (e.g. symbol 1) |
(a) 2 bits-PUCCH starting position field
| Value | PUCCH starting position |
|-------|-------------------------|
| 0 | current symbol (e.g. symbol 0) |
| 1 | 25 us in current symbol |
(b) 1 bit-PUCCH starting position field
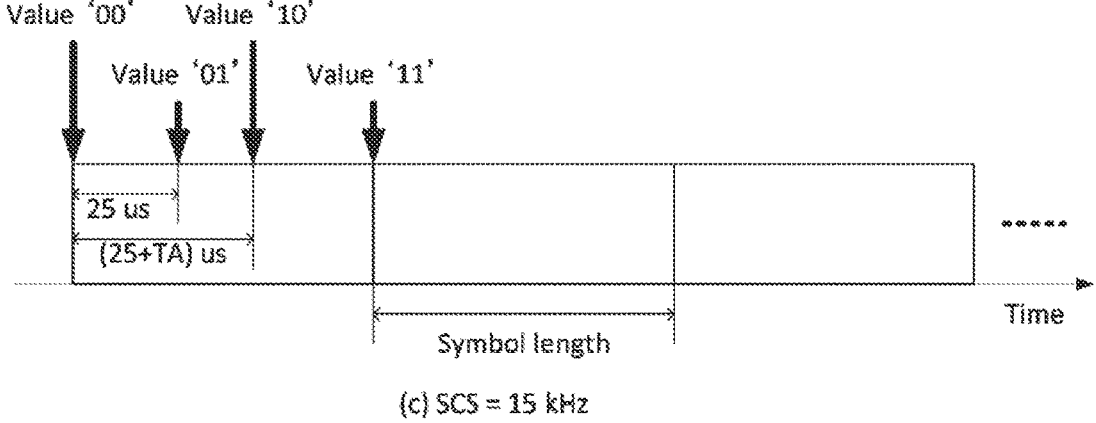
(c) SCS = 15 kHz
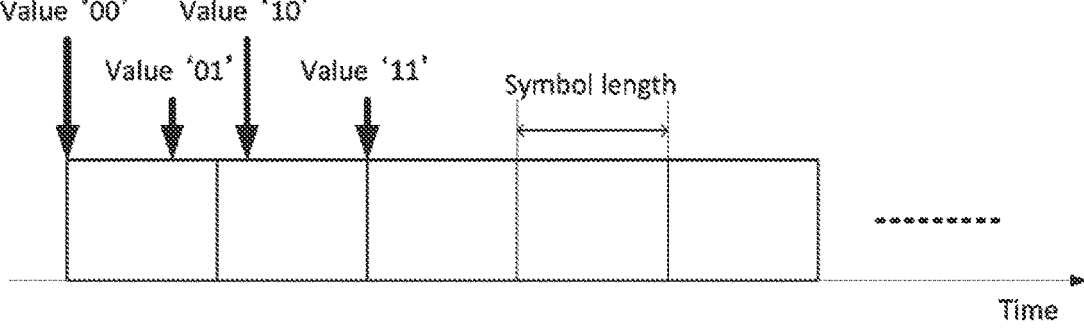
(d) SCS = 30 kHz
FIG. 16

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2020-22478 filed on Feb. 13, 2020, the contents of which are incorporated herein by reference.

BACKGROUND ART

In the $3^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus may also be referred to as an evolved NodeB (eNodeB), and a terminal apparatus may also be referred to as a User Equipment (UE). LTE is a cellular communication system in which multiple areas covered by base station apparatuses are deployed in a cell structure. One base station apparatus may manage one or multiple serving cells.

3GPP has been studying a next generation radio communication standard (New Radio (NR)) (NPL 1) to make a proposal for International Mobile Telecommunication (IMT)-2020, a standard for a next generation mobile communication system developed by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

In addition, the study of NR-Unlicensed (NR-U), which is a radio communication scheme and/or a radio communication system whereby the NR Radio Access Technology (NR-RAT) is applied to unlicensed frequency band (Unlicensed band, unlicensed spectrum), has been carried out (NPL 2).

CITATION LIST

Non Patent Literature

NPL 1: "New SID proposal: Study on New Radio Access Technology", RP-160671, NTT DOCOMO, 3GPP TSG RAN Meeting #71, Goteborg, Sweden, 7-10 Mar. 2016.
NPL 2: "TR 38.889 v0.0.2 Study on NR-based Access to Unlicensed Spectrum", R1-1807617, Qualcomm Incorporated, 3GPP TSG RAN WG1 Meeting #93, Busan, Korea, 21-25 May 2018.

SUMMARY OF INVENTION

Technical Problem

An aspect of the present invention provides a terminal apparatus and a base station apparatus that efficiently perform communication, and a communication method used for the terminal apparatus or the base station apparatus.

Solution to Problem (1) A first aspect of the present invention is a terminal apparatus including a higher layer configured to configure a configuration related to a search space set and a configuration related to a PDCCH, and a receiver configured to monitor the PDCCH based on the search space set, wherein in a case that one or multiple group indexes are allocated to the search space set and that neither monitoring of the PDCCH corresponding to the search space set with a group index index of 0 among the one or multiple group indexes nor monitoring of the PDCCH corresponding to the search space set with a group index of 1 among the one or multiple group indexes is performed, the receiver initiates monitoring of the PDCCH corresponding to the search space set with a group index of 0 among the one or multiple group indexes.

(2) A second aspect of the present invention is a terminal apparatus including a higher layer configured to configure a configuration related to a search space set and a configuration related to a PDCCH, and a receiver configured to monitor the PDCCH based on the search space set, wherein in a case that searchSpaceSwitchingTimer-r16 is provided and that a value provided by the searchSpaceSwitchingTimer-r16 is not set to a timer value, the receiver initiates monitoring of the PDCCH corresponding to the search space set with a group index of 0.

(3) A third aspect of the present invention is a base station apparatus for communicating with a terminal apparatus, the base station apparatus including a higher layer configured to notify a configuration related to a search space set and a configuration related to a PDCCH, and a transmitter configured to transmit the PDCCH based on the search space set, wherein in a case that in the terminal apparatus, one or multiple group indexes are allocated to the search space set and that the terminal apparatus is performing neither monitoring of the PDCCH corresponding to the search space set with a group index of 0 among the one or multiple group indexes nor monitoring of the PDCCH corresponding to the search space set with a group index of 1 among the one or multiple group indexes, the transmitter initiates transmission of the PDCCH corresponding to the search space set with a group index of 0 among the one or multiple group indexes.

(4) A fourth aspect of the present invention is a base station apparatus for communicating with a terminal apparatus, the base station apparatus including a higher layer configured to notify a configuration related to a search space set and a configuration related to a PDCCH, and a transmitter configured to monitor the PDCCH based on the search space set, wherein in a case that searchSpaceSwitchingTimer-r16 is provided to the terminal apparatus and that in the terminal apparatus, a value provided by the searchSpaceSwitchingTimer-r16 is not set to a timer value, the transmitter initiates transmission of the PDCCH corresponding to the search space set with a group index of 0.

(5) A fifth aspect of the present invention is a communication method in a terminal apparatus, the communication method including the steps of configuring a configuration related to a search space set and a configuration related to a PDCCH, and monitoring the PDCCH based on the search space set, wherein in the configuring, in a case that one or multiple group indexes are allocated to the search space set and that neither monitoring of the PDCCH corresponding to the search space set with a group index of 0 among the one or multiple group indexes nor monitoring of the PDCCH corresponding to the search space set with a group index of 1 among the one or multiple group indexes is performed, monitoring of the PDCCH corresponding to the search space set with a group index of 0 among the one or multiple group indexes is initiated.

(6) A sixth aspect of the present invention is a communication method used in a terminal apparatus, the communication method including the steps of configuring a configuration related to a search space set and a configuration related to a PDCCH, and monitoring the PDCCH based on the search space set, wherein in the monitoring, in a case that searchSpaceSwitching-Timer-r16 is provided and that a value provided by the searchSpaceSwitchingTimer-r16 is not set to a timer value, monitoring of the PDCCH corresponding to the search space set with a group index of 0 is initiated.

(7) The seventh aspect of the present invention is a communication method in a base station apparatus for communicating with a terminal apparatus, the communication method including the steps of notifying a configuration related to a search space set and a configuration related to a PDCCH, and transmitting the PDCCH based on the search space set, wherein in the transmitting, in a case that in the terminal apparatus, one or multiple group indexes are allocated to the search space set and that the terminal apparatus is performing neither monitoring of the PDCCH corresponding to the search space set with a group index of 0 among the one or multiple group indexes nor monitoring of the PDCCH corresponding to the search space set with a group index of 1 among the one or multiple group indexes, transmission of the PDCCH corresponding to the search space set with a group index of 0 among the one or multiple group indexes is initiated.

(8) An eighth aspect of the present invention is a communication method in a base station apparatus for communicating with a terminal apparatus, the communication method including the steps of notifying a configuration related to a search space set and a configuration related to a PDCCH, and monitoring the PDCCH based on the search space set, wherein in the monitoring, in a case that searchSpaceSwitchingTimer-r16 is provided to the terminal apparatus and that in the terminal apparatus, a value provided by the searchSpaceSwitchingTimer-r16 is not set to a timer value, transmission of the PDCCH corresponding to the search space set with a group index of 0 is initiated.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship between $N^{slot}_{symb}$, an SCS configuration $\mu$, and a CP configuration according to an aspect of the present embodiment.

FIG. 4 is a diagram illustrating an example of a relationship between a PUCCH format and a length $N^{PUCCH}_{symb}$ of the PUCCH format according to an aspect of the present embodiment.

FIG. 5 is a diagram illustrating an example of parameters included in PUCCH-Config and PUCCH-FormatConfig according to an aspect of the present embodiment.

FIG. 6 is a diagram illustrating an example of parameters included in PUCCH-ResourceSet and PUCCH-Resource according to an aspect of the present embodiment.

FIG. 7 is a diagram illustrating an example of configurable parameters specific to PUCCH formats according to an aspect of the present embodiment.

FIG. 8 is a diagram illustrating an example of parameters included in PUCCH resource sets and PUCCH resources according to an aspect of the present embodiment.

FIG. 9 is a diagram illustrating another example of parameters included in PUCCH resource sets and PUCCH resources according to an aspect of the present embodiment.

FIG. 10 is a diagram illustrating an example of DCI format 1_0 according to an aspect of the present embodiment.

FIG. 16 is a diagram illustrating an example of fields (PUCCH starting position field, PSP field) indicating a transmission starting position of the PUCCH in a time domain (starting position in the time domain, starting position in a slot) and the starting position of the PUCCH corresponding to each SCS according to the present embodiment.

DESCRIPTION OF EMBODIMENTS

An embodiment of the present invention will be described below.

Figure 1:
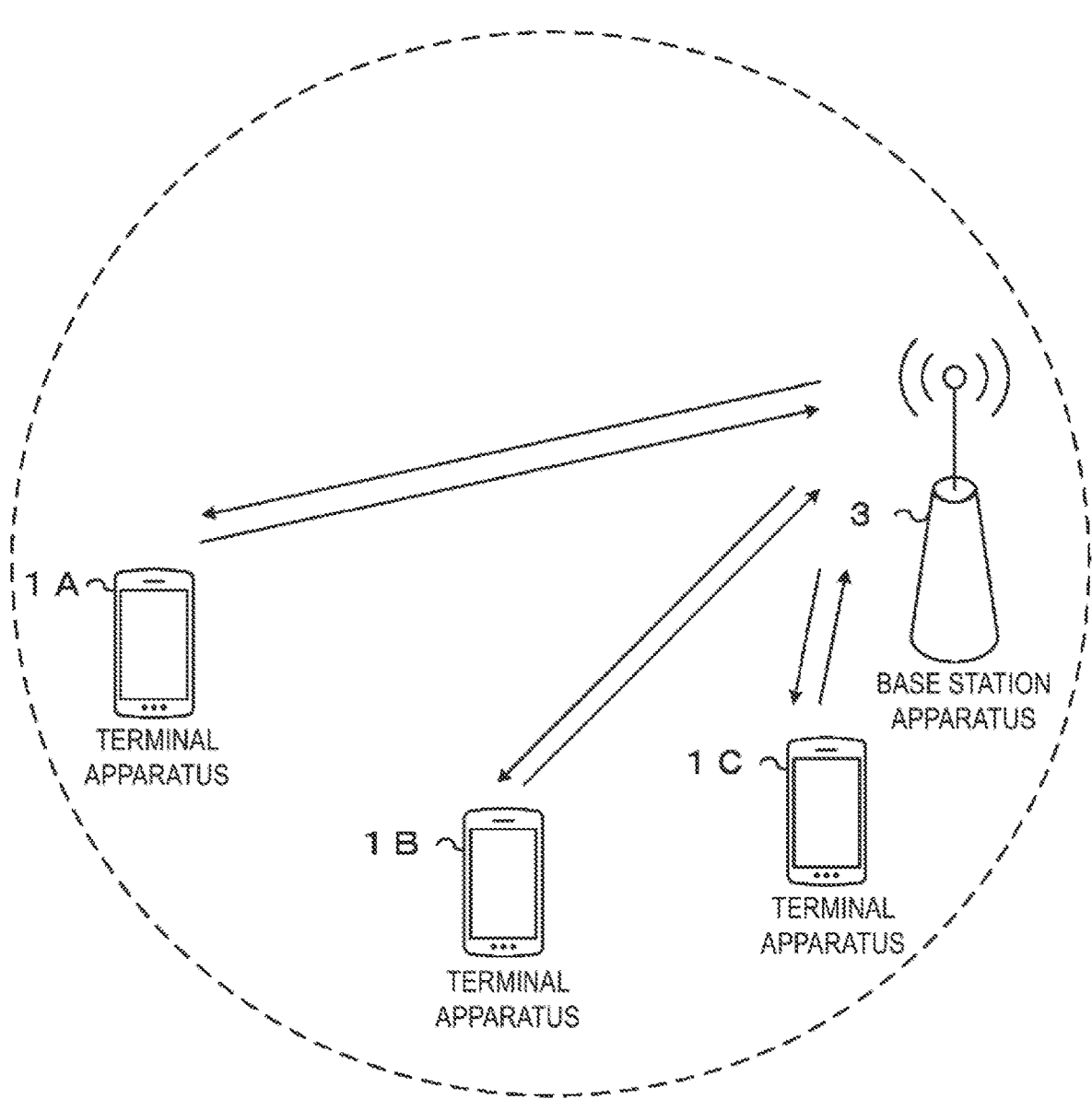
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. The terminal apparatuses 1A to 1C may be hereinafter also referred to as a terminal apparatus 1. Note that the base station apparatus 3 may include a part or all of a communication apparatus, a node, a NodeB (NB), an eNB, a gNB, a network apparatus (core network, gateway), and an access point. The terminal apparatus 1 may be referred to as a User equipment (UE). Note that the eNB is a node that provides an EUTRA user plane and control plane protocol termination for one or multiple terminal apparatuses 1, and in particular, the eNB that is connected to a fifth generation core network (5GC) through a Next Generation (NG) interface is referred to as an ng-eNB. The gNB is a node that provides an NR user plane and control plane protocol termination for one or multiple terminal apparatuses 1, and is connected to the 5GC through the NG interface.

The base station apparatus 3 may include one or both of a Master Cell Group (MCG) and a Secondary Cell Group (SCG). The MCG is a group of serving cells at least including a Primary Cell (PCell). The SCG is a group of serving cells at least including a Primary Secondary Cell (PSCell). The PCell may be a serving cell that is given based on initial connection. The MCG may include one or multiple Secondary Cells (SCells). The SCG may include one or multiple SCells. The PCell and the PSCell may be referred to as a Special Cell (SpCell). Configuring one CG by using one SpCell and one or multiple SCells and performing communication may be referred to as carrier aggregation.

The MCG may include one or multiple serving cells in EUTRA. The SCG may include one or multiple serving cells in NR. The MCG may include one or multiple serving cells in NR. The SCG may include one or multiple serving cells in EUTRA. The MCG and the SCG may include one or multiple serving cells of either of EUTRA and NR. Here, "in EUTRA" may include meaning that an EUTRA Radio Access Technology (RAT) is applied. "in NR" may include meaning that an NR RAT is applied.

The MCG may include one or multiple serving cells in EUTRA. The SCG may include one or multiple serving cells in NR-U. The MCG may include one or multiple serving cells in NR. The SCG may include one or multiple serving cells in NR-U. The MCG may include one or multiple serving cells of any one of EUTRA, NR, and NR-U. The SCG may include one or multiple serving cells of any one of EUTRA, NR, and NR-U. NR-U has the aim of performing communication/access/service of the NR scheme in a frequency band (operating band) that does not require frequency license. In a frequency band in which NR-U communication is performed, communication of a terminal apparatus and/or an access point and/or a base station apparatus that performs a wireless LAN (Wireless Local Area Network, Radio LAN) service (communication and/or scheme), a Wireless Access Systems (WAS) service, an IEEE802.11 service, a WiFi service, a Fixed Wireless Access (FWA) service, an Intelligent Transport Systems (ITS) service, and a Licensed Assisted Access (LAA) service may be performed. In contrast, NR has the aim of performing communication/access/service of the NR scheme in a frequency band that requires frequency license. LTE has the aim of performing communication/access/service of the LTE scheme in a frequency band that requires frequency license. LAA has the aim of performing communication/access/service of the LTE scheme in a frequency band that does not require frequency license. A radio communication operator may provide commercial service in a frequency band assigned in accordance with frequency license.

Operating bands (carrier frequencies and frequency bandwidths) applied to each of EUTRA, NR, and NR-U may be individually defined (prescribed).

The MCG may include a first base station apparatus. The SCG may include a second base station apparatus. In other words, the PCell may include the first base station apparatus. The PSCell may include the second base station apparatus. Each of the first base station apparatus and the second base station apparatus may be the same as the base station apparatus 3.

In the following, frame configuration will be described.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol is converted into a time-continuous signal in baseband signal generation. In the downlink, Cyclic Prefix-Orthogonal Frequency Division Multiplex (CP-OFDM) is at least used. In the uplink, one of CP-OFDM or Discrete Fourier Transform-spread-Orthogonal Frequency Division Multiplex (DFT-s-OFDM) is used. With Transform precoding being applied to CP-OFDM, DFT-s-OFDM may be given.

A subcarrier spacing (SCS) may be given by subcarrier spacing $\Delta f = 2^\mu \cdot 15$ kHz. For example, SCS configuration $p$ may be configured to be any one of 0, 1, 2, 3, 4, and/or 5. For a certain BandWidth Part (BWP), the SCS configuration $\mu$ may be given by a higher layer parameter. In other words, the value of $\mu$ may be configured for each BWP (for each downlink BWP, for each uplink BWP) regardless of the downlink and/or the uplink.

In the radio communication system according to an aspect of the present embodiment, a time unit $T_c$ is used for expression of the length in the time domain. The time unit $T_c$ may be given by $T_c = 1/(\Delta f_{max} \cdot N_f)$. $\Delta f_{max}$ may be a maximum value of the SCS supported in the radio communication system according to an aspect of the present embodiment. $\Delta f_{max}$ may be $\Delta f_{max} = 480$ kHz. $N_f$ may be $N_f = 4096$. A constant $\kappa$ is $\kappa = \Delta f_{max} \cdot N_f/(\Delta f_{ref} N_{f,\ ref}) = 64$. $\Delta f_{ref}$ may be 15 kHz. $N_{f,\ ref}$ may be 2048.

The constant $\kappa$ may be a value indicating a relationship between a reference SCS and $T_c$. The constant $\kappa$ may be used for the length of a subframe. Based at least on the constant $\kappa$, the number of slots included in the subframe may be given. $\Delta f_{ref}$ is a reference SCS, and $N_{f,\ ref}$ is a value corresponding to the reference SCS.

Transmission of a signal in the downlink and/or transmission of a signal in the uplink is configured by a frame of 10 ms. The frame includes 10 subframes. The length of the subframe is 1 ms. The length of the frame may be given regardless of SCS $\Delta f$. In other words, configuration of the frame may be given regardless of the value of $\mu$. The length of the subframe may be given regardless of SCS $\Delta f$. In other words, configuration of the subframe may be given regardless $\mu$.

For a certain SCS configuration $\mu$, the number and indexes of slots included in one subframe may be given. For example, a slot number $n^\mu_s$ may be given in ascending order in a range from 0 to $N^{subframe,\ \mu}_{slot} - 1$ in the subframe. For the SCS configuration $\mu$, the number and indexes of slots included in one frame may be given. The slot number $n^\mu_{s,\ f}$ may be given in ascending order in a range from 0 to $N^{frame,\ \mu}_{slot} - 1$ in the frame. $N^{slot}_{symb}$ continuous OFDM symbols may be included in one slot. $N^{slot}_{symb}$ may be given based at least on a part or all of a Cyclic Prefix (CP) configuration. The CP configuration may be given based at least on a higher layer parameter. The CP configuration may be given based at least on dedicated RRC signaling. The slot number may also be referred to as a slot index.

FIG. 2 is an example illustrating a relationship between $N^{slot}_{symb}$, the SCS configuration $\mu$, and the CP configuration according to an aspect of the present embodiment. In FIG. 2A, for example, in a case that the SCS configuration $\mu$ is 2 and the CP configuration is a normal CP (NCP), $N^{slot}_{symb} = 14$, $N^{frame,\ \mu}_{slot} = 40$, and $N^{subframe,\ \mu}_{slot} = 4$. In FIG. 2B, for example, in a case that the SCS configuration $\mu$ is 2 and the CP configuration is an extended CP (ECP), $N^{slot}_{symb} = 12$, $N^{frame,\ \mu}_{slot} = 40$, and $N^{subframe,\ \mu}_{slot} = 4$.

In the following, description of physical resources according to the present embodiment will be given.

An antenna port is defined in a manner in which a channel through which a symbol is transmitted in one antenna port can be estimated from a channel through which another symbol is transmitted in the same antenna port. In a case that large scale property of a channel through which a symbol is transmitted in one antenna port can be estimated from a channel through which a symbol is transmitted in another antenna port, the two antenna ports may be referred to as being QCL (Quasi Co-Located). The large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same. The fact that the first antenna port and the second antenna port are QCL with respect to a beam parameter may mean that a transmit beam assumed by a receiver for the first antenna port and a transmit beam assumed by the receiver for the second antenna port are the same. In a case that the large scale property of a channel through which a symbol is transmitted in one antenna port can be estimated from a channel through which a symbol is transmitted in another antenna port, the terminal apparatus 1 may assume that the two antenna ports are QCL. The fact that two antenna ports are QCL may mean that it is assumed that the two antenna ports are QCL.

For a set of the SCS configuration $\mu$ and the carrier, a resource grid defined by $N^{size, \mu}_{grid, x}N^{RB}_{sc}$ subcarriers and $N^{subframe, \mu}_{symb}$ OFDM symbols is given. $N^{size, \mu}_{grid, x}$ may indicate the number of resource blocks given for the SCS configuration $\mu$ of a carrier x. $N^{size, \mu}_{grid, x}$ may indicate a bandwidth of the carrier. $N^{size, \mu}_{grid, x}$ may correspond to a value of a higher layer parameter CarrierBandwidth. The carrier x may indicate either of a downlink carrier and an uplink carrier. In other words, x may be either of "DL" and "UL". $N^{RB}_{sc}$ may indicate the number of subcarriers included in one resource block. $N^{RB}_{sc}$ may be 12. At least one resource grid may be given for each antenna port p, and/or for each SCS configuration p, and/or for each con-figuration of a Transmission direction. The transmission direction at least includes a DownLink (DL) and an UpLink (UL). A set of parameters at least including a part or all of the antenna port p, the SCS configuration $\mu$, and the con-figuration of the transmission direction may also be herein-after referred to as a first radio parameter set. In other words, one resource grid may be given for each first radio parameter set. Note that the radio parameter set may be one or multiple sets including one or multiple radio parameters (physical layer parameters or higher layer parameters).

In the downlink, a carrier included in a serving cell is referred to as a downlink carrier (or a downlink component carrier). In the uplink, a carrier included in a serving cell is referred to as an uplink carrier (uplink component carrier). The downlink component carrier and the uplink component carrier may be collectively referred to as a component carrier (or a carrier).

A type of the serving cell may be any one of a PCell, a PSCell, and an SCell. The PCell may be a serving cell that is identified based at least on a cell ID (physical layer cell ID, physical cell ID) acquired from an SSB (Synchroniza-tion signal/Physical broadcast channel block) in initial con-nection. The SCell may be a serving cell that is used in carrier aggregation. The SCell may be a serving cell that is given based at least on dedicated RRC signaling.

Each element in the resource grid given for each first radio parameter set may be referred to as a resource element (RE). The resource element is identified by an index $k_{sc}$ in the frequency domain and an index $l_{sym}$ in the time domain. For a certain first radio parameter set, the resource element is identified by the index $k_{sc}$ in the frequency domain and the index $l_{sym}$ in the time domain. The resource element iden-tified by the index $k_{sc}$ in the frequency domain and the index $l_{sym}$ in the time domain may also be referred to as a resource element ($k_{sc}$, $l_{sym}$). The index $k_{sc}$ in the frequency domain indicates a value of any one out of 0 to $N^{\mu}_{RB}N^{RB}_{sc}=1$. $N^{\mu}_{RB}$ may be the number of resource blocks given for the SCS configuration $\mu$. $N^{\mu}_{RB}$ may be $N^{size, \mu}_{grid, x}$. $N^{RB}_{sc}$ is the number of subcarriers included in the resource block, and $N^{RB}_{sc}=12$. The index $k_{sc}$ in the frequency domain may correspond to the subcarrier index $k_{sc}$. The index $l_{sym}$ in the time domain may correspond to the OFDM symbol index $l_{sym}$. One or multiple resource elements may correspond to a physical resource and a complex value (complex value modulation symbol). One or multiple information bits (in-formation bits for control information, a transport block, and a higher layer parameter) may be mapped for each of one or multiple resource elements corresponding to the physical resource and/or the complex value.

Figure 3:
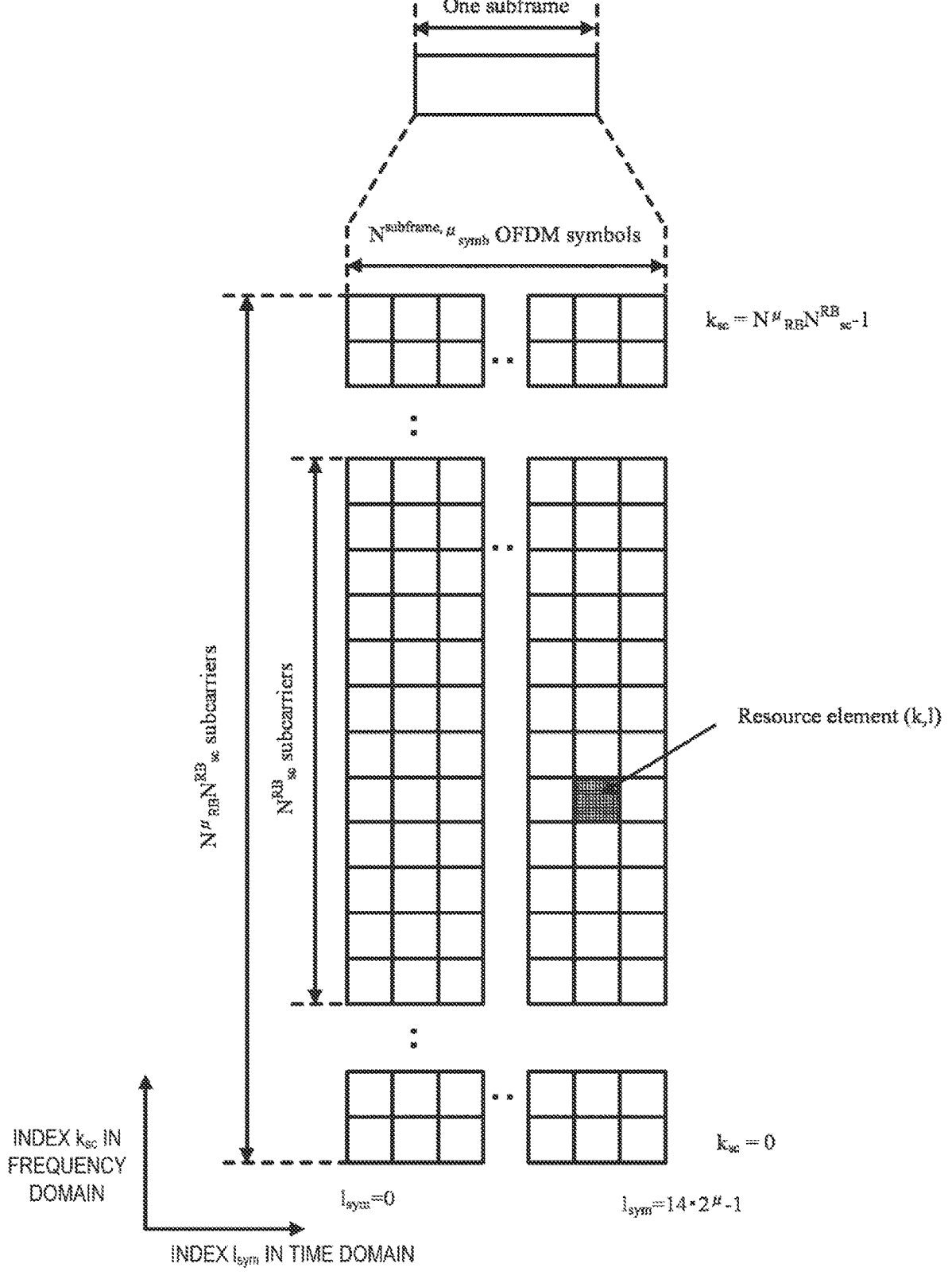
FIG. 3 is a schematic diagram illustrating an example of a resource grid in a subframe according to an aspect of the present embodiment.

FIG. 3 is a schematic diagram illustrating an example of the resource grid in the subframe according to an aspect of the present embodiment. In the resource grid of FIG. 3, the horizontal axis is the index $l_{sym}$ in the time domain, and the vertical axis is the index $k_{sc}$ in the frequency domain. In one subframe, the frequency domain of the resource grid includes $N^{\mu}_{RB}N^{RB}_{sc}$ subcarriers. In one subframe, the time domain of the resource grid may include $14 \cdot 2^{\mu}$ OFDM symbols. One resource block includes $N^{RB}_{sc}$ subcarriers. The time domain of the resource block may correspond to 1 OFDM symbol. The time domain of the resource block may correspond to 14 OFDM symbols. The time domain of the resource block may correspond to one or multiple slots. The time domain of the resource block may correspond to one subframe.

For the terminal apparatus 1, performing transmission and/or reception by using only a subset of resource grids may be indicated. The subset of resource grids is also referred to as a BWP, and the BWP may be given based at least on a part or all of a higher layer parameter and/or DCI. The BWP may also be referred to as a Carrier Bandwidth Part (CBP). For the terminal apparatus 1, performing trans-mission and/or reception by using all of the sets of resource grids need not be indicated. For the terminal apparatus 1, performing transmission and/or reception by using a part of frequency resources in the resource grid may be indicated. One BWP may include multiple resource blocks in the frequency domain. One BWP may include multiple contigu-ous resource blocks in the frequency domain. The BWP configured for the downlink carrier may also be referred to as a downlink BWP. The BWP configured for the uplink carrier may also be referred to as an uplink BWP. The BWP may be a subset of bands of a carrier (a subset of frequency domains in a carrier).

One or multiple downlink BWPs may be configured for each of serving cells. One or multiple uplink BWPs may be configured for each of serving cells.

One downlink BWP out of the one or multiple downlink BWPs configured for the serving cell may be configured for an active downlink BWP. A downlink BWP switch may be used for deactivating one active downlink BWP, while activating inactive downlink BWPs other than the one active downlink BWP. Switching of the downlink BWP may be controlled by a BWP indicator field that is included in downlink control information. Switching of the downlink BWP may be controlled based on a higher layer parameter.

In the active downlink BWP, a DL-SCH may be received. In the active downlink BWP, a PDCCH may be monitored. In the active downlink BWP, a PDSCH may be received.

In the inactive downlink BWP, the DL-SCH need not be received. In the inactive downlink BWP, the PDCCH need not be monitored. The CSI for the inactive downlink BWP need not be reported.

Among one or multiple downlink BWPs configured for the serving cell, two or more downlink BWPs need not be configured for the active downlink BWP.

One uplink BWP out of the one or multiple uplink BWPs configured for the serving cell may be configured for the active uplink BWP. Uplink BWP switch is used for deactivating one active uplink BWP, and activating an inactive uplink BWP other than the one active uplink BWP. Switching of the uplink BWP may be controlled by a BWP indicator field that is included in downlink control information. Switching of the uplink BWP may be controlled based on a higher layer parameter.

In the active uplink BWP, a UL-SCH may be transmitted. In the active uplink BWP, a PUCCH may be transmitted. In the active uplink BWP, a PRACH may be transmitted. In the active uplink BWP, an SRS may be transmitted.

In the inactive uplink BWP, the UL-SCH need not be transmitted. In the inactive uplink BWP, the PUCCH need not be transmitted. In the inactive uplink BWP, the PRACH need not be transmitted. In the inactive uplink BWP, an SRS need not be transmitted.

Among one or multiple uplink BWPs configured for one serving cell, two or more uplink BWPs need not be configured for the active uplink BWP. In other words, it is only necessary that at least one active uplink BWP be provided for the serving cell including the uplink BWP.

The higher layer parameter is a parameter included in a higher layer signaling. The higher layer signaling may be a Radio Resource Control (RRC) signaling, or may be a Medium Access Control Control Element (MAC CE). Here, the higher layer signaling may be a signal of an RRC layer, or may be a signal of an MAC layer. The higher layer signaling may be a signal of a layer higher than the physical layer. Note that the higher layer parameter given by the signal of the RRC layer may be notified and configured from the base station apparatus 3 to the terminal apparatus 1. The higher layer parameter provided by the signal of the RRC layer may be referred to as an RRC parameter or an RRC information element (IE).

The higher layer signaling may be common RRC signaling. The common RRC signaling may at least include some or all of the following features C1 to C3: C1) Being mapped to a BCCH logical channel or a CCCH logical channel;

C2) Including at least a ReconfigurationWithSync information element;

C3) Being mapped to a PBCH.

The ReconfigurationWithSync information element may include information indicating configuration used in a serving cell in common. The configuration used in a serving cell in common may at least include configuration of the PRACH. The configuration of the PRACH may at least indicate one or multiple random access preamble indexes. The configuration of the PRACH may at least indicate time/frequency resources of the PRACH.

The common RRC signaling may at least include a common RRC parameter. The common RRC parameter may be a (Cell-specific) parameter that is used in a serving cell in common.

The higher layer signaling may be dedicated RRC signaling. The dedicated RRC signaling may at least include some or all of the following features D1 to D2:

D1) Being mapped to a DCCH logical channel;

D2) Including no ReconfigurationWithSync information element.

For example, a Master Information Block (MIB) and a System Information Block (SIB) may be included in the common RRC signaling. A message of a higher layer that is mapped to the DCCH logical channel and that at least includes the ReconfigurationWithSync information element may be included in the common RRC signaling. A message of a higher layer that is mapped to the DCCH logical channel and that does not include the ReconfigurationWithSync information element may be included in the dedicated RRC signaling. Note that the MIB and the SIB may be collectively referred to as system information.

Note that the higher layer parameter including one or multiple higher layer parameters may be referred to as an information element (IE). The higher layer parameter and/or the IE including one or multiple higher layer parameters and/or one or multiple IEs may be referred to as a message (a message of a higher layer, an RRC message), an information block (IB), or system information.

The SIB may at least indicate a time index of the SSB. The SIB may at least include information related to PRACH resources. The SIB may at least include information related to configuration of initial connection.

The ReconfigurationWithSync information element may at least include information related to PRACH resources. The ReconfigurationWithSync information element may at least include information related to configuration of initial connection.

The dedicated RRC signaling may at least include a dedicated RRC parameter. The dedicated RRC parameter may be a (UE-specific) parameter that is used dedicatedly for the terminal apparatus 1. The dedicated RRC signaling may at least include the common RRC parameter.

The common RRC parameter and the dedicated RRC parameter may also be referred to as a higher layer parameter.

In the following, physical channels and physical signals according to various aspects of the present embodiment will be described.

The uplink physical channel may correspond to a set of resource elements for carrying information that is generated in a higher layer. The uplink physical channel is a physical channel that is used in the uplink carrier. In the radio communication system according to an aspect of the present embodiment, at least a part or all of the following uplink physical channels are used.

Physical Uplink Control CHannel (PUCCH)

Physical Uplink Shared CHannel (PUSCH)

Physical Random Access CHannel (PRACH)

The PUCCH may be used for transmitting uplink control information (UCI). The uplink control information includes a part or all of channel state information (CSI), a scheduling request (SR), Hybrid Automatic Repeat request ACKnowledgement (HARQ-ACK) information corresponding to a transport block (TB). Note that the TB may be referred to as a Medium Access Control Protocol Data Unit (MAC PDU), a Downlink-Shared Channel (DL-SCH), and a Physical Downlink Shared Channel (PDSCH).

One or multiple types of uplink control information may be multiplexed on the PUCCH. The multiplexed PUCCH may be transmitted. In other words, multiple HARQ-ACKs may be multiplexed on the PUCCH, multiple pieces of CSI may be multiplexed on the PUCCH, multiple SRs may be multiplexed on the PUCCH, the HARQ-ACK and the CSI may be multiplexed on the PUCCH, the HARQ-ACK and the SR may be multiplexed on the PUCCH, or the PUCCH may be multiplexed with another type of UCI.

HARQ-ACK information may at least include HARQ-ACK bits corresponding to the TB. The HARQ-ACK bits may indicate an acknowledgement (ACK) or a negative-acknowledgement (NACK) corresponding to the TB. The ACK may be a value indicating that decoding of the TB has successfully completed. The NACK may be a value indicating that decoding of the TB has not successfully completed. The HARQ-ACK information may include at least one HARQ-ACK codebook including one or multiple HARQ-ACK bits. The fact that the HARQ-ACK bits correspond to one or multiple TBs may mean that the HARQ-ACK bits correspond to the PDSCH including the one or multiple TBs.

The HARQ-ACK bits may indicate an ACK or a NACK corresponding to one Code Block Group (CBG) included in the TB. The HARQ-ACK may also be referred to as HARQ feedback, HARQ information, or HARQ control information.

The SR may be at least used for requesting resources of the PUSCH for initial transmission. The SR may be used for requesting UL-SCH resources for new transmission. SR bits may be used for indicating either of a positive SR or a negative SR. The fact that the SR bits indicate the positive SR may also be referred to as "the positive SR is transmitted". The positive SR may indicate that resources of the PUSCH for initial transmission are requested by the terminal apparatus 1. The positive SR may indicate that the SR is triggered by a higher layer. The positive SR may be transmitted in a case that transmission of the SR is indicated by a higher layer. The fact that the SR bits indicate the negative SR may also be referred to as "the negative SR is transmitted". The negative SR may indicate that resources of the PUSCH for initial transmission are not requested by the terminal apparatus 1. The negative SR may indicate that the SR is not triggered by a higher layer. The negative SR may be transmitted in a case that transmission of the SR is not indicated by a higher layer.

The SR bits may be used for indicating either of the positive SR or the negative SR for any one of one or multiple SR configurations. Each of the one or multiple SR configurations may correspond to one or multiple logical channels. The positive SR for a certain SR configuration may be a positive SR for any one or all of the one or multiple logical channels corresponding to the certain SR configuration. The negative SR need not correspond to a specific SR configuration. The fact that the negative SR is indicated may mean that the negative SR is indicated for all of the SR configurations.

The SR configuration may be a Scheduling Request ID (SR-ID). The SR-ID may be given by a higher layer parameter.

The CSI may at least include a part or all of a channel quality indicator (CQI), a precoder matrix indicator (PMI), and a rank indicator (RI). The CQI is an indicator related to quality of a channel (for example, propagation intensity), and the PMI is an indicator indicating a precoder. The RI is an indicator indicating a transmission rank (or the number of transmission layers).

The CSI may be given based at least on reception of a physical signal (for example, a CSI-RS) that is at least used for channel measurement. In the CSI, a value selected by the terminal apparatus 1 may be included. The CSI may be selected by the terminal apparatus 1, based at least on reception of a physical signal that is at least used for channel measurement. Channel measurement may include interference measurement. Note that the CSI-RS may be set based on CSI-RS configuration, or may be set based on SSB configuration.

A CSI report is a report of the CSI. The CSI report may include CSI part 1 and/or CSI part 2. The CSI part 1 may at least include a part or all of wideband channel quality information (wideband CQI), a wideband precoder matrix indicator (wideband PMI), and an RI. The number of bits of the CSI part 1 multiplexed on the PUCCH may be a prescribed value regardless of a value of the RI of the CSI report. The number of bits of the CSI part 2 multiplexed on the PUCCH may be given based on the value of the RI of the CSI report. The rank indicator of the CSI report may be a value of a rank indicator that is used for calculation of the CSI report. The RI of CSI information may be a value indicated by an RI field included in the CSI report.

A set of RIs allowed in the CSI report may be a part or all of 1 to 8. The set of RIs allowed in the CSI report may be given based at least on a higher layer parameter Rank-Restriction. In a case that the set of RIs allowed in the CSI report includes only one value, the RIs of the CSI report may be the one value.

Priority may be configured for the CSI report. The priority of the CSI report may be given based at least on a part or all of configuration related to behaviors (processing) of the CSI report in the time domain, a type of contents of the CSI report, an index of the CSI report, and/or an index of a serving cell in which measurement of the CSI report is configured.

The configuration related to the behaviors (processing) of the CSI report in the time domain may be configuration indicating any one of whether the CSI report is aperiodically performed, whether the CSI report is semi-persistently performed, or semi-statically performed.

The type of the contents of the CSI report may indicate whether or not the CSI report includes RSRP (Reference Signals Received Power) of layer 1.

The layer 1 is a physical layer, and may be a layer that performs processing of a physical layer processing unit, a radio transmitting unit, a transmitter, and/or a radio receiving unit, a receiver, or the like. The layers higher than the layer 1 include the MAC layer, the RRC layer, a higher layer processing unit, and the like. For example, the layer 2 may refer to the MAC layer, the RLC layer, a PDCP layer, a MAC layer processing unit, an RLC layer processing unit, or a PDCP layer processing unit. The layer 3 may be the RRC layer or an RRC layer processing unit.

The index of the CSI report may be given by a higher layer parameter.

Now, the PUCCH in the present embodiment will be described.

The PUCCH supports one or multiple PUCCH formats (PUCCH format 0 to PUCCH format 4). The PUCCH format may be transmitted on the PUCCH. The fact that the PUCCH format is transmitted may mean that the PUCCH is transmitted.

In a case that the terminal apparatus 1 transmits Uplink Control Information (UCI) without transmitting the PUSCH, the terminal apparatus 1 transmits the UCI on the PUCCH using a PUCCH format that satisfies a prescribed condition.

PUCCH format 0 is used for transmission in one or two symbols and in a case that the number of HARQ-ACK information bits (HARQ-ACK/SR bit(s)) with the positive or negative SR is one or two.

PUCCH format 1 is used for transmission in four or more symbols and in a case that the number of HARQ-ACK/SR bit(s) is one or two.

PUCCH format 2 is used for transmission in one or two symbols and in a case that the number of UCI information bits is more than two.

PUCCH format 3 is used for transmission in four or more symbols and in a case that the number of UCI information bits is more than two.

PUCCH format 4 is used for transmission in four or more symbols and in a case that the number of UCI information bits is more than two and that PUCCH resources include Orthogonal CoverCode (OCC).

The frequency resource allocation of PUCCH formats 0, 1, and 4 may be 1 PRB regardless of the number of UCI information bits transmitted on the PUCCH. The frequency resource allocation of PUCCH formats 2 and 3 may be based on a higher layer parameter related to the maximum number of PRBs (number of Physical Resource Blocks (nrofPRBs)) and the optimum number of PRBs depending on the number of UCI information bits transmitted on the PUCCH. Note that nrofPRBs may be configured for each of PUCCH formats 2 and 3. For PUCCH resources of PUCCH format 2 and/or 3, the number of PRBs may be adjusted not to exceed the number of UCI information bits to be transmitted by the terminal apparatus 1 and not to exceed nrofPRBs.

In PUCCH format 3, in a case that the number of PRBs appropriately required for the number of UCI information bits to be transmitted does not satisfy $2^{\hat{}}\alpha_2 \ast 3^{\hat{}}\alpha_3 \ast 5^{\hat{}}\alpha_5$, the number of PRBs may be increased until the number of PRBs required for PUCCH format 3 satisfies $2^{\hat{}}\alpha_2 \ast 3^{\hat{}}\alpha_3 \ast 5^{\hat{}}\alpha_5$, such that the number of PRBs does not exceed nrofPRBs. Here, each of $\alpha_2$, $\alpha_3$, and $\alpha_5$ may be an integer equal to or larger than 0.

FIG. 4 is a diagram illustrating an example of a relationship between the PUCCH format and length $N^{PUCCH}_{symb}$ of the PUCCH format according to an aspect of the present embodiment. The length $N^{PUCCH}_{symb}$ of PUCCH format 0 is 1 or 2 OFDM symbols. The length $N^{PUCCH}_{symb}$ of PUCCH format 1 is any one of 4 to 14 OFDM symbols. The length $N^{PUCCH}_{symb}$ of PUCCH format 2 is 1 or 2 OFDM symbols. The length $N^{PUCCH}_{symb}$ of PUCCH format 3 is any one of 4 to 14 OFDM symbols. The length $N^{PUCCH}_{symb}$ of PUCCH format 4 is any one of 4 to 14 OFDM symbols.

FIG. 5 is a diagram illustrating an example of parameters included in PUCCH-Config and PUCCH-FormatConfig according to an aspect of the present embodiment. The PUCCH may be transmitted by using time/frequency resources determined based on PUCCH-Config. PUCCH-Config and the parameters included in PUCCH-Config may be RRC information elements. PUCCH-Config may be used to configure one or multiple PUCCH parameters specific to the terminal apparatus 1 for each BWP. resourceSetToAddModList and resourceSetToReleaseList are lists used to add and/or release PUCCH resource sets, and the size of each of the lists may be based on the maximum number of PUCCH resource sets. resourceToAddModList and resourceToReleaseList are lists used to add and/or release one or multiple PUCCH resources applied to the uplink BWP and serving cell for which a PUCCH configuration is defined, and the size of each of the lists may be based on the maximum number of PUCCH resources. spatialRelationInfoToAddModList may be used to indicate the configuration of the spatial relation between the reference RS and the PUCCH. reference RS may be SSB/CSI-RS/SRS. In a case that the list includes more than one element, the MAC-CE selects one element. PUCCH-FormatConfig may be configured for each of PUCCH formats 1 to 4. PUCCH-FormatConfig corresponding to each PUCCH format may be shared among all PUCCH resources corresponding to each PUCCH format. dl-DataToUL-ACK may be used to indicate a list of timings for the PDSCH and the HARQ-ACK corresponding to the PDSCH.

PUCCH-FormatConfig may include one or all of interslotFrequencyHopping, additionalDMRS, maxCodeRate, nrofSlots, pi2BPSK, and simultaneousHARQ-ACK-CSI.

interslotFrequencyHopping is used to indicate that the terminal apparatus 1 can perform inter-slot frequency hopping in a case that PUCCH format 1, 3 or 4 is repeated over multiple slots. For a long PUCCH (PUCCH formats 1, 3, and 4), the terminal apparatus 1 cannot perform intra-slot frequency hopping and inter-slot frequency hopping at the same time.

additionalDMRS may be used to indicate that PUCCH format 3 or 4 can include two DMRS symbols per hop, and can include four DMRS symbols per hop in a case that no frequency hopping is performed. This field does not apply to PUCCH format 1 or 2.

maxCodeRate may indicate a maximum coding rate for determining a method of feedback the UCI in PUCCH format 2, 3 or 4. This field need not be applied to PUCCH format 1.

nrofSlots indicates the number of slots with the same PUCCH format for each PUCCH format 1, 3 or 4. In a case that this field is not present in PUCCH-FormatConfig, the terminal apparatus 1 may apply n1. The field need not be applied to PUCCH format 2.

pi2BPSK may indicate that, for the PUCCH, the terminal apparatus 1 can use pi/2BPSK in the UCI symbol instead of QPSK. This field need not be applied to PUCCH formats 1 and 2.

simultaneousHARQ-ACK-CSI may be used in PUCCH format 2, 3 or 4 to indicate whether simultaneous transmission of HARQ-ACK feedback and CSI with or without SR can be used. In a case that this field is not present in PUCCH-FormatConfig, the terminal apparatus 1 may apply off. This field need not be applied to PUCCH format 1.

FIG. 6 is a diagram illustrating an example of parameters included in PUCCH-ResourceSet and PUCCH-Resource according to an aspect of the present embodiment. PUCCH-ResourceSet may include pucch-ResourceSetId, resourceList, and maxPayloadSize.

resourceList is a list of one or multiple PUCCH resources included in the PUCCH resource set. One or more PUCCH resources of PUCCH format 0 and 1 may be allowed to be included only in the first PUCCH resource set. The first PUCCH resource set may be a PUCCH resource set with pucch-ResourceSetId=0. The first PUCCH resource set may include up to 32 PUCCH resources. One or multiple PUCCH resources of PUCCH formats 2, 3, and 4 may be allowed to be included only in PUCCH resource sets with pucch-ResourceSetId>0. Each of these PUCCH resource sets may include up to eight PUCCH resources. Up to four PUCCH resource sets may be configured.

maxPayloadSize may be used to indicate a value obtained by subtracting one from the maximum number of payload bits that can be transmitted by the terminal apparatus 1 by using PUCCH resource sets. In other words, maxPayloadSize may indicate the maximum number of UCI bits (maximum value of the number of UCI bits) that can be transmitted by using PUCCH resource sets. In a case that the PUCCH is generated, the terminal apparatus 1 may select PUCCH-ResourceSet that supports the number of bits to be transmitted by the terminal apparatus 1. In the first PUCCH resource set, this field need not be included in the PUCCH-ResourceSet. In a PUCCH resource set other than the first PUCCH resource set, the field need not be included in the PUCCH-ResourceSet in a case that the PUCCH resource set has the maximum payload size.

PUCCH-Resource may include pucch-ResourceId, startingPRB, intraSlotFrequencyHopping, secondHopPRB, and format.

startingPRB indicates a PRB index of the PUCCH. The value of this field indicates the first PRB index in a case that the PUCCH includes multiple PRBs.

intraSlotFrequencyHopping may be used to indicate whether intra-slot frequency hopping is performed. The intra-slot frequency hopping may be applied to all types of PUCCH formats. For a long PUCCH over multiple slots (PUCCH formats 1, 3, and 4), the intra-slot frequency hopping and inter-slot frequency hopping are not performed at the same time.

secondHopPRB may be used to indicate the index of the first PRB after frequency hopping. The individual value may be applied to intra-slot frequency hopping.

format may be used to select the type of the PUCCH format (PUCCH formats 0 to 4) and a parameter specific to the format. PUCCH formats 0 and 1 may be allowed only for PUCCH resources included in the first PUCCH resource set. PUCCH formats 2, 3, and 4 may be allowed only for PUCCH resources included in PUCCH resource sets other than the first PUCCH resource set.

FIG. 7 is a diagram illustrating an example of configurable parameters specific to the PUCCH formats according to an aspect of the present embodiment.

PUCCH resources of PUCCH format 0 may be configured based on PUCCH-Format0 including initialCyclicShift, nrofSymbols, and startingSymbolIndex.

PUCCH resources of PUCCH format 1 may be configured based on PUCCH-Format1 including initialCyclicShift, nrofSymbols, startingSymbolIndex, and timeDomainOCC.

PUCCH resources of PUCCH format 2 may be configured based on PUCCH-Format2 including nrofPRBs, nrofSymbols, and startingSymbolIndex.

PUCCH resources of PUCCH format 3 may be configured based on PUCCH-Format3 including nrofPRBs, nrofSymbols, and startingSymbolIndex.

PUCCH resources of PUCCH format 4 may be configured based on PUCCH-Format4 including nrofSymbols, occ-Length, occ-Index, and startingSymbolIndex.

In a case that format indicates PUCCH-format0, the PUCCH format configured for the PUCCH resources is PUCCH format 0. The PUCCH resources may be determined based on the values of various parameters included in PUCCH-format0.

In a case that format indicates PUCCH-format1, the PUCCH format configured for the PUCCH resources is PUCCH format 1. The PUCCH resources may be determined based on the values of the various parameters included in the PUCCH-format1.

In a case that format indicates PUCCH-format2, the PUCCH format configured for the PUCCH resource is PUCCH format 2. The PUCCH resources may be determined based on the values of the various parameters included in PUCCH-format2.

In a case that format indicates PUCCH-format3, the PUCCH format configured for the PUCCH resources is PUCCH format 3. The PUCCH resources may be determined based on values of various parameters included in PUCCH-format3.

In a case that format indicates PUCCH-format4, the PUCCH format configured for the PUCCH resources may be PUCCH format 4. The PUCCH resources may be determined based on the values of various parameters included in PUCCH-format4.

Now, PUCCH resources and PUCCH resource sets according to the present embodiment will be described.

The terminal apparatus 1 may determine the PUCCH resources used for transmission of the HARQ-ACK corresponding to the PDSCH based on the value of a PRI included in the DCI format used for scheduling of the PDSCH.

In a case that the PUCCH resource set includes more than a prescribed number of PUCCH resources, the terminal apparatus 1 may determine which of the PUCCH resources of the PUCCH resource set is used based on the value of a PUCCH resource indicator (PRI) field included in the DCI format and a CCE index by which the DCI format is detected. In a case that the PUCCH resource set includes more than a prescribed number of PUCCH resources, the size (number of bits or the bit size) of the PRI field included in the DCI format may be extended. In a case that the PUCCH resource set includes the prescribed number or fewer of PUCCH resources, the terminal apparatus 1 may determine the PUCCH resources based on the value of the PRI included in the DCI format. Regarding the PUCCH resource set, whether to use a first PUCCH resource set to which a first frequency resource allocation type is applied or a second PUCCH resource set to which a second frequency resource allocation type is applied may be determined based on first information included in the DCI format. The first information may be information indicating whether the PUCCH is transmitted within a COT or out of the COT, may be information indicating the frequency resource allocation type of the PUCCH, or may be information indicating the type of CAP before the PUCCH transmission.

For example, in a case that more than eight PUCCH resources are configured for a PUCCH resource set other than the first PUCCH resource set, the terminal apparatus 1 may determine PUCCH resources (PUCCH resource ID) for transmitting the UCI information bits, based on the value of the PRI and the value of the CCE index. In a case that the bit size of the PRI field is extended, the UCI information bits may be transmitted by using the PUCCH resources corresponding to the value of the PRI.

The PUCCH resource set may involve a set of PUCCH resource indexes provided by resourceList providing a set of pucch-ResourceId used for the PUCCH resource set. The PUCCH resource set may also involve the maximum number of UCI information bits that can be transmitted by using PUCCH resources of the PUCCH resource set provided by maxPayloadSize. The maximum number of UCI information bits for the first PUCCH resource set may be two bits. The maximum number of PUCCH resource indexes per one PUCCH resource set may be provided by maxNrofPUCCH-ResourcesPerSet. For NR-U, the maximum number of PUCCH resources included in all PUCCH resource sets may be 32.

In a case that the terminal apparatus 1 provides capability information informing that the terminal apparatus 1 supports maxNrofPUCCH-ResourceSets-r16 with a value larger than that of maxNrofPUCCH-ResourceSets, then more than four PUCCH resource sets may be configured for the terminal apparatus 1; four sets are supported by maxNrofPUCCH-ResourceSets. In this case, the PUCCH resource sets may be provided by PUCCH-ResourceSet-r16 and associated with the PUCCH resource set index provided by pucch-Resource-SetId-r16. In other words, pucch-ResourceSetId-r16 may take any value ranging from 0 to maxNrofPUCCH-Re-sourceSets-r16-1.

In a case that the terminal apparatus 1 supports maxN-rofPUCCH-ResourceSets-r16 and that a PUCCH resource set is configured for which pucch-ResourceSetId-r16 has a value larger than a prescribed value, a PUCCH resource set may be configured to which a different frequency resource allocation type is applied. Furthermore, maxPayloadSize set to the same value may be applied in a PUCCH resource set with different pucch-ResourceSetId-r16.

In a case that the terminal apparatus 1 provides capability information informing that the terminal apparatus 1 supports maxNrofPUCCH-ResourceSets-r16 with a value larger than a prescribed value, or that the terminal apparatus 1 is capable of a different frequency resource allocation type, or that the terminal apparatus 1 supports PUCCH-ResourceSet-r16 and/or PUCCH-Resource-r16, then the base station apparatus 3 may include and configure a parameter associated with the frequency resource allocation type (for example, freqRe-sourceAllocType-r16) in PUCCH-ResourceSet-r16 or PUCCH-Resource-r16 for the terminal apparatus 1 providing the capability information. Note that even in a case that maxNrofPUCCH-Resources-r16 with a value larger than the prescribed value is provided instead of maxNrofPUCCH-ResourceSets-r16, the base station apparatus 3 may perform similar processing.

In a case of configuring a PUCCH-ResourceSet for which pucch-ResourceSetId with a value larger than the prescribed value is set, the base station apparatus 3 may include and configure freqResourceAllocType in each PUCCH-Re-sourceSet.

The PUCCH resource set having a value of 0 of the pucch-ResourceSetId-r16 may be a first PUCCH resource set including PUCCH resources of PUCCH format 0 or 1 up to 32. The UCI information bits for PUCCH resource sets of pucch-ResourceSetId-r16=0 may be supported only up to 2 bits.

A PUCCH resource set having pucch-ResourceSetId-r16 with a value of 1 may be a PUCCH resource set including PUCCH resources of PUCCH format 2, 3, and/or 4. The number of UCI information bits that can be transmitted by PUCCH resources of the PUCCH resource set with pucch-ResourceSetId-r16=1 may range from 3 to $N_2$. The value of $N_2$ may be given by maxPayloadSize included in the PUCCH resource set.

The PUCCH resource set having pucch-ResourceSetId-r16 with a value of 2 may be a PUCCH resource set including PUCCH resources of PUCCH format 2, 3, and/or 4. The number of UCI information bits that can be transmitted by PUCCH resources of the PUCCH resource set with pucch-ResourceSetId-r16=2 may range from $N_2+1$ to $N_3$. The value of $N_3$ may be given by maxPayloadSize included in the PUCCH resource set.

The PUCCH resource set having pucch-ResourceSetId-r16 with a value of 3 may be a PUCCH resource set including PUCCH resources of PUCCH format 2, 3, and/or 4. The number of UCI information bits that can be transmitted by PUCCH resources of the PUCCH resource set with pucch-ResourceSetId-r16=3 may range from $N_3+1$ to 1706. At this time, the PUCCH resource set need not include maxPayloadSize.

The PUCCH resource set having pucch-ResourceSetId-r16 with a value of 4 may be a PUCCH resource set including PUCCH resources of PUCCH format 2, 3, and/or 4. The number of UCI information bits that can be transmitted by PUCCH resources of the PUCCH resource set with pucch-ResourceSetId-r16=4 may range from 3 to $N_2$. The value of $N_2$ may be given by maxPayloadSize included in the PUCCH resource set.

The PUCCH resource set having pucch-ResourceSetId-r16 with a value of 5 may be a PUCCH resource set including PUCCH resources of PUCCH format 2, 3, and/or 4. The number of UCI information bits that can be transmitted by PUCCH resources of the PUCCH resource set with pucch-ResourceSetId-r16=5 may range from $N_2+1$ to $N_3$. The value of $N_3$ may be given by maxPayloadSize included in the PUCCH resource set.

The PUCCH resource set having pucch-ResourceSetId-r16 with a value of 6 may be a PUCCH resource set including PUCCH resources of PUCCH format 2, 3, and/or 4. The number of UCI information bits that can be transmitted by PUCCH resources of the PUCCH resource set with pucch-ResourceSetId-r16=6 may range from $N_3+1$ to 1706. At this time, the PUCCH resource set need not include maxPayloadSize.

In a case that different PUCCH resource set IDs are set for multiple PUCCH resource sets to which the same number of UCI information bits or the number of UCI information bits within the same range (in other words, maxPayloadSize with the same value) is applied, the physical resource mapping or frequency resource allocation type may vary among the multiple PUCCH resource sets. For example, different frequency resource allocation types may be set for PUCCH resources of PUCCH resource sets with pucch-Resource-SetId-r16=1 and pucch-ResourceSetId-r16=4, the frequency resource allocation type of PUCCH resource set of the PUCCH resource set with pucch-ResourceSetId-r16=1 may be contiguous allocation, and the frequency resource allocation type of PUCCH resource set of the PUCCH resource set with pucch-ResourceSetId-r16=4 may be interlaced allocation. For other IDs (pucch-ResourceSetId-r16=2 and 5 or pucch-ResourceSetId-r16=3 and 6), similar configurations may be made.

In a case that different PUCCH resource set IDs are set for multiple PUCCH resource sets to which the same number of UCI information bits or the number of UCI information bits within the same range (in other words, maxPayloadSize with the same value) is applied, the physical resource mapping or frequency resource allocation type may vary among the PUCCH resource sets. For example, different frequency resource allocation types may be set for PUCCH resources of PUCCH resource sets with pucch-ResourceSetId-r16=1 and pucch-ResourceSetId-r16=4, the frequency resource allocation type of PUCCH resource set of the PUCCH resource set with pucch-ResourceSetId-r16=1 may be inter-laced allocation, and the frequency resource allocation type of PUCCH resource set of the PUCCH resource set with pucch-ResourceSetId-r16=4 may be contiguous allocation. For other IDs, similar configurations may be made.

For each PUCCH resource set, in a case that no maxPay-loadSize corresponding to $N_2$ or $N_3$ is configured, $N_2$ and $N_3$ may be considered to be 1706.

In a case that the terminal apparatus 1 has the capability of configuring more than a prescribed number of PUCCH resource sets and that for the terminal apparatus 1, more than the prescribed number of PUCCH resource sets are configured or a PUCCH resource set ID (pucch-ResourceSetId-r16) having a value larger than a prescribed value (pucch- ResourceSetId) is configured, the PUCCH resource set corresponding to the frequency resource allocation for the PUCCH may be configured for the terminal apparatus 1. In such a case, for the same or similar number of UCI information bits, the terminal apparatus 1 may be configured with a PUCCH resource set to which the first frequency resource allocation type is applied and a PUCCH resource set to which the second frequency resource allocation type is applied. The terminal apparatus 1 may be configured with a PUCCH resource set including at least one PUCCH resource of the first frequency resource allocation type and a PUCCH resource set including at least one PUCCH resource of the second frequency resource allocation type. For example, the first frequency resource allocation type may be the interlaced allocation, whereas the second frequency resource allocation type may be the contiguous allocation, or the first frequency resource allocation type may be the contiguous allocation, whereas the second frequency resource allocation type may be the interlaced allocation.

In a case that resourceSetToAddModList-r16 is configured to which a number larger than a prescribed number or maxNrofPUCCH-ResourceSets-r16 with a value larger than the value of maxNrofPUCCH-ResourceSets is applied or that a PUCCH resource set is configured that includes pucch-ResourceSetId-r16 with a value larger than a prescribed value, then PUCCH-ResourceSet-r16 or PUCCH-Resource-r16 may include a parameter indicating the frequency resource allocation type of the PUCCH resources (for example, freqResourceAllocType-r16).

In a case that at least two PUCCH resource sets with different pucch-ResourceSetId values have the same maximum number of UCI information bits, different PUCCH resource sets or PUCCH resources included in the different PUCCH resource sets may include a parameter indicating the frequency resource allocation type of the PUCCH resources (for example, freqResourceAllocType-r16), and different frequency resource allocation types may be configured.

For the terminal apparatus 1 configured with the first PUCCH resource set and the second PUCCH resource set to which the same maximum number of UCI bits is applied, whether the HARQ-ACK for the PDSCH is transmitted by using the PUCCH resources included in the first PUCCH resource set or by using the PUCCH resources included in the second PUCCH resource set may be determined based on the first information included in the DCI format used for scheduling of the PDSCH. At this time, at least the PUCCH resource set ID and the frequency resource allocation type may vary between the first PUCCH resource set and the second PUCCH resource set.

Here, in the present embodiment, the frequency resource allocation type (the first resource allocation type and the second frequency resource allocation type) may refer to the interlaced allocation or the contiguous allocation, or may refer to any other frequency resource allocation.

FIG. 8 is a diagram illustrating an example of parameters included in a PUCCH resource set and PUCCH resources according to an aspect of the present embodiment. PUCCH-ResourceSet-r16 may include pucch-ResourceSetId-r16, freqResourceAllocType-r16, resourceList or resourceList-r16, maxPayloadSize or maxPayloadSize-r16.

pucch-ResourceSetId-r16 may indicate the ID of PUCCH-ResourceSet-r16, and may be configured with a value larger than the value of pucch-ResourceSetId. In other words, maxNrofPUCCH-ResourceSets-r16 may have a value larger than that of maxNrofPUCCH-ResourceSets (i.e., 4 sets).

freqResourceAllocType-r16 may indicate the frequency resource allocation type applied to all PUCCH resources indicated by resourceList included in the PUCCH resource set. Although FIG. 8 illustrates two types, the number of configurable types may vary depending on the number of supported frequency resource allocation types. The frequency resource allocation type may be information indicating the interlaced allocation and the contiguous allocation. The frequency resource allocation type may be information indicating whether the interlaced allocation can be used.

resourceList is a list of PUCCH resources included in the PUCCH resource set. resourceList may indicate up to 32 PUCCH resources per one PUCCH resource set. In a case that resourceList-r16 is configured, up to 32 PUCCH resources may be indicated regardless of the value of pucch-ResourceSetId.

maxPayloadSize is information indicating the maximum number of UCI information bits that can be transmitted by using PUCCH resources of the PUCCH resource set, and corresponds to $N_2$ or $N_3$ described above. Compared to maxPayloadSize, maxPayloadSize-r16 may differ in the maximum number of UCI information bits supported. In other words, the possible range of the number of UCI information bits supported by maxPayloadSize-r16 may be wider or narrower than maxPayloadSize. The maximum value of the number of UCI information bits supported by maxPayloadSize-r16 may be larger or smaller than the value of maxPayloadSize.

PUCCH-Resource-r16 may refer to a PUCCH resource listed by resourceList or resourceList-r16. PUCCH-Resource-r16 may include pucch-ResourceId-r16, startingPRB, intraSlotFrequencyHopping, secondHopPRB, and format.

pucch-ResourceId-r16 may be used to indicate the PUCCH resource ID. The pucch-ResourceId-r16 may be configured with a value larger than that of pucch-ResourceId. In other words, maxNrofPUCCH-Resources-r16 indicating the maximum number of PUCCH resources may be configured with a value larger than maxNrofPUCCH-Resources.

The information indicated by startingPRB may vary based on the frequency resource allocation type indicated by freqResourceAllocType-r16. For example, in a case that freqResourceAllocType-r16 corresponding to the PUCCH resources indicates the frequency resource allocation type corresponding to the contiguous allocation, startingPRB may be information indicating the first PRB index of the PUCCH resources. In a case that freqResourceAllocType-r16 corresponding to the PUCCH resources indicates the interlaced allocation, startingPRB may indicate an index of interlace. startingPRB may be used to calculate the index of interlace. For example, the index of interlace may be determined from startingPRB mod M. M indicates the total number of interlaces. X mod Y is used to calculate a remainder in a case that X is divided by Y.

intraSlotFrequencyHopping and secondHopPRBs may be configured only in a case that the frequency resource allocation type indicated by freqResourceAllocType-r16 corresponds to the contiguous allocation. intraSlotFrequencyHopping is information indicating whether frequency hopping within a slot is supported, and the secondHopPRBs may be information indicating the first PRB index after frequency hopping.

format is information indicating the type of the PUCCH format applied to PUCCH-Resource-r16. The applicable parameters may vary depending on the PUCCH format, The specifically applicable parameters may be the same as or different from those in FIG. 7. format4 is not applied to NR-U and may thus be configured as an optional parameter. In other words, in a case that format4 is applied to other than NR-U, format4 may be included in the parameters.

FIG. 9 is a diagram illustrating another example of parameters included in a PUCCH resource set and PUCCH resources according to an aspect of the present embodiment. Compared to FIG. 8, FIG. 9 illustrates freqResourceAlloc-Type-r16 included in PUCCH-Resource-r16. The frequency resource allocation type may be configured for each PUCCH resource.

FIG. 10 is a diagram illustrating an example of DCI format 1_0 according to an aspect of the present embodiment. FIG. 10(a) is an example of DCI format 1_0 for NR. FIG. 10(b) is an example of DCI format 1_0 for NR-U. The DCI format 1_0 for NR-U may include additional fields associated with a channel access procedure for the PUCCH. The size of the PRI may vary depending on the number of PUCCH resources. DCI format 1_0 for NR-U may include information indicating the frequency resource allocation type for the PUCCH resources. In that case, the parameters as illustrated in FIG. 8 and FIG. 9 need not be configured as RRC parameters. Note that the details of PUCCH starting position, Channel access type, and Channel access priority class will be described below. PUCCH starting position, Channel access type, and Channel access priority class need not be included in the DCI format in a case that each of the parameters is determined based on specifications or higher layer parameters.

The PUSCH is at least used for transmitting the TB (the MAC PDU, the UL-SCH). The PUSCH may be used for at least transmitting a part or all of the TB, the HARQ-ACK information, the CSI, and the SR. The PUSCH is at least used for transmitting a random access message 3 (message 3 (Msg3)) corresponding to an RAR (Msg2) and/or an RAR grant in a random access procedure. Note that the TB may correspond to each of the uplink and the downlink. In other words, the PUSCH may be used for transmitting the TB for the uplink. The PDSCH may be used for transmitting the TB for the downlink.

The PRACH is at least used for transmitting a random access preamble (random access message 1, message 1 (Msg1)). The PRACH may be at least used for indicating a part or all of an initial connection establishment procedure, a handover procedure, a connection re-establishment procedure, an initial access procedure, synchronization (timing adjustment) for transmission of the PUSCH, and a request of resources for the PUSCH. The random access preamble may be used for notifying an index (random access preamble index) that is given by a higher layer of the terminal apparatus 1 to the base station apparatus 3.

The random access preamble may be given by performing cyclic shift on a Zadoff-Chu sequence corresponding to a physical route sequence index u. The Zadoff-Chu sequence may be generated based on the physical route sequence index u. In one serving cell, multiple random access preambles may be defined. The random access preamble may be identified based at least on the index of the random access preamble. Different random access preambles corresponding to different indexes of the random access preambles may correspond to different combinations of the physical route sequence index u and the cyclic shift. The physical route sequence index u and the cyclic shift may be given based at least on information included in the system information. The physical route sequence index u may be an index for identifying a sequence included in the random access preamble. The random access preamble may be identified based at least on the physical route sequence index u.

In FIG. 1, in uplink radio communication, the following uplink physical signals are used. The uplink physical signals need not be used for transmitting information output from a higher layer, but are used by a physical layer.

UpLink Demodulation Reference Signal (UL DMRS)

Sounding Reference Signal (SRS)

UpLink Phase Tracking Reference Signal (UL PTRS)

The UL DMRS is related to transmission of the PUSCH and/or the PUCCH. The UL DMRS is multiplexed on the PUSCH or the PUCCH. The base station apparatus 3 may use the UL DMRS for performing channel compensation of the PUSCH or the PUCCH. In the following, concurrent transmission of the PUSCH and the UL DMRS related to the PUSCH is simply referred to as transmission of the PUSCH. In the following, concurrent transmission of the PUCCH and the UL DMRS related to the PUCCH is simply referred to as transmission of the PUCCH. The UL DMRS related to the PUSCH is also referred to as the UL DMRS for the PUSCH. The UL DMRS related to the PUCCH is also referred to as the UL DMRS for the PUCCH.

The SRS need not be related to transmission of the PUSCH or the PUCCH. The base station apparatus 3 may use the SRS for measurement of a channel state. The SRS may be transmitted at the end of a subframe in an uplink slot or in a certain number of OFDM symbols from the end.

The UL PTRS may be a reference signal that is at least used for phase tracking. The UL PTRS may be related to a UL DMRS group at least including an antenna port used for one or multiple UL DMRSs. The fact that the UL PTRS and the UL DMRS group are related to each other may mean that an antenna port of the UL PTRS and a part or all of antenna ports included in the UL DMRS group are at least QCL. The UL DMRS group may be identified based at least on an antenna port having the smallest index in the UL DMRSs included in the UL DMRS group. The UL PTRS may be mapped to an antenna port having the smallest index in one or multiple antenna ports to which one codeword is mapped. The UL PTRS may be mapped to the first layer in a case that one codeword is at least mapped to the first layer and the second layer. The UL PTRS need not be mapped to the second layer. The index of the antenna port to which the UL PTRS is mapped may be given based at least on downlink control information.

In FIG. 1, in downlink radio communication from the base station apparatus 3 to the terminal apparatus 1, the following downlink physical channels are used. The downlink physical channels are used by a physical layer for transmitting information output from a higher layer.

Physical Broadcast Channel (PBCH)

Physical Downlink Control Channel (PDCCH)

Physical Downlink Shared Channel (PDSCH)

The PBCH is at least used for transmitting the MIB and/or a PBCH payload. The PBCH payload may at least include information indicating an index related to transmission timing of the SSB (SSB occasion). The PBCH payload may include information related to an identifier (index) of the SSB. The PBCH may be transmitted based on a prescribed transmission interval. The PBCH may be transmitted at intervals of 80 milliseconds (ms). The PBCH may be transmitted at intervals of 160 ms. The contents of the information included in the PBCH may be updated every 80 ms. A part or all of the pieces of the information included in the PBCH may be updated every 160 ms. The PBCH may include 288 subcarriers. The PBCH may include 2, 3, or 4 OFDM symbols. The MIB may include information related to an identifier (index) of the SSB. The MIB may include information indicating at least a part of a number of the slot, a number of a subframe, and/or a number of a radio frame in which the PBCH is transmitted.

The PDCCH is at least used for transmission of downlink control information (DCI). The PDCCH may be transmitted including at least the DCI. The PDCCH may be transmitted including the DCI. The DCI may also be referred to as a DCI format. The DCI may at least indicate either of a downlink grant or an uplink grant. The DCI format used for scheduling of the PDSCH may also be referred to as a downlink DCI format and/or a downlink grant. The DCI format used for scheduling of the PUSCH may also be referred to as an uplink DCI format and/or an uplink grant. The downlink grant may also be referred to as downlink assignment or downlink allocation. The uplink DCI format at least includes one or both of DCI format 0_0 and DCI format 0_1.

DCI format 0_0 may at least include some or all of 1A to 1I:

1A) DCI format identification field (Identifier for DCI formats field);

1B) Frequency domain resource assignment (FDRA) field;

1C) Time domain resource assignment (TDRA) field;

1D) Frequency hopping flag (FHF) field;

1E) Modulation and Coding Scheme (MCS) field;

1F) New Data Indicator (NDI) field;

1G) Redundancy Version (RV) field;

1H) HARQ process ID field, HARQ process number field (HPID field);

1I) Transmission Power Control (TPC) command for PUSCH field (TPC command for scheduled PUSCH field).

1A may be at least used for indicating which of one or multiple DCI formats the DCI format including the 1A corresponds to. The one or multiple DCI formats may be given based at least on a part or all of DCI format 1_0, DCI format 1_1, DCI format 0_0, and/or DCI format 0_1. In other words, the number of bits of the 1A may be determined based on the number of corresponding DCI formats.

1B may be at least used for indicating allocation of the frequency resource for the PUSCH that is scheduled by the DCI format including 1B. The number of bits of the 1B may be determined based on the maximum number of PRBs used for allocation of the frequency resource for the PUSCH, or may be determined based on the higher layer parameters.

1C may be at least used for indicating allocation of the time resource for the PUSCH that is scheduled by the DCI format including 1C. The number of bits of the 1C may be determined based on the maximum number of symbols used for allocation of the time resource for the PUSCH.

1D may be at least used for indicating whether or not frequency hopping is applied to the PUSCH that is scheduled by the DCI format including 1D.

1E may be at least used for indicating a part or all of a modulation scheme for the PUSCH that is scheduled by the DCI format including 1E and/or a target coding rate. The target coding rate may be a target coding rate for the TB of the PUSCH. The size of the TB (TBS) may be given based at least on the target coding rate.

1F is used for indicating whether transmission of the PUSCH corresponding to the value of the HPID indicated by the 1H that is scheduled by the DCI format is new transmission or retransmission, based on whether the value of the 1F is toggled. In a case that the value of the 1F is toggled, the PUSCH corresponding to the 1H is new transmission, otherwise the PUSCH corresponding to the 1H is retransmission. The 1F may be DCI indicating whether the base station apparatus 3 requests retransmission of the PUSCH corresponding to the 1H.

1G is used for indicating a starting position of a bit sequence of the PUSCH that is scheduled by the DCI format.

1H is used for indicating a number of a HARQ process (HPID) to which the PUSCH that is scheduled by the DCI format corresponds.

1I is used for adjusting transmission power of the PUSCH that is scheduled by the DCI format.

DCI format 0_1 includes at least some or all of 2A to 2L:

2A) DCI format identification field;

2B) Frequency domain resource assignment field;

2C) Time domain resource assignment field:

2D) Frequency hopping flag field;

2E) MCS field;

2F) Channel State Information (CSI) request field;

2G) Bandwidth Part Indicator field (BWP indicator field);

2H) NDI field;

2I) RV field;

2J) HPID field;

2K) TPC command for PUSCH field;

2L) UL-SCH indicator field.

2F is at least used for indicating the report of the CSI. The size of 2F may be a prescribed value. The size of 2F may be 0, may be 1, may be 2, or may be 3. The size of 2F may be determined according to the number of CSI configurations (for example, ReportTriggerSize) configured for the terminal apparatus 1.

2G may be used for indicating an uplink BWP to which the PUSCH that is scheduled by DCI format 0_1 is mapped.

2L is

Among 2A to 2L, the fields having the same terms as those of 1A to 1I described above include the same details, and thus description thereof will be omitted.

The downlink DCI format at least includes one or both of DCI format 1_0 and DCI format 1_1.

DCI format 1_0 may at least include some or all of 3A to 3L:

3A) DCI format identification field;

3B) Frequency domain resource assignment field;

3C) Time domain resource assignment field;

3D) VRB-to-PRB mapping (VTPM) field;

3E) MCS field;

3F) PDSCH to HARQ feedback timing indicator field;

3G) PUCCH resource indicator (PRI) field;

3H) NDI field;

3I) RV field;

3J) HPID field;

3K) DAI field 3;

L) TPC command for PUCCH field (TPC command for scheduled PUCCH field).

3B to 3E may be used for the PDSCH that is scheduled by the DCI format.

3F may be a field indicating timing K1. In a case that the index of the slot including the last OFDM symbol of the PDSCH is a slot n, the index of the slot including the PUCCH or the PUSCH at least including the HARQ-ACK corresponding to the TB included in the PDSCH may be n+K1. In a case that the index of the slot including the last OFDM symbol of the PDSCH is the slot n, the index of the slot including the first OFDM symbol of the PUCCH or the first OFDM symbol of the PUSCH at least including the HARQ-ACK corresponding to the TB included in the PDSCH may be n+K1.

3G may be a field indicating an index of one or multiple PUCCH resources included in a PUCCH resource set or may be a value used to determine PUCCH resources.

3H is used for indicating whether transmission of the PDSCH corresponding to the value of the HPID indicated by the 3J that is scheduled by the DCI format is new transmission or retransmission, based on whether the value of the 3H is toggled. In a case that the value of the 3J is toggled, the PDSCH corresponding to 3J is new transmission, otherwise the PDSCH corresponding to the 3J is retransmission.

3I may be used for indicating a starting position of a bit sequence of the PDSCH that is scheduled by the DCI format.

3J may be used for indicating a number of a HARQ process to which the PDSCH that is scheduled by the DCI format corresponds.

3K may be used to indicate the value of the counter DAI.

3L may be used for adjusting transmission power of the PUCCH corresponding to the PDSCH that is scheduled by the DCI format.

DCI format 1_1 may at least include some or all of 4A to 4N:

4A) DCI format identification field;
4B) Frequency domain resource assignment field;
4C) Time domain resource assignment field;
4D) VRB-to-PRB mapping field;
4E) MCS field;
4F) PDSCH to HARQ feedback timing indicator field;
4G) PUCCH resource indicator field;
4H) BWP indicator field;
4I) NDI field;
4J) RV field;
4K) HPID field;
4L) TPC command for PUCCH field;
4M) One shot HARQ-ACK request field;
4N) DL-SCH indicator field.

3A and 4A are used for identifying the DCI format, similarly to 1A and 2A.

In a case that each of 1A, 2A, 3A, and 4A includes one bit, 1A, 2A, 3A, and 4A may be used to indicate DCI format 0_0 or DCI format 1_0 or indicate DCI format 0_1 or DCI format 1_1, and in a case that each of 1A, 2A, 3A, and 4A includes two bits, 1A, 2A, 3A, and 4A may be used to indicate any one of four DCI formats 0_0 to 1_1.

4B to 4E may be used for the PDSCH that is scheduled by the DCI format.

4J may be used for indicating a downlink BWP to which the PDSCH that is scheduled by DCI format 1_1 is mapped.

Among 4A to 4N, the fields having the same terms as those of 3A to 3L described above include the same details, and thus description thereof will be omitted.

One bit for 4M may be included in the DCI format in a case that the higher layer parameter pdsch-HARQ-ACK-OneShotFeedback-r16 is configured. Otherwise, 4M includes 0 bits. In a case that the value of 4M is set to 1, the terminal apparatus 1 may include the HARQ-ACK information in the Type-3 HARQ-ACK codebook for transmission. In a case that the value of 4M is set to 0, the terminal apparatus 1 may generate and transmit a HARQ-ACK codebook of a type based on a value set to the pdsch-HARQ-ACK-Codebook (semi-static or dynamic), or HARQ-ACK information of 1 bit or a prescribed number of bits.

4N may be used to indicate whether the DCI format schedules the PDSCH and/or whether the DL-SCH is transmitted on the PDSCH.

DCI format 2_0 may be used to notify the group of the terminal apparatus 1 in a slot format, one or multiple valid RB sets, a Channel Occupancy Time (COT) duration, and/or a search space set (group) switching. Some or all of the following 5A to 5D with a CRC scrambled with a Slot Format Indicator (SFI)-RNTI may be included in DCI format 2_0, which may be transmitted.

5A) Slot format indicator 1, Slot format indicator 2, . . . , Slot format indicator N;
5B) In a case that a higher layer parameter availableRB-SetPerCell-r16 is configured, Available RB set Indicator 1, Available RB set Indicator 2, . . . , Available RB set Indicator N;
5C) In a case that a higher layer parameter CO-Duration-PerCell-r16 is configured, COT duration Indicator 1, COT duration Indicator 2, . . . , COT duration Indicator N
5D) In a case that a higher layer parameter searchSpaceSwitching-r16="explicit", Monitoring group flag 1, Monitoring group flag 2, . . . , Monitoring flag M. The value of the N and/or M described above may be a prescribed value that is larger than 1.

Each DCI format may include padding bits so as to match a prescribed bit size (payload size). In other words, one or multiple padding bits may be used to adjust each DCI format indicated by the DCI format identification field to have the same size.

DCI format 2 may include a parameter that is used for transmission power control of the PUSCH or the PUCCH.

In various aspects of the present embodiment, unless otherwise specifically noted, the number of resource blocks (RBs) indicates the number of resource blocks in the frequency domain. The indexes of the resource blocks are assigned in ascending order from the resource block mapped to a low frequency domain to the resource block mapped to a high frequency domain. The resource block is a general term for a common resource block and a physical resource block.

One physical channel may be mapped to one serving cell. One physical channel may be mapped to one CBP that is configured for one carrier included in one serving cell.

The terminal apparatus 1 is given one or multiple control resource sets (CORESETs). The terminal apparatus 1 monitors the PDCCH in the one or multiple CORESETs.

The CORESET may indicate the time frequency domain to which one or multiple PDCCHs may be mapped. The CORESET may be a domain in which the terminal apparatus 1 monitors the PDCCH. The CORESET may include contiguous resources (Localized resources). The CORESET may include non-contiguous resources (distributed resources).

In the frequency domain, a unit of mapping of the CORESET may be a resource block (RB). For example, in the frequency domain, a unit of mapping of the CORESET may be 6 resource blocks. In other words, mapping of the CORESET in the frequency domain may be performed in 6 RBs×n (n is 1, 2, . . . ). In the time domain, a unit of mapping of the CORESET may be an OFDM symbol. For example, in the time domain, the unit of mapping of the CORESET may be one OFDM symbol.

The frequency domain of the CORESET may be given based at least on a higher layer signaling and/or DCI.

The time domain of the CORESET may be given based at least on a higher layer signaling and/or DCI.

A certain CORESET may be a Common CORESET. The common CORESET may be a CORESET that is configured for multiple terminal apparatuses 1 in common. The common CORESET may be given based at least on a part or all of an MIB, an SIB, common RRC signaling, and a cell ID. For example, the time resource and/or the frequency resource of the CORESET in which monitoring of the PDCCH used for scheduling of the SIB is configured may be given based at least on the MIB.

A certain CORESET may be a Dedicated CORESET. The dedicated CORESET may be a CORESET that is configured to be used dedicatedly for the terminal apparatus 1. The dedicated CORESET may be given based at least on dedicated RRC signaling.

A set of candidates of the PDCCH monitored by the terminal apparatus 1 may be defined from the perspective of a search space. In other words, the set of PDCCH candidates monitored by the terminal apparatus 1 may be given by a search space.

The search space may include one or multiple PDCCH candidates of one or multiple aggregation levels (ALs). The aggregation level of the PDCCH candidates may indicate the number of CCEs constituting the PDCCH.

The terminal apparatus 1 may monitor at least one or multiple search spaces in the slot in which DRX (Discontinuous reception) is not configured. DRX may be given based at least on a higher layer parameter. The terminal apparatus 1 may monitor at least one or multiple Search space sets in the slot in which DRX is not configured.

The search space set may at least include one or multiple search spaces. The type of the search space set may be any one of a Type-0 PDCCH common search space, a Type-0A PDCCH common search space, a Type-1 PDCCH common search space, a Type-2 PDCCH common search space, a Type-3 PDCCH common search space, and/or a UE-specific PDCCH search space.

The Type-0 PDCCH common search space, the Type-0A PDCCH common search space, the Type-1 PDCCH common search space, the Type-2 PDCCH common search space, and the Type-3 PDCCH common search space may also be referred to as a Common Search Space (CSS). The UE-specific PDCCH search space may also be referred to as a UE specific Search Space (USS).

Each of the search space sets may be related to one control resource set. Each of the search space sets may be at least included in one control resource set. For each of the search space sets, the index of the control resource set related to the search space set may be given.

The higher layer parameter SearchSpace may be used to configure one or multiple search spaces as one set. The one or multiple search spaces configured by the SearchSpace may be referred to as a search space set.

The type 0 PDCCH common search space may be at least used for a DCI format that carries a Cyclic Redundancy Check (CRC) sequence scrambled with a System Information-Radio Network Temporary Identifier (SI-RNTI). Configuration of the type 0 PDCCH common search space may be given based at least on 4 bits of Least Significant Bits (LSB) of a higher layer parameter PDCCH-ConfigSIB1. The higher layer parameter PDCCH-ConfigSIB1 may be included in the MIB. The configuration of the type 0 PDCCH common search space may be given based at least on a higher layer parameter SearchSpaceZero. Interpretation of the bits of the higher layer parameter SearchSpaceZero may be similar to interpretation of the 4 bits of the LSB of the higher layer parameter PDCCH-ConfigSIB1. The configuration of the type 0 PDCCH common search space may be given based at least on a higher layer parameter SearchSpaceSIB1. The higher layer parameter SearchSpaceSIB1 may be included in a higher layer parameter PDCCH-ConfigCommon. The PDCCH detected in the type 0 PDCCH common search space may be at least used for scheduling of the PDSCH that is transmitted including the SIB1. The SIB1 is a type of SIB. The SIB1 may include scheduling information of the SIB other than the SIB1. The terminal apparatus 1 may receive the higher layer parameter PDCCH-ConfigCommon in EUTRA. The terminal apparatus 1 may receive the higher layer parameter PDCCH-ConfigCommon in the MCG. These common search spaces may be referred to as a Type-0 PDCCH CSS set.

The Type-0A PDCCH common search space may be at least used for the DCI format with a Cyclic Redundancy Check (CRC) sequence scrambled with a System Information-Radio Network Temporary Identifier (SI-RNTI). Configuration of the type 0a PDCCH common search space may be given based at least on a higher layer parameter SearchSpaceOtherSystemInformation. The higher layer parameter SearchSpaceOtherSystemInformation may be included in the SIB1. The higher layer parameter SearchSpaceOtherSystemInformation may be included in the higher layer parameter PDCCH-ConfigCommon. The PDCCH detected in the type 0 PDCCH common search space may be at least used for scheduling of the PDSCH that is transmitted including the SIB other than the SIB1. These common search spaces may be referred to as a Type-0A PDCCH CSS set.

The Type-1 PDCCH common search space may be at least used for a DCI format that carries a CRC sequence scrambled with a Random Access-Radio Network Temporary Identifier (RA-RNTI) and/or a CRC sequence scrambled with a Temporary Common-Radio Network Temporary Identifier (TC-RNTI). The RA-RNTI may be given based at least on time/frequency resources of the random access preamble that is transmitted by the terminal apparatus 1. The TC-RNTI may be given by the PDSCH (also referred to as a random access message 2, message 2 (Msg2), or a random access response (RAR)) that is scheduled by the DCI format carrying the CRC sequence scrambled with the RA-RNTI. The Type-1 PDCCH common search space may be given based at least on a higher layer parameter ra-SearchSpace. The higher layer parameter ra-SearchSpace may be included in the SIB1. The higher layer parameter ra-SearchSpace may be included in the higher layer parameter PDCCH-ConfigCommon. These common search spaces may be referred to as a Type-1 PDCCH CSS set.

The Type-2 PDCCH common search space may be used for a DCI format that carries a CRC sequence scrambled with a Paging—Radio Network Temporary Identifier (P-RNTI). The P-RNTI may be at least used for transmission of the DCI format including information for notifying of a change of the SIB. The Type-2 PDCCH common search space may be given based at least on a higher layer parameter PagingSearchSpace. The higher layer parameter PagingSearchSpace may be included in the SIB1. The higher layer parameter PagingSearchSpace may be included in the higher layer parameter PDCCH-ConfigCommon. These common search spaces may be referred to as a Type-2 PDCCH CSS set.

The Type-3 PDCCH common search space may be used for a DCI format that carries a CRC sequence scrambled with a Cell-Radio Network Temporary Identifier (C-RNTI). The C-RNTI may be given based at least on the PDSCH (which may also be referred to as a random access message 4, message 4 (Msg4), or contention resolution) that is scheduled by the DCI format carrying the CRC sequence scrambled with the TC-RNTI. The Type-3 PDCCH common search space may be a search space set given in a case that a higher layer parameter SearchSpaceType is set to 'common'. These common search spaces may be referred to as a Type-3 PDCCH CSS set.

The UE-specific PDCCH search space may be at least used for a DCI format that carries a CRC sequence scrambled with a C-RNTI. These UE-specific search spaces may be referred to as a PDCCH USS set.

In a case that the C-RNTI is given to the terminal apparatus 1, the Type-0 PDCCH common search space, the Type-0A PDCCH common search space, the Type-1 PDCCH common search space, and/or the Type-2 PDCCH common search space may be at least used for the DCI format with the CRC sequence scrambled with the C-RNTI.

In a case that the C-RNTI is given to the terminal apparatus 1, the search space set given based at least on any one of the higher layer parameter PDCCH-ConfigSIB1, the higher layer parameter SearchSpaceZero, the higher layer parameter SearchSpaceSIB1, the higher layer parameter SearchSpaceOtherSystemInformation, the higher layer parameter ra-SearchSpace, the higher layer parameter PagingSearchSpace, or the higher layer parameter SearchSpace may be at least used for the DCI format with the CRC sequence scrambled with the C-RNTI.

The common CORESET may at least include one or both of the CSS and the USS. The dedicated CORESET may at least include one or both of the CSS and the USS.

The physical resources of the search space include configuration units (Control Channel Elements (CCEs)) of a control channel. The CCE includes six Resource Element Groups (REGs). The REG may include one OFDM symbol of one Physical Resource Block (PRB). In other words, the REG may include 12 Resource Elements (REs). The PRB may also be simply referred to as a resource block (RB).

The PDSCH is at least used for transmitting the TB. The PDSCH may be at least used for transmitting the random access message 2 (RAR, Msg2). The PDSCH may be at least used for transmitting system information including a parameter used for initial access.

In FIG. 1, in downlink radio communication, the following downlink physical signals are used. The downlink physical signals need not be used for transmitting information output from a higher layer, but are used by a physical layer.

Synchronization signal

DownLink DeModulation Reference Signal (DL DMRS)

Channel State Information-Reference Signal (CSI-RS)

DownLink Phase Tracking Reference Signal (DL PTRS)

Tracking Reference Signal (TRS)

The synchronization signal is used by the terminal apparatus 1 to establish synchronization with a downlink frequency domain and/or time domain. Note that the synchronization signal includes a Primary Synchronization Signal (PSS) and a Secondary Synchronization Signal (SSS).

The SSB (SS/PBCH block) at least includes a part or all of the PSS, the SSS, and the PBCH. The antenna port of each of a part or all of the PSS, the SSS, and the PBCH included in the SS block may be the same. A part or all of the PSS, the SSS, and the PBCH included in the SSB may be mapped to OFDM symbols. The CP configuration of each of a part or all of the PSS, the SSS, and the PBCH included in the SSB may be the same. The same value may be applied to the SCS configuration μ for each of a part or all of the PSS, the SSS, and the PBCH included in the SSB.

The DL DMRS is related to transmission of the PBCH, the PDCCH, and/or the PDSCH. The DL DMRS is multiplexed on the PBCH, the PDCCH, and/or the PDSCH. In order to channel compensation of the PBCH, the PDCCH, or the PDSCH, the terminal apparatus 1 may use the DL DMRS corresponding to the PBCH, the PDCCH, or the PDSCH. In the following, concurrent transmission of the PBCH and the DL DMRS related to the PBCH may be referred to as transmission of the PBCH. Concurrent transmission of the PDCCH and the DL DMRS related to the PDCCH may be simply referred to as transmission of the PDCCH. Concurrent transmission of the PDSCH and the DL DMRS related to the PDSCH may be simply referred to as transmission of the PDSCH. The DL DMRS related to the PBCH may also be referred to as a DL DMRS for the PBCH. The DL DMRS related to the PDSCH may also be referred to as a DL DMRS for the PDSCH. The DL DMRS related to the PDCCH may also be referred to as a DL DMRS related to the PDCCH.

The DL DMRS may be a reference signal that is configured individually for the terminal apparatus 1. The sequence of the DL DMRS may be given based at least on a parameter that is configured individually for the terminal apparatus 1. The sequence of the DL DMRS may be given based at least on a UE-specific value (for example, the C-RNTI or the like). The DL DMRS may be transmitted individually for the PDCCH and/or the PDSCH.

The CSI-RS may be a signal that is at least used for calculation of the CSI. The CSI-RS may be used for measuring Reference Signal Received Power (RSRP) and Reference Signal Received Quality (RSRQ). The pattern of the CSI-RS assumed by the terminal apparatus 1 may be given at least by a higher layer parameter.

The PTRS may be a signal that is at least used for compensation of phase noise. The pattern of the PTRS assumed by the terminal apparatus 1 may be given based at least on a higher layer parameter and/or DCI.

The DL PTRS may be related to the DL DMRS group at least including an antenna port used for one or multiple DL DMRSs. The fact that the DL PTRS and the DL DMRS group are related to each other may mean that an antenna port of the DL PTRS and a part or all of antenna ports included in the DL DMRS group are at least QCL. The DL DMRS group may be identified based at least on an antenna port having the smallest index in the DL DMRSs included in the DL DMRS group.

The TRS may be a signal that is at least used for synchronization of time and/or frequency. The pattern of the TRS assumed by the terminal apparatus may be given based at least on a higher layer parameter and/or DCI.

The downlink physical channel and the downlink physical signal may also be referred to as a downlink signal. The uplink physical channel and the uplink physical signal may also be referred to as an uplink signal. The downlink signal and the uplink signal may also be collectively referred to as a physical signal or a signal. The downlink physical channel and the uplink physical channel may be collectively referred to as a physical channel. In the downlink, the physical signal may include a part or all of the SSB, the PDCCH (CORESET), the PDSCH, the DL DMRS, the CSI-RS, the DL PTRS, and the TRS. In the uplink, the physical signal may include a part or all of the PRACH, the PUCCH, the PUSCH, the UL DMRS, the UL PTRS, and the SRS. The physical signal may be a signal other than the signals described above. In other words, the physical signal may include one or multiple types of physical channels and/or physical signals, or may include one or multiple physical channels and/or physical signals.

A Broadcast CHannel (BCH), an Uplink-Shared CHannel (UL-SCH), and a Downlink-Shared CHannel (DL-SCH) are transport channels. A channel used in a medium access control (MAC) layer may be referred to as a transport channel. A unit of the transport channel used in the MAC layer may also be referred to as a TB or an MAC PDU. Control of the HARQ is performed for each TB in the MAC layer. The TB is a unit of data that the MAC layer delivers to a physical layer. In the physical layer, the TBs are mapped to codewords, and modulation processing is performed for each codeword.

The base station apparatus 3 and the terminal apparatus 1 exchange (transmit and/or receive) a higher layer signaling in a higher layer. For example, the base station apparatus 3 and the terminal apparatus 1 may transmit and/or receive RRC signaling (RRC message, RRC information, RRC parameter, RRC information element) in a radio resource control (RRC) layer. The base station apparatus 3 and the terminal apparatus 1 may transmit and/or receive an MAC Control Element (CE) in the MAC layer. Here, the RRC signaling and/or the MAC CE is also referred to as a higher layer signaling.

The PUSCH and the PDSCH may be at least used for transmitting the RRC signaling and/or the MAC CE. Here, the RRC signaling transmitted on the PDSCH from the base station apparatus 3 may be signaling that is common to multiple terminal apparatuses 1 in a serving cell. The signaling common to multiple terminal apparatuses 1 in a serving cell may also be referred to as common RRC signaling. The RRC signaling transmitted on the PDSCH from the base station apparatus 3 may be signaling (which may also be referred to as dedicated signaling or UE specific signaling) that is dedicated to a certain terminal apparatus 1. The signaling dedicated to the terminal apparatus 1 may also be referred to as dedicated RRC signaling. A higher layer parameter specific to a serving cell may be transmitted by using the signaling common to multiple terminal apparatuses 1 in a serving cell or the signaling dedicated to a certain terminal apparatus 1. The UE-specific higher layer parameter may be transmitted by using the signaling dedicated to a certain terminal apparatus 1.

A Broadcast Control CHannel (BCCH), a Common Control CHannel (CCCH), and a Dedicated Control CHannel (DCCH) are logical channels. For example, the BCCH is a channel of a higher layer that is used for transmitting the MIB. The Common Control CHannel (CCCH) is a channel of a higher layer that is used for transmitting common information in multiple terminal apparatuses 1. Here, the CCCH may be, for example, used for the terminal apparatus 1 that is not in a state of RRC connection. The Dedicated Control CHannel (DCCH) is a channel of a higher layer that is at least used for transmitting control information (dedicated control information) that is dedicated to the terminal apparatus 1. Here, the DCCH may be, for example, used for the terminal apparatus 1 that is in a state of RRC connection.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

In the following, a configuration example of the terminal apparatus 1 according to an aspect of the present embodiment will be described.

Figure 11:
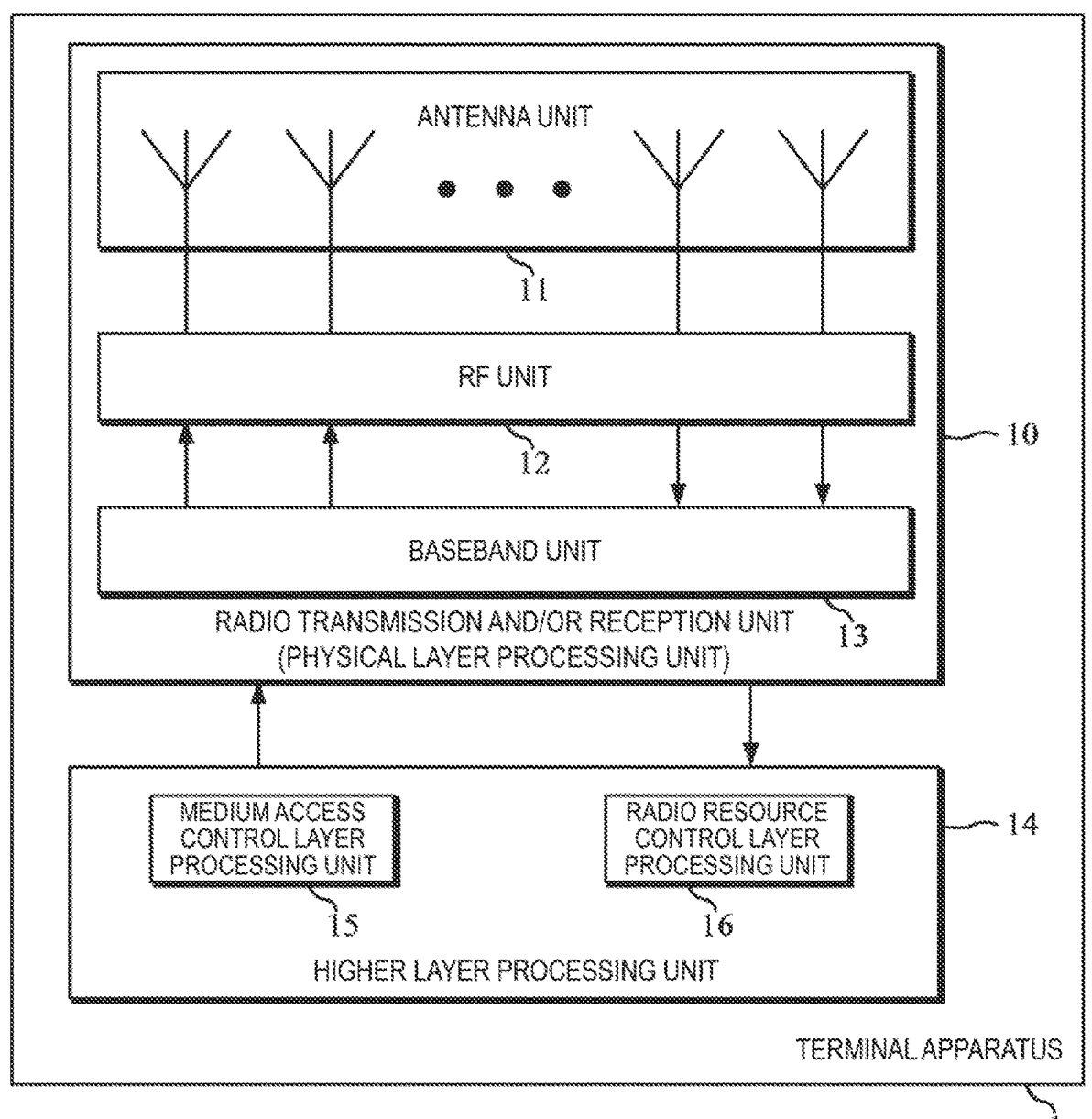
FIG. 11 is a schematic block diagram illustrating a configuration of a terminal apparatus 1 according to an aspect of the present embodiment.

FIG. 11 is a schematic block diagram illustrating a configuration of the terminal apparatus 1 according to an aspect of the present embodiment. As illustrated in the figure, the terminal apparatus 1 includes a radio transmission and/or reception unit 10 and a higher layer processing unit 14. The radio transmission and/or reception unit 10 at least includes a part or all of an antenna unit 11, a Radio Frequency (RF) unit 12, and a baseband unit 13. The higher layer processing unit 14 at least includes a part or all of a medium access control layer processing unit 15 and a radio resource control layer processing unit 16. The radio transmission and/or reception unit 10 may also be referred to as a transmitter, a receiver, a physical layer processing unit, and/or a lower layer processing unit.

The higher layer processing unit 14 outputs uplink data (TB, UL-SCH) generated through operation of a user or the like to the radio transmission and/or reception unit 10. The higher layer processing unit 14 performs processing of a MAC layer, a packet data convergence protocol (PDCP) layer, a radio link control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 performs management of various pieces of configuration information/parameters of its apparatus. The radio resource control layer processing unit 16 sets various pieces of configuration information/parameters, based on a higher layer signaling received from the base station apparatus 3. Specifically, the radio resource control layer processing unit 16 sets various pieces of configuration information/parameters, based on information indicating the various pieces of configuration information/parameters received from the base station apparatus 3. The parameters may be higher layer parameters and/or information elements.

The radio transmission and/or reception unit 10 performs processing of the physical layer, such as modulation, demodulation, coding, and decoding. The radio transmission and/or reception unit 10 separates, demodulates, and decodes a received physical signal, and outputs the decoded information to the higher layer processing unit 14. Such processing may be referred to as reception processing. The radio transmission and/or reception unit 10 performs modulation, coding, and baseband signal generation of data (conversion into a time continuous signal) to generate a physical signal (uplink signal), and transmits the physical signal to the base station apparatus 3. Such processing may be referred to as transmission processing.

The RF unit 12 converts a signal received through the antenna unit 11 into a baseband signal by means of orthogonal demodulation (down conversion), and removes an unnecessary frequency component. The RF unit 12 outputs a processed analog signal to the baseband unit.

The baseband unit 13 converts the analog signal input from the RF unit 12 into a digital signal. The baseband unit 13 removes a part corresponding to a CP from the converted digital signal, performs fast Fourier transform (FFT) on the signal from which the CP has been removed, and extracts a signal of the frequency domain.

The baseband unit 13 performs inverse fast Fourier transform (IFFT) on data to generate an OFDM symbol, adds a CP to the generated OFDM symbol, generates a baseband digital signal, and converts the baseband digital signal into an analog signal. The baseband unit 13 outputs the converted analog signal to the RF unit 12.

The RF unit 12 removes an unnecessary frequency component from the analog signal input from the baseband unit 13 by using a low-pass filter, up-converts the analog signal into a signal of a carrier frequency, and transmits the up-converted signal through the antenna unit 11. The RF unit 12 amplifies power. The RF unit 12 may have a function of controlling transmission power. The RF unit 12 is also referred to as a transmission power control unit.

In the following, a configuration example of the base station apparatus 3 according to an aspect of the present embodiment will be described.

Figure 12:
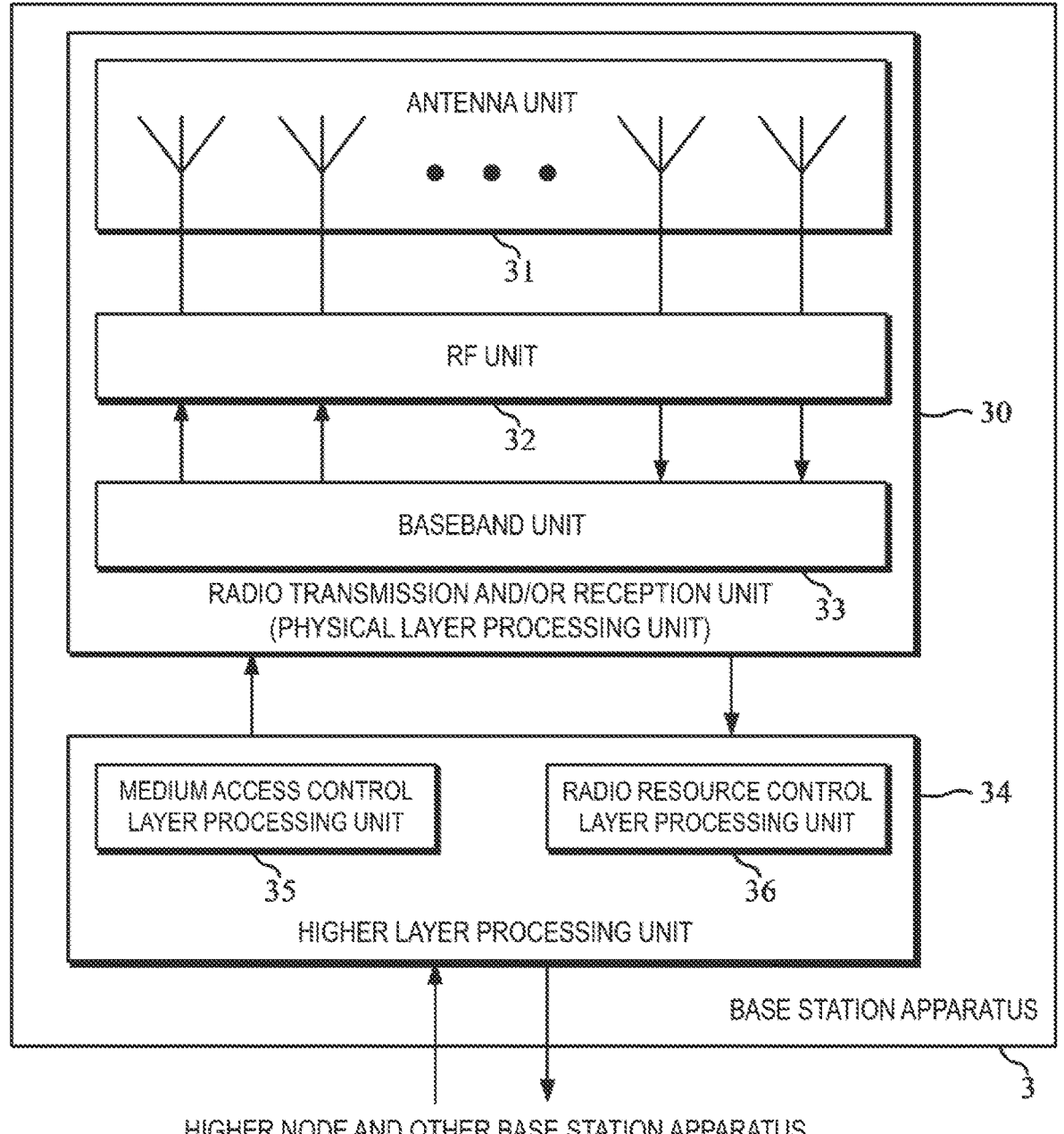
FIG. 12 is a schematic block diagram illustrating a configuration of a base station apparatus 3 according to an aspect of the present embodiment.

FIG. 12 is a schematic block diagram illustrating a configuration of the base station apparatus 3 according to an aspect of the present embodiment. As illustrated in the figure, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, or a physical layer processing unit.

The higher layer processing unit 34 performs processing of an MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (TB, DL-SCH), system information, an RRC message, a MAC CE, and the like to be mapped to the PDSCH, and outputs them to the radio transmission and/or reception unit 30. The radio resource control layer processing unit 36 performs management of various pieces of configuration information/parameters of each of the terminal apparatuses 1. The radio resource control layer processing unit 36 may set various pieces of configuration information/parameters for each of the terminal apparatuses 1 through a higher layer signaling. Specifically, the radio resource control layer processing unit 36 transmits or broadcasts information indicating the various pieces of configuration information/parameters.

The basic function of the radio transmission and/or reception unit 30 is similar to that of the radio transmission and/or reception unit 10, and thus description thereof will be omitted. A physical signal generated in the radio transmission and/or reception unit 30 is transmitted to the terminal apparatus 1 (in other words, transmission processing is performed). The radio transmission and/or reception unit 30 performs reception processing of the received physical signal.

The medium access control layer processing unit 15 and/or 35 may be referred to as a MAC entity.

Each of the units denoted by the reference sign 10 to reference sign 16 included in the terminal apparatus 1 may be configured as a circuit. Each of the units denoted by the reference sign 30 to the reference sign 36 included in the base station apparatus 3 may be configured as a circuit. A part or all of the units denoted by the reference sign 10 to reference sign 16 included in the terminal apparatus 1 may be configured as a memory and a processor connected to the memory. A part or all of the units denoted by the reference sign 30 to the reference sign 36 included in the base station apparatus 3 may be configured as a memory and a processor connected to the memory. Various aspects (operation, processing) according to the present embodiment may be implemented (performed) in the memory and the processor connected to the memory included in the terminal apparatus 1 and/or the base station apparatus 3.

Figure 13:
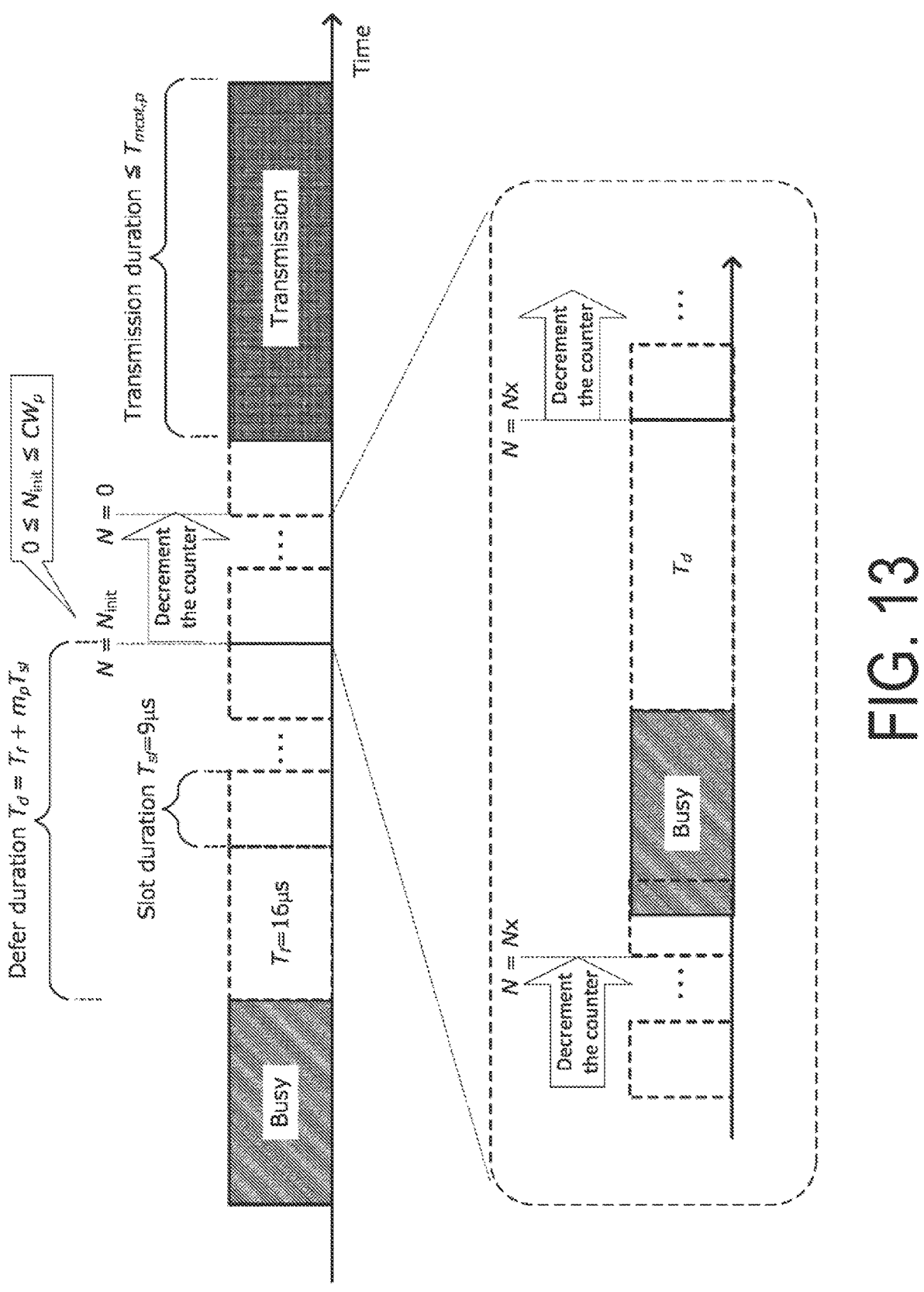
FIG. 13 is a diagram illustrating an example of a channel access procedure (CAP) according to an aspect of the present embodiment.

FIG. 13 is a diagram illustrating an example of a channel access procedure (CAP) according to an aspect of the present embodiment. In a case that the terminal apparatus 1 or the base station apparatus 3 determines idle (clear, free, communication is not performed, a specific physical signal is not transmitted, power (energy) of a specific physical signal is not detected, detected (measured) power (energy) or total power does not exceed a prescribed threshold) for a prescribed period in a carrier (in other words, an NR-U carrier), a BWP (in other words, an NR-U BWP), or a channel (in other words, an NR-U channel) in which energy detection is performed before a prescribed physical signal is transmitted and in which NR-U cell transmission is performed, the terminal apparatus 1 or the base station apparatus 3 may transmit a physical signal in the carrier, the BWP, or the channel. In other words, in a case that the terminal apparatus 1 or the base station apparatus 3 performs communication in the NR-U cell, the terminal apparatus 1 or the base station apparatus 3 performs Clear Channel Assessment (CCA) or channel measurement for confirming that the NR-U cell is idle for the prescribed period. The prescribed period may be determined based on a delay period $T_d$, a counter N, and a CCA slot period $T_{sl}$. Note that to be "not idle" in a case that CCA is performed may be referred to as "busy". Note that CCA may be performed in the radio transmission and/or reception unit 10 of the terminal apparatus 1 and/or the radio transmission and/or reception unit 30 of the base station apparatus 3. Note that the channel access procedure may include performing CCA for the prescribed period before the terminal apparatus 1 or the base station apparatus 3 transmits a physical signal in a certain channel. A procedure in which energy detection is performed in order to determine whether or not a channel is idle before a physical signal is transmitted as described above, or a procedure in which whether or not a channel is idle is determined and a physical signal is transmitted in a case that the channel is idle may be referred to as a channel access procedure, and/or a CCA procedure, and/or a Listen Before Talk (LBT) procedure. Here, the NR-U cell may be an NR-U carrier and/or an NR-U BWP and/or an NR-U channel, and may at least include a frequency band that can be used for transmission of a physical signal of NR-U. In other words, the NR-U cell, the NR-U carrier, the NR-U BWP, and the NR-U channel may mean the same. In the present embodiment, the NR-U cell may be interpreted as the NR-U carrier, the NR-U BWP, and/or the NR-U channel. The NR-U cell may include at least one of the NR-U carrier, the NR-U BWP, and the NR-U channel. The NR cell may include at least one of the NR carrier, the NR BWP, and the NR channel.

Here, in one NR-U operating band, in a case that the base station apparatus 3 and/or the terminal apparatus 1 can perform (have capability of performing) a multi-carrier access procedure (CAP for each of the multi-carriers), multiple carriers (NR-U carriers) and/or multiple BWPs (NR-U BWPs) may be configured for one NR-U cell.

The prescribed period is a period in which the counter N is 0 in a channel in which the state of being idle is first sensed in a delay period after detection of a signal other than its apparatus. The terminal apparatus 1 or the base station apparatus 3 can transmit a signal after the value of the counter N reaches 0. Note that, in a case that it is determined to be busy in a CCA slot period, decrement of the counter N may be deferred. An initial value $N_{int}$ of the counter N may be determined based on a value of a channel access priority class and a value (Contention Window size (CWS)) of its corresponding $CW_p$. For example, the value of $N_{int}$ may be determined based on a random function that is uniformly distributed among values of 0 to $CW_p$. With the value of $CW_p$ being updated, a possible value (a range of the value) of $N_{int}$ may be increased.

In a case that the terminal apparatus 1 or the base station apparatus 3 transmits one or multiple physical signals in the NR-U cell, the terminal apparatus 1 or the base station apparatus 3 sets the value of the counter N to $N_{int}$.

In a case that the value of N is larger than 0 and the terminal apparatus 1 or the base station apparatus 3 determines clear in one CCA slot period, the terminal apparatus 1 or the base station apparatus 3 sets the value of N to N−1. In other words, in a case that the terminal apparatus 1 or the base station apparatus 3 determines clear in one CCA slot period, the terminal apparatus 1 or the base station apparatus 3 may decrement the value of the counter N by 1.

In a case that the decremented value of N reaches 0, the terminal apparatus 1 or the base station apparatus 3 may stop CCA in the CCA slot period. Otherwise, that is, in a case that the value of N is larger than 0, the terminal apparatus 1 or the base station apparatus 3 may continuously perform CCA of the CCA slot period until the value of N reaches 0.

In a case that the terminal apparatus 1 or the base station apparatus 3 performs CCA, determines idle, and the value of N is 0 in an added CCA slot period, the terminal apparatus 1 or the base station apparatus 3 can transmit a physical signal.

In a case that the terminal apparatus 1 or the base station apparatus 3 may perform CCA until the terminal apparatus 1 or the base station apparatus 3 determines busy in an added delay period, or determines idle in all of the slots in the added delay period. In a case that the terminal apparatus 1 or the base station apparatus 3 determines idle and the value of N is 0 in the added delay period, the terminal apparatus 1 or the base station apparatus 3 can transmit a physical signal. In a case that the terminal apparatus 1 or the base station apparatus 3 determines busy in the added delay period, the terminal apparatus 1 or the base station apparatus 3 may continuously perform CCA.

The channel access procedure that is variable based on information in which a value p of CAPC and a value of $CW_p$ are configured and a condition may be referred to as a Type-1 channel access procedure (Type-1 CAP), and a channel access procedure in which the value of $CW_p$ is constantly 0, the counter N corresponding to the value of $CW_p$ is not used, or CCA is performed only once before transmission may be referred to as a Type-2 channel access procedure (Type-2 CAP). In other words, the Type-1 channel access procedure refers to a channel access procedure in which the period of CCA changes depending on the value of $CW_p$ updated based on a configured value p of CAPC and a condition. The Type-2 channel access procedure refers to a channel access procedure in which transmission can be performed in a case that CCA is performed only once before transmission of a physical signal and it is determined that a channel (frequency band) on which a physical signal is transmitted is idle. Here, "before transmission" may include "immediately before transmission". In a case that the channel access procedure has not completed before transmission of a physical signal, the terminal apparatus 1 and/or the base station apparatus 3 may perform or defer transmission of the physical signal at the transmission timing. A channel access procedure that does not perform CCA before transmission may be referred to as a Type-3 channel access procedure (Type-3 CAP). Whether the channel access procedure is a Type-2 CAP or a Type-3 CAP may be determined based on the higher layer parameter.

Figure 14:
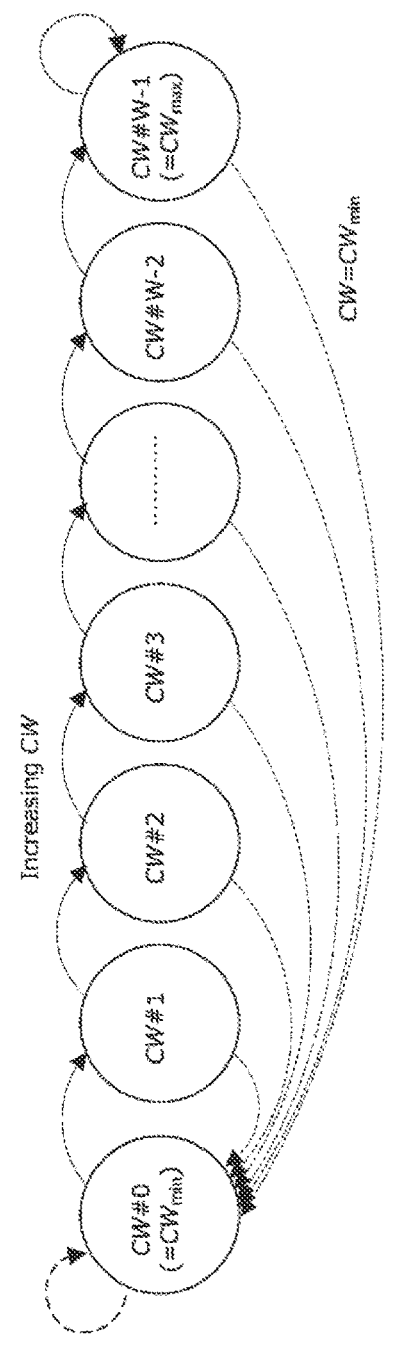
FIG. 14 is a diagram illustrating an example of a channel access priority class (CAPC) and a CW adjustment procedure (CWAP) according to an aspect of the present embodiment.

FIG. 14 is a diagram illustrating an example of a channel access priority class (CAPC) and a CW adjustment procedure according to an aspect of the present embodiment.

The value p of CAPC is used for indicating the number $m_p$ of CCA slot periods $T_{sl}$ included in the delay period $T_d$, a minimum value and a maximum value of the CW, maximum channel occupancy time, and an allowed value of $CW_p$ (CWS). The value p of CAPC may be configured according to priority of the physical signal. The value p of CAPC may be indicated by being included in the DCI format.

The terminal apparatus 1 may adjust the value of the CW for determining the value of $N_{init}$ before setting the value of the counter N to $N_{init}$. Note that, in a case that the random access procedure successfully completes, the terminal apparatus 1 may maintain an updated value of the CW for the random access procedure. In a case that the random access procedure successfully completes, the terminal apparatus 1 may set an updated value of the CW to $CW_{min}$ for the random access procedure. Here, in the present embodiment, $CW_{min}$ may be, for example, CW #0 illustrated in FIG. 14, that is, an initial value of $CW_p$ corresponding to the value p of CAPC. Here, to set the updated value of the CW to $CW_{min}$ may mean to update the value of the CW that is updated in a case that one or multiple prescribed conditions are satisfied to $CW_{min}$. To set the updated value of the CW to $CW_{min}$ may mean to set the value of the CW to $CW_{min}$ again.

The terminal apparatus 1 may adjust the value of the CW for determining the value of $N_{init}$ before setting $N_{init}$ to the value of the counter N corresponding to CCA performed before Msg1 transmission. Note that, in a case that the terminal apparatus 1 considers that the terminal apparatus 1 has succeeded in reception of the Msg2, and/or considers that the terminal apparatus 1 has succeeded in reception of the Msg4, the terminal apparatus 1 may maintain the updated value of the CW. In a case that the terminal apparatus 1 considers that the terminal apparatus 1 has succeeded in reception of the Msg2 and/or considers that the terminal apparatus 1 has succeeded in reception of the Msg4, the terminal apparatus 1 may set the updated value of the CW to $CW_{min}$.

Here, to adjust the value of the CW may mean that the value is incremented by one stage at a time until the value reaches $CW_{max}$ from $CW_{min}$ in a case that the value of $CW_p$ satisfies a prescribed condition. In a case that the value reaches $CW_{max}$, the value is further incremented by one stage at a time from $CW_{min}$. In other words, to adjust the value of the CW may mean to update the value of $CW_p$. To update the value of $CW_p$ may mean to increment the value of $CW_p$ to a value larger by one stage. For example, this may mean to increment the value from CW #3 to CW #4, or from CW #n−1 to CW #n. The terminal apparatus 1 and/or the base station apparatus 3 may determine the value of $N_{init}$ based on a random function that is uniformly distributed between 0 and the updated value of $CW_p$ every time the value of the CW is adjusted.

The value p of the channel access priority class (CAPC) applied to transmission of the Msg1 may be determined based on system information, may be determined based on a higher layer parameter, or may be associated with the SSB. For example, in a case that the value p of CAPC corresponding to the Msg1 is P, the value of $N_{init}$ is determined based on a random function that is uniformly distributed between 0 and CW #0.

The value p of CAPC may be individually configured for each of the PUSCH, the PUCCH, and the PRACH. For the value p of CAPC, a common value may be configured as a cell-specific higher layer parameter for the PUSCH, PUCCH, and the PRACH. The value p of CAPC may be configured as an individual higher layer parameter for each of the PUSCH, the PUCCH, and the PRACH. The value p of CAPC for the PUSCH may be indicated by being included in the DCI format used for scheduling of the PUSCH. The value p of CAPC for the PUCCH may be indicated by being included in the DCI format including the PUCCH resource indicator field. The value p of CAPC for the PRACH may be indicated by being included in the DCI format for the PDCCH order. The value p of CAPC for the PRACH may be determined according to the type of the random access procedure. For example, the value p of CAPC for CBRA may be determined based on system information and/or a higher layer parameter. The value p of CAPC for CFRA may be determined based on a higher layer parameter, or may be configured by being included in the DCI format corresponding to the PDCCH order. In CFRA, whether the value p of CAPC is based on a higher layer parameter or based on a field of the DCI format may be determined based on configuration of the system information and/or the higher layer parameter.

In a case that the terminal apparatus 1 transmits a HARQ-ACK for the PDSCH on the PUCCH resources, the type of the channel access procedure for the PUCCH and/or the value p of CAPC may be configured with one or multiple dedicated fields being included in the DCI format used for scheduling of the PDSCH. Note that, in the DCI format, the PUCCH resource indicator field may be included. In other words, the type of the channel access procedure for the PUCCH and/or the value of CAPC may be used for the PUCCH resources indicated by the PUCCH resource indicator field. In a case that the terminal apparatus 1 transmits the SR on the PUCCH resources, the type of the channel access procedure for the PUCCH and/or the value p of CAPC may be configured based on one or multiple higher layer parameters included in PUCCH configuration or SR configuration.

The value p of CAPC may be determined by being associated with transmitted information for the PUSCH and the PUCCH. For example, in a case that transmission is performed including the UCI in the PUSCH or the PUCCH, the value p of CAPC may be individually configured according to the type (the HARQ-ACK, the SR, the CSI, or the like) and a combination of information included in the UCI.

The present embodiment provides description of the value p of CAPC. However, the type of the channel access procedure (CAP) (the Type-1 CAP, the Type-2 CAP, that is, a Channel Access Type (CAT)), the value of the CW, and/or the value of $T_{mcot}$ may be configured similarly as well. For CAT, CAT1 may indicate the Type-1 CAP, and CAT2 may indicate the Type-2 CAP.

For example, in the DCI format (DCI formats 0_0, 0_1, 1_0, and 1_1) used for scheduling of the PDSCH and the PUSCH and resource allocation of the PRACH in the NR-U cell, in order to perform the channel access procedure, a part or all of the following 8A to 8E may each be included as the field:

8A) Type of the channel access procedure (CAP) (channel access type (CAT));

8B) Value p of the channel access priority class (CAPC);

8C) Maximum channel occupancy time $T_{mcot}$;

8D) Value of CW;

8E) Maximum number m of CCA slot periods.

For the PUCCH, each of some of all of 8A to 8E may be a prescribed value, or may be determined based on the higher layer parameters.

In a case that the PUCCH resource indication field is included in the DCI format (1_0, 1_1) used for scheduling of the PDSCH in addition to the part or all of the 8A to 8E above, the channel access procedure before transmission of the PUCCH for the HARQ-ACK of the PDSCH may be performed based on at least one of 8A to 8E above included in the DCI format.

In a case that the received DCI format indicates resource allocation of the random access preamble, that is, in a case that the PDCCH order is received, and a part or all of 8A to 8E above is included in the PDCCH order, the channel access procedure before transmission of the random access preamble may be performed based on the part or all of 8A to 8E above included in the PDCCH order.

In a case that the SR is transmitted on the PUCCH in the NR-U carrier, a part or all of 8A to 8E above may be included in the PUCCH configuration or the SR configuration. In other words, in a case that the channel access procedure is performed for the PUCCH including the SR, a parameter for the channel access procedure may be configured based on a higher layer parameter. In a case that the channel access procedure is performed for the PUCCH including the SR, the parameter for the channel access procedure may be transmitted and configured from the base station apparatus 3 to the terminal apparatus 1 through an RRC layer signal.

Next, HARQ operation according to the present embodiment will be described.

The MAC entity of the terminal apparatus 1 may include at least one HARQ entity for each serving cell. At least one HARQ entity can maintain a large number of HARQ processes in parallel. Each of the HARQ processes may be associated with one HPID. The HARQ entity guides the HARQ information and a related TB received in the DL-SCH to one or multiple corresponding HARQ processes.

The number (maximum number) of the DL HARQ processes that can be performed in parallel for each HARQ entity may be configured based on a higher layer parameter (for example, an RRC parameter), or may be a default value in a case that the higher layer parameter is not received. A dedicated broadcast HARQ process may be used for the BCCH. Note that a broadcast HARQ process may be referred to as a broadcast process.

In a case that downlink spatial multiplexing is not configured for the physical layer, the HARQ process supports one TB. In a case that downlink spatial multiplexing is configured for the physical layer, the HARQ process supports one or two TBs.

Regarding the MAC entity of the terminal apparatus 1, in a case that a higher layer parameter pdsch-AggregationFactor having a value of greater than 1 is configured, pdsch-AggregationFactor may provide the number of transmissions of the TB in a bundle of dynamic downlink assignments. Bundling operation (HARQ-ACK bundling operation) depends on the HARQ entity for calling (starting) the same HARQ process for each transmission being a part of the same bundle. After initial transmission, retransmission of the HARQ having a value less than the value configured by pdsch-AggregationFactor by 1 (in other words, pdsch-AggregationFactor−1) may be continued in the bundle.

In a case that downlink assignment is indicated, the MAC entity of the terminal apparatus 1 may allocate one or multiple TBs and related HARQ information received from the physical layer to the HARQ process indicated by the related HARQ information. In a case that downlink assignment is indicated for the broadcast HARQ process, the MAC entity of the terminal apparatus 1 may allocate the received TB to the broadcast HARQ process.

In a case that transmission is performed for the HARQ process, the HARQ information related to one or (case of downlink spatial multiplexing) two TBs may be received from the HARQ entity.

For each of the received TBs and the related HARQ information, in a case that the NDI is provided, and the NDI is toggled in comparison to a value of previously received transmission corresponding to the TB (value of the NDI related to the HPID included in the PDCCH), or the HARQ process corresponds to the broadcast process, and this is the first received transmission for the TB according to system information scheduling indicated by the RRC, or this is genuinely the first received transmission for the TB (in other words, new transmission, with no preceding NDIs (being present) for the TB), the HARQ process (HARQ process related to a certain HPID) considers that the transmission is new transmission. Otherwise, the HARQ process considers that the transmission is retransmission. Note that the previously received transmission may refer to transmission received in the past. Here, the transmission may refer to the TB transmitted from the base station apparatus 3.

In a case that this (received TB) is new transmission, the MAC entity attempts to decode received data (data for the received TB). In a case that this is retransmission and the data for the TB has not yet been successfully decoded, the MAC entity indicates, to the physical layer, concatenation of the latest data in a soft buffer for the TB and the received data and decoding of the concatenated data. In a case that the data that the MAC entity has attempted to decode is successfully decoded for the TB, or the data for the TB has been successfully decoded before, and the HARQ process is the same as the broadcast process, the MAC entity transfers the decoded MAC PDU to a higher layer (the RLC layer, the PDCP layer, and/or the RRC layer). In a case that this is the first successful decoding of the data for the TB, the MAC entity transfers the decoded MAC PDU to a deassembly and demultiplexing entity. Otherwise, the MAC entity indicates, to the physical layer, switching between the data that the MAC entity has attempted to decode and the data in the soft buffer for the TB. In a case that the HARQ process is related to transmission indicated with a TC-RNTI, and contention resolution has not yet succeeded, the HARQ process corresponds to the broadcast process, or timeAlignmentTimer that is related to the TAG including the serving cell in which the HARQ feedback is transmitted stops or expires, the MAC entity indicates, to the physical layer, generation of acknowledgement(s) of the data in the TB. Note that the acknowledgement(s) may be ACK(s) or NACK(s).

In the NR-U cell, in a case that the transmission is considered to be retransmission in the HARQ process, and the physical layer of the terminal apparatus 1 indicated to generate acknowledgement(s) of the data in the TB performs the Type-1 channel access procedure before transmission of the PUCCH or the PUSCH including the HARQ-ACK, the terminal apparatus 1 and/or the MAC entity of the terminal apparatus 1 may update the value of the CW used for $N_{init}$. In the NR-U cell, in a case that the transmission is considered to be new transmission in the HARQ process, and the physical layer of the terminal apparatus 1 indicated to generate acknowledgement(s) of the data in the TB performs the Type-1 channel access procedure before transmission of the PUCCH or the PUSCH including the HARQ-ACK, the terminal apparatus 1 and/or the MAC entity of the terminal apparatus 1 may set the value of the CW used for $N_{init}$ to the initial values of $CW_p$, or need not update the value of the CW (in other words, may maintain the value of the CW). Note that, in a case that the physical layer of the terminal apparatus 1 performs the Type-2 channel access procedure before transmission of the PUCCH or the PUSCH including the HARQ-ACK, the physical layer of the terminal apparatus 1 performs CCA only once before transmission of the PUCCH or the PUSCH including the HARQ-ACK regardless of whether the transmission is new transmission or retransmission, and in a case that the physical layer of the terminal apparatus 1 determines that the NR-U channel is idle, the physical layer of the terminal apparatus 1 may transmit the PUCCH or the PUSCH including the HARQ-ACK.

Here, in a case that there are three types for the configurable allowable values of the CW, namely CW #0, CW #1, and CW #2 (CW #0<CW #1<CW #2), and the value of the CW is CW #0, to update the value of the CW may mean, for example, to update the value of the CW to CW #1 being one higher value. In a case that the value of the CW is CW #1, to update the value of the CW may mean to update the value of the CW to CW #2 being one higher value. In a case that the value of the CW is CW #2 ($CW_{max}$) and there is no value that is one value higher than the value of the CW, to update the value of the CW may include to set to CW #0 ($CW_{min}$) again.

Here, the physical layer may include at least one of a transmitter, a receiver, a radio transmission and/or reception unit, and/or a measuring unit, or may be a physical layer processing unit. The MAC entity may be a MAC layer, or may be a MAC layer processing unit.

In a case that the MAC entity determines that the NDI in the PDCCH for the C-RNTI is toggled in comparison to a value in previous transmission, the MAC entity ignores the NDI received in all of the downlink assignments in the PDCCH for the TC-RNTI.

In a case that the terminal apparatus 1 detects the DCI format used for scheduling of the PDSCH in the NR-U cell in the PDCCH, and the HARQ process ID (HPID) and the NDI are included in the DCI format, the terminal apparatus 1 can determine whether transmission of the PDSCH is new transmission or retransmission, based on whether or not the NDI is toggled for the HPID. In addition, in a case that a field indicating the PUCCH resource is included in the DCI format, whether or not to adjust the value of the CW may be determined based on whether or not the NDI is toggled. For example, in a case that the value of the NDI for the HARQ process related to the first HPID is toggled, the terminal apparatus 1 may set the value of $CW_p$ corresponding to each value p of CAPC to $CW_{min}$, otherwise (in other words, in a case that the value of the NDI is not toggled), the terminal apparatus 1 may increment the value of CW, to one higher allowable value (value of the CW) (in other words, the terminal apparatus 1 may update the value of $CW_p$ (value of the CW)).

In a case that the terminal apparatus 1 generates a HARQ-ACK codebook for the HARQ process related to one or multiple HPIDs, and the value of the NDI is not toggled for at least one of the HPIDs, the terminal apparatus 1 may update the value of the CW for the Type-1 channel access procedure performed before transmission of the PUCCH or the PUSCH including the HARQ-ACK codebook.

In a case that the base station apparatus 3 transmits the PDCCH and the PDSCH including the DCI format used for scheduling of the PDSCH in the NR-U cell, the base station apparatus 3 performs the Type-1 channel access procedure before transmission of the PDCCH and the PDSCH, and in a case that the base station apparatus 3 determines that the NR-U channel is idle in all of the CCA slot periods, the base station apparatus 3 may transmit the PDCCH and the PDSCH, whereas in a case that the base station apparatus 3 determines that the NR-U channel is not idle, the base station apparatus 3 may defer transmission of the PDCCH and the PDSCH until the base station apparatus 3 can determine that the NR-U channel is idle in all of the CCA slot periods.

In a case that the base station apparatus 3 fails to successfully receive the PUCCH or the PUSCH including the HARQ-ACK for the PDSCH even after a prescribed period has elapsed after transmitting the PDCCH and the PDSCH, the base station apparatus 3 may retransmit the PDCCH and the PDSCH. In a case that the base station apparatus 3 retransmits the PDCCH and the PDSCH, the base station apparatus 3 transmits the value of the NDI for the HPID without toggling. In other words, by not toggling the value of the NDI for the HPID, the base station apparatus 3 may indicate that the PDSCH is retransmission. In this case, in a case that the base station apparatus 3 performs the Type-1 channel access procedure, the base station apparatus 3 may update the value of the CW.

Note that, in a case that the base station apparatus 3 successfully receives the PUCCH or the PUSCH including the HARQ-ACK for the PDSCH corresponding to the HARQ process related to the HPID within a prescribed period after transmitting the PDCCH and the PDSCH, the base station apparatus 3 may reset the value of the CW corresponding to the HARQ process for the HPID to $CW_{min}$ In other words, in a case that the base station apparatus 3 performs the channel access procedure before transmission of the PDCCH and the PDSCH in order to toggle the value of the NDI for the HARQ process related to the HPID, the base station apparatus 3 may set the value of the CW to $CW_{min}$. Here, in a case that the base station apparatus 3 can manage the HARQ process related to multiple HPIDs, the base station apparatus 3 may perform the channel access procedure and/or the CW adjustment procedure for each of the HPIDs.

In a case that the base station apparatus 3 transmits the PDSCH scheduled by the PDCCH and the PDCCH, and fails to successfully receive the PUCCH or the PUSCH including the HARQ-ACK (in other words, the HARQ-ACK for the HPID corresponding to the PDSCH) corresponding to the PDSCH within a prescribed period (for example, before a prescribed timer expires), the base station apparatus 3 may update the value of the CW for the PDCCH and the PDSCH. Note that, in a case that the base station apparatus 3 successfully receives the PUSCH including the HARQ-ACK for the HPID corresponding to the PDSCH instead of the PUCCH, the base station apparatus 3 need not update the value of the CW for the PDCCH and the PDSCH.

In a case that the base station apparatus 3 and/or the terminal apparatus 1 considers that the HARQ operation of the HARQ process of a certain HPID has succeeded, the base station apparatus 3 and/or the terminal apparatus 1 may set the updated value of the CW to $CW_{min}$ in relation to the operation.

In a case that the terminal apparatus 1 receives the PDSCH having the same HPID and indicating retransmission after transmitting the HARQ-ACK for the received PDSCH through the PUCCH or the PUSCH or is requested to perform retransmission of the HARQ-ACK for the PDSCH, and performs the Type-1 channel access procedure before transmission of the PUCCH including the HARQ- ACK for the PDSCH, the terminal apparatus 1 may update the value of the CW used for $N_{init}$. In other words, in a case that the terminal apparatus 1 performs the Type-1 channel access procedure before transmission of the PUCCH including the HARQ-ACK for the PDSCH every time retransmission is indicated for the PDSCH of the same HPID, the terminal apparatus 1 may update the value of the CW used for corresponding $N_{init}$.

The SSB and/or the CSI-RS in the NR-U cell may be collectively referred to as an NR-U Discovery Reference Signal (DRS). The NR-U DRS may be detected for the terminal apparatus 1 to confirm whether the NR-U cell is activation or deactivation.

Figure 15:
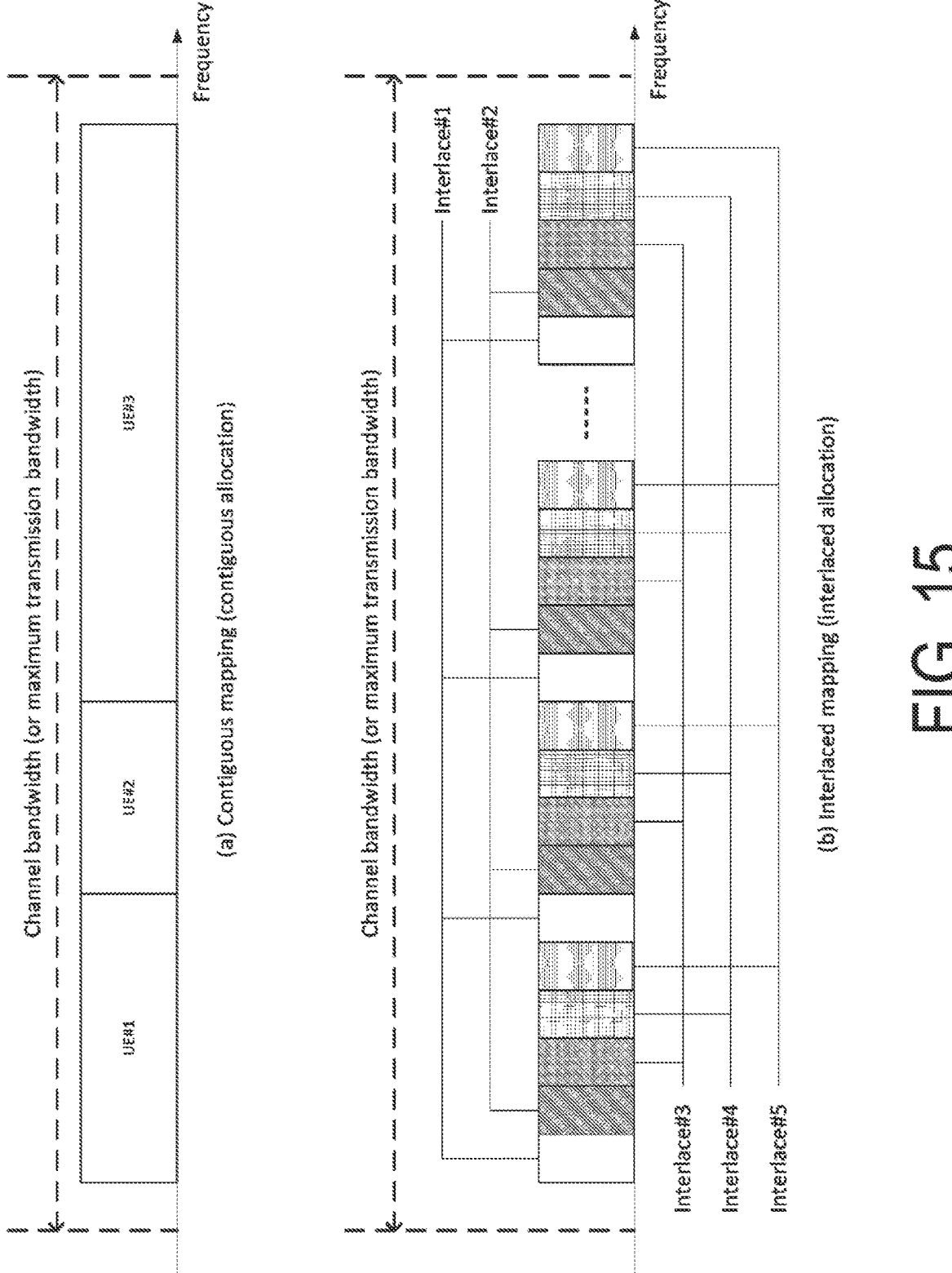
FIG. 15 is a diagram illustrating an example of frequency mapping (resource allocation, mapping to physical resources, frequency resource allocation type) according to the present embodiment.

FIG. 15 is a diagram illustrating an example of frequency mapping (resource allocation, mapping to physical resources, frequency resource allocation type) according to the present embodiment. FIG. 15(a) is an example (contiguous mapping, localized mapping) in which multiple PRBs are contiguously mapped for one terminal apparatus 1 and/or base station apparatus 3. The frequency mapping (frequency resource allocation type) of FIG. 15(a) may be used for implementing low Peak to Average Power Ratio (PAPR) characteristics due to a single carrier of DFT-s-OFDM signals or the like, for example. FIG. 15(b) is an example (interlaced mapping, distributed mapping) in which multiple PRBs are mapped for one terminal apparatus 1 and/or base station apparatus 3 at regular intervals or at irregular intervals. The frequency mapping (frequency resource allocation type) of FIG. 15(b) may be used for implementing 80% or more of the transmission bandwidth (maximum transmission bandwidth, channel bandwidth, carrier bandwidth, BWP bandwidth) with a small number of PRBs in the frequency domain. In other words, the frequency mapping of FIG. 15(b) may be performed for satisfying the Occupied Channel Bandwidth (OCB) requirement. The number of interlaces may be determined according to the SCS. For example, in a case that the SCS is 15 kHz, the number of interlaces may be 10 or 11. In a case that the SCS is 30 kHz, the number of interlaces may be 5 or 6. The number of interlaces may be the maximum multiplexing order of the terminal apparatus 1 in the frequency domain. The number of interlaces may be the same number, regardless of the size of the frequency bandwidth. For example, the number of interlaces may be 10 or 11 in a case that the SCS is 15 kHz, regardless of whether the frequency bandwidth is 20 MHz or 40 MHz. Note that the base station apparatus 3 and/or the terminal apparatus 1 can perform transmission of the physical channel and/or the physical signal by using one or multiple interlaces.

FIG. 16 is a diagram illustrating an example of fields (PUCCH starting position field, PSP field) indicating the transmission starting positions of the PUCCH in the time domain (starting position in the time domain, the starting position in the slot) and the starting position of the PUCCH corresponding to each SCS according to the present embodiment. FIGS. 16(a) and 16(b) illustrate an example of fields (2-bit field, 1-bit field) indicating the transmission starting positions of the PUCCH. The fields are fields used for providing a gap (period) for the terminal apparatus 1 to perform LBT by adjusting transmission timing in a time symbol space. For example, in a case that a value "00" or "0" is set to the fields, this indicates that transmission of the physical channel/physical signal can be performed from the start of the first time symbol space. In a case that a value "01", "10", or "1" is set to the fields, this indicates that transmission of the physical channel/physical signal can be performed from the middle of the first time symbol space. In a case that a value "01" or "1" is set to the fields, this indicates that transmission can be performed from 25 microseconds (us) in the first time symbol space of the PUCCH. For example, regarding the 25 microseconds, the terminal apparatus 1 can perform transmission after performing LBT of 25 microseconds only once. In a case that a value "10" is set to the fields, this indicates that transmission can be performed from (25+Timing Advance (TA)) microseconds (us) in the first time symbol space of the PUCCH. In a case that a value "11" is set to the fields, this indicates that transmission of the physical channel/physical signal can be performed from the next time symbol space. Depending on the value of the SCS, the length of one time symbol space corresponding to the SCS may be shorter than 25 microseconds and/or (25+TA) microseconds. In such a case, in a case that the value "11" is set to the fields, this may indicate an initial time symbol space after the elapse of 25 microseconds or (25+TA) microseconds after the first time symbol space. FIG. 16(c) illustrates an example of the starting position of the PUCCH of each value in a case that the SCS is 15 kHz. FIG. 16(d) illustrates an example of the starting position of the PUCCH of each value in a case that the SCS is 30 kHz.

Now, a reception procedure of a System Information Block Type 1 (SIB1) according to the present embodiment will be described.

The terminal apparatus 1 receives the SIB1 and holds the captured SIB1. In a case that cellAccessRelatedInfo includes an entry with a Public Land Mobile Network (PLMN)-Identity of a selected PLMN, the terminal apparatus 1 may use, in the latter half of the procedure, plmn-IdentityList, trackingAreaCode, and cellIdentity for a cell received in corresponding PLMN-IdentityInfo including the selected PLMN. In a case that the procedure is in the state of RRC_CONNECTED and that a timer T311 is not running, then during the state of RRC_CONNECTED, the terminal apparatus 1 may ignore frequencyBandList received, transfer cellIdentity to one or multiple higher layers, transfer trackingAreaCode to one or multiple higher layers, and apply the configuration included in servingCellConfigCommon.

Instead, in a case that the terminal apparatus 1 supports one or multiple frequency bands indicated by frequency-BandList and that the supported frequency band is a frequency band (e.g., an operating band) corresponding to NR-U and that the terminal apparatus 1 supports at least one additionalSpectrumEmission in NR-NS-PmaxList for a band supported in the downlink and a band supported in the uplink for NR-U and that the terminal apparatus 1 respectively supports the bandwidth of an initial uplink BWP and/or an initial downlink BWP indicated in a locationAndBandwidth field in uplinkConfigCommon and/or downlinkConfigCommon for NR-U, then the terminal apparatus 1 may apply the supported NR-U uplink channel bandwidth with the maximum transmission bandwidth that is equal to or wider than the bandwidth of the initial BWP for the uplink and that is included in carrierBandwidth indicated by uplinkConfigCommon for the SCS of the initial uplink BWP or may apply the supported NR-U downlink channel bandwidth with the maximum transmission bandwidth that is equal to or wider than the bandwidth of the initial BWP for the downlink and that is included in carrierBandwidth indicated by downlinkConfigCommon for the SCS of the initial downlink BWP. The terminal apparatus 1 may select a first frequency band in frequencyBandList supporting at least one of one or multiple additionalSpectrumEmission values in nr-NS-PmaxList (and/or NR-NS-PmaxList), if any, or transfer cellIdentity for the serving cell for NR-U to one or multiple higher layers.

Instead, in a case that the terminal apparatus 1 supports one or multiple frequency bands indicated by frequency-BandList and that the supported frequency band is a frequency band (e.g., an operating band) corresponding to NR-U, then the terminal apparatus 1 may apply the supported NR-U uplink channel bandwidth with the maximum transmission bandwidth that is equal to or wider than the bandwidth of the initial BWP for the uplink and that is included in carrierBandwidth indicated by uplinkConfigCommon for the SCS of the initial uplink BWP or may apply the supported NR-U downlink channel bandwidth with the maximum transmission bandwidth that is equal to or wider than the bandwidth of the initial BWP for the downlink and that is included in carrierBandwidth indicated by downlinkConfigCommon for the SCS of the initial downlink BWP. The terminal apparatus 1 may select a first frequency band in frequencyBandList supporting at least one of one or multiple additionalSpectrumEmission values in nr-NS-PmaxList (and/or NR-NS-PmaxList), if any, or transfer cellIdentity for the serving cell for NR-U to one or multiple higher layers.

Here, the value of the uplink channel bandwidth and the downlink channel bandwidth (i.e., the channel bandwidth) for NR-U may be the value of a prescribed bandwidth (e.g., 20 MHz), may be the value of a bandwidth used for measurement of LBT, may be a value determined based on the configuration of NR-U, may correspond to a value in the frequency domain used for mapping of physical resources for physical channels and/or physical signals for NR-U, or may be a channel bandwidth including the range of PRBs provided by availableRB-RangesPerCell (valid frequency domain, transmission bandwidth, and measurement bandwidth).

Instead, in a case that the terminal apparatus 1 supports one or multiple frequency bands indicated by frequency-BandList for the downlink and/or supports one or multiple frequency bands indicated by frequencyBandList for the uplink for FDD (in other words, the frequency bands are not bands only for the downlink), supports at least one additionalSpectrumEmission in NR-NS-PmaxList for a band supported in the downlink and a band supported for the uplink for FDD, supports the bandwidth of an initial uplink BWP and an initial downlink BWP indicated in a locationAndBandwidth field in each of uplinkConfigCommon and downlinkConfigCommon, supports an uplink channel bandwidth with a maximum transmission bandwidth configuration that is equal to or wider than the bandwidth of the initial uplink BWP and that is equal to or narrower than carrierBandwidth, and supports a downlink channel bandwidth with a maximum transmission bandwidth configuration that is equal to or wider than the bandwidth of the initial downlink BWP and that is equal to or narrower than carrierBandwidth, then the terminal apparatus may apply the supported uplink channel bandwidth with the maximum transmission bandwidth that is equal to or wider than the bandwidth of the initial BWP for the uplink and that is included in carrierBandwidth indicated by uplinkConfigCommon for the SCS of the initial uplink BWP, or may apply the supported downlink channel bandwidth with the maximum transmission bandwidth that is equal to or wider than the bandwidth of the initial BWP for the downlink and that is included in carrierBandwidth indicated by downlinkConfigCommon for the SCS of the initial downlink BWP. The terminal apparatus 1 may select a first frequency band in frequencyBandList supporting at least one of one or multiple additionalSpectrumEmission values in nr-NS-PmaxList (and/or NR-NS-PmaxList), if any.

The terminal apparatus 1 may transfer cellIdentity to one or multiple higher layers.

In a case that trackingAreaCode is provided neither to the selected PLMN nor to the registered PLMN or the PLMN in the same PLMN list, then the terminal apparatus 1 may consider the cell to be barred. In a case that intraFreqReselection is set to notAllowed, the terminal apparatus 1 may consider the cell reselection of another cell at the same frequency as that of the barred cell as notAllowed. Otherwise, the terminal apparatus 1 may consider the cell reselection of another cell at the same frequency as that of the barred cell as Allowed.

Otherwise, the terminal apparatus 1 may transfer trackingAreaCode to one or multiple higher layers.

The terminal apparatus 1 may transfer PLMN Identity to one or multiple higher layers.

In RRC_INACTIVE, in a case that the transferred information is prevented by one or multiple higher layers from triggering the message transmission and that the serving cell does not belong to ran-NotificationAreaInfo configured, then RAN-based Notification Area (RNA) update may be initiated.

ims-EmergencySupport, if any, may be transferred to one or multiple higher layers.

uac-AccessCategory1-SelectionAssistanceInfo, if any, may be transferred to one or multiple higher layers.

The terminal apparatus 1 may apply a configuration included in servingCellCommon.

The terminal apparatus 1 may apply a predefined PCCH configuration.

In a case of including a stored valid version of the SIB required for operation of the cell, the terminal apparatus 1 may use the held version of the required SIB.

In a case that the terminal apparatus 1 does not store the valid version of one of the one or multiple required SIBs, the terminal apparatus 1 may capture an SI message including at least one required SIB and an SI message in which si-BroadcastStatus is set to broadcasting, or may trigger a request for capturing the SI message for the SI message including at least one required SIB and an SI message in which si-BroadcastStatus is set to notbroadcasting, in accordance with si-SchedulingInfo.

The terminal apparatus 1 may apply first listed additionalSpectrumEmission supporting multiple values included in NR-NS-PmaxList in frequencyBandList of uplinkConfigCommon.

In a case that additionalPmax is present in the same entry of selected additionalSpectrumEmission in NR-NS-PmaxList, the terminal apparatus 1 may apply additionalPmax of uplinkConfigCommon to the UL. Otherwise, the terminal apparatus 1 may apply p-Max of uplinkConfigCommon to the UL.

In a case that supplementaryUplink is present in servingCellConfigCommon and that the terminal apparatus 1 supports one or multiple frequency bands in frequencyBandList of supplementary uplink (SUL) and that the terminal apparatus 1 supports at least one additionalSpectrumEmission in NR-NS-PmaxList for a supplementary uplink band supported and that the terminal apparatus 1 supports the bandwidth of the initial uplink BWP indicated in a locationAndBandwidth field of the supplementary uplink and that the terminal apparatus 1 supports the uplink channel bandwidth with a maximum transmission bandwidth configuration that is narrower or equal to carrierBandwidth and that is equal to or wider than the bandwidth of the initial uplink BWP of the SUL, then the terminal apparatus may consider the supplementary uplink to be configured in the serving cell, may apply the uplink channel bandwidth supported with the maximum transmission bandwidth that is included in carrierBandwidth and that is equal to or wider than the bandwidth of the initial uplink BWP of the SUL, or may apply first listed additionalSpectrumEmission supporting one or multiple values included in NR-NS-PmaxList in frequencyBandList for supplementaryUplink.

Here, supplementaryUplink may include at least one parameter associated with the supplementary uplink. In other words, supplementaryUplink may include a configuration required to perform the supplementary uplink.

In a case that the additionalPmax is present in the same entry of selected additionalSpectrumEmission in NR-NS-PmaxList for supplementaryUplink, the terminal apparatus 1 may apply additionalPmax of supplementaryUplink to the SUL, or otherwise, apply p-Max of supplementaryUplink to the SUL.

In a case that nr-Unlicensed is present in servingCellConfigCommon and that the terminal apparatus 1 supports one or multiple frequency bands in frequencyBandList of NR-unlincesed (NR-U) and that the terminal apparatus 1 supports at least one additionalSpectrumEmission in NR-NS-PmaxList for NR-unlicensed band supported and that the terminal apparatus 1 supports the bandwidth of the initial BWP indicated in the locationAndBandwidth field in NR-unlicensed and that the terminal apparatus 1 supports a channel bandwidth with a maximum transmission bandwidth configuration that is equal to or narrower than carrierBandwidth and that is equal to or wider than the bandwidth of the initial BWP of NR-U, then the terminal apparatus may consider NR-unlicensed to be configured in the serving cell, may apply the channel bandwidth supported with the maximum transmission bandwidth that is included in carrierBandwidth and that is equal to or wider than the bandwidth of the initial BWP of NR-U, or may apply first listed additionalSpectrumEmission supporting one or multiple values included in NR-NS-PmaxList in frequencyBandList for nr-Unlicensed. Here, the initial BWP of NR-U may include at least one of the initial uplink BWP and/or the initial downlink BWP.

In a case of not supporting the channel bandwidth with the maximum transmission bandwidth configuration that is equal to or narrower than carrierBandwidth and that is equal to or wider than the bandwidth of the initial BWP of NR-U, the terminal apparatus 1 may apply the channel bandwidth with the maximum transmission bandwidth that is equal to the bandwidth of the initial BWP of NR-U, or may apply first listed additionalSpectrumEmission supporting one or multiple values included in the NR-NS-PmaxList in frequencyBandList for nr-Unlicensed.

Here, nr-Unlicensed may include at least one parameter associated with NR-U. In other words, nr-Unlicensed may include a configuration required to perform NR-U.

In a case that additionalPmax is present in the same entry of selected additionalSpectrumEmission in NR-NS-PmaxList for nr-Unlicensed, the terminal apparatus 1 may apply additionalPmax of nr-Unlicensed to NR-U. Otherwise, p-Max of nr-Unlicensed may be applied to NR-U.

Instead, the terminal apparatus 1 may consider the cell to be barred, or may perform barring in a case that intraFreqReselection is set to notAllowed.

Note that trackingAreaCode may indicate a tracking area code to which the cell indicated by cellIdentity belongs. The presence of that field may indicate that the cell supports at least a standalone operation (per PLMN). The absence of the field may indicate that the cell supports only the EN-DC function (per PLMN).

servingCellConfigCommon is an Information Element (IE) used to configure one or multiple cell-specific parameters for the serving cell for the terminal apparatus 1. The IE includes one or multiple parameters for the terminal apparatus 1 to normally capture the SSB. The IE allows the network (base station apparatus 3) to provide this information through dedicated signaling in a case of configuring the terminal apparatus 1 with one or multiple secondary cells or additional cell groups (i.e., SCG). The IE may be provided to SpCells (MCG and SCG) based on reconfiguration during synchronization (with sync)

downlinkConfigCommon and/or DownlinkConfigCommon may be used to provide one or multiple common downlink parameters for a certain cell. downlinkConfig-Common and/or DownlinkConfigCommon may include frequencyInfoDL and/or initialDownlinkBWP.

frequencyInfoDL may be used to configure one or more basic parameters for downlink carriers and transmissions.

initialDownlinkBWP may be used to indicate an initial downlink BWP configuration for SpCell and SCell. The network may configure locationAndBandwidth for the initial downlink BWP to include CORESET #0 for the entire serving cell in the frequency domain.

uplinkConfigCommon and/or UplinkConfigCommon may be used to provide one or multiple common uplink parameters for a certain cell.

frequencyInfoUL may be used to indicate an absolute uplink frequency configuration and a subcarrier-specific virtual carrier.

initialUplinkBWP may be used to indicate an initial uplink BWP configuration for SpCell and SCell.

frequencyBandList may indicate a list of one or multiple frequency bands that an NR cell reselection parameter applies.

nr-NS-PmaxList and/or NR-NS-PmaxList may be used to provide a list of additionalPmax and additionalSpectrumEmission. In a case that no corresponding field is present (or no value is set), the terminal apparatus may set the value of additionalSpectrumEmission to 0.

locationAndBandwidth indicates the allocation and bandwidth of the BWP in the frequency domain. The value of the field may be interpreted as a Resource Indicator Value (RV). The first PRB (PRB at the beginning of the BWP) may be the PRB determined by subcarrierSpacing of the BWP and offsetToCarrier corresponding to the subcarrier interval.

Now, a HARQ-ACK codebook according to an aspect of the present embodiment will be described.

The HARQ-ACK codebook includes a Type-1 HARQ-ACK codebook, a Type-2 HARQ-ACK codebook, and a Type-3 HARQ-ACK codebook.

The Type-1 HARQ-ACK codebook is applied in a case that the higher layer parameter (RRC parameter) pdsch-HARQ-ACK-Codebook is configured with semi-static. The size of the Type-1 HARQ-ACK codebook may be determined based on the number of serving cells configured for the terminal apparatus 1, the number of SPS PDSCH configurations configured for the terminal apparatus 1 for a serving cell c, and the number of DL slots for the SPS PDSCH in the serving cell c in which the HARQ-ACK information is multiplexed.

The Type-2 HARQ-ACK codebook is applied in a case that the higher layer parameter pdsch-HARQ-ACK-Codebook is configured with dynamic or enhancedDynamic-r16. PDSCH-to-HARQ_feedback timing indicator field provides an applicable value. The size of the Type-2 HARQ-ACK codebook may be determined based on the value of C-DAI and/or T-DAI included in DCI format 1_0 or 1_1. These DCI formats may indicate transmission of HARQ-ACK in the same slot. enhancedDynamic-r16 may be provided by pdsch-HARQ-ACK-Codebook-r16. In a case of being configured with pdsch-HARQ-ACK-Codebook-r16, the terminal apparatus 1 may ignore the value (semi-static, dynamic) set in pdsch-HARQ-ACK-Codebook.

The Type-3 HARQ-ACK codebook is applied in a case that the higher layer parameter pdsch-HARQ-ACK-One-ShotFeedback-r16 is provided. The Type-3 HARQ-ACK codebook may include HARQ-ACK for all HARQ process IDs for all the configured serving cells.

Now, an example of a procedure of the terminal apparatus 1 for reporting (transmitting) the HARQ-ACK according to an aspect of the present embodiment will be described.

The terminal apparatus 1 need not expect to transmit, in one slot, more than one PUCCH with HARQ-ACK information.

For DCI format 1_0, one or multiple values of the PDSCH-to-HARQ_feedback timing indicator field are mapped to $1, 2, 3, 4, 5, 6, 7, 8$). For DCI formats other than DCI format 1_0 scheduling PDSCH reception or SPS PDSCH release, one or multiple values of the PDSCH-to-HARQ_feedback timing indicator field, if any, may be mapped to one or multiple values for a set of a number of slots provided by dl-DataToULACK.

For SPS PDSCH reception ending in a slot n, the terminal apparatus 1 transmits the PUCCH in a slot n+k. For the terminal apparatus 1, in a DCI format activating SPS PDSCH reception, a value indicated by the PDSCH-to-HARQ_feedback timing indicator field, if any, may be applied to k.

In a case of including no PDSCH-to-HARQ_feedback timing indicator field, and activating SPS PDSCH reception ending in the slot n, or detecting the DCI format scheduling the PDSCH, terminal apparatus 1 may provide HARQ-ACK information by PUCCH transmission in the slot n+k. k may be provided by dl-DataToULACK.

For one or multiple slots for PUCCH transmission, in a case of detecting the DCI format scheduling PDSCH reception ending in the slot n or detecting the DCI format indicating SPS PDSCH release via the PDCCH reception ending in the slot n, the terminal apparatus 1 may provide the corresponding HARQ-ACK information by the PUCCH transmission in the slot n+k. k may be provided by the PDSCH-to-HARQ_feedback timing indicator field included in the DCI format, if any, or provided by dl-DataToULACK. Note that k=0 may correspond to the last slot of the PUCCH transmission that overlaps with the PDSCH reception or the PDCCH reception in the case of the SPS PDSCH release.

For PUCCH transmission with HARQ-ACK information, the terminal apparatus 1 determines a set of one or multiple PUCCH resources for $O_{UCI}$UCI information bits including HARQ-ACK information, and then determines one PUCCH resource. The determination of the PUCCH resource is based on the PRI field in the DCI format, if any. In a case that the DCI format includes multiple candidates, the DCI format may be the latest DCI format of the multiple DCI formats including a value of the PDSCH-to-HARQ_feedback timing indicator field or a value of dl-DataToULACK that indicates the same slot.

One or multiple values of the PRI field may be mapped to values of a set of one or multiple PUCCH resource indexes. For a 3-bit PRI field, PUCCH resources may be provided by resourceList for PUCCH resources from a set of PUCCH resources provided by PUCCH-ResourceSet with up to 8 PUCCH resources. In a case that the PRI field includes 1 bit or 2 bits, the value may be mapped to the first two values (0, 1) or the first four values (00, 01, 10, 11), respectively.

In a case that the terminal apparatus 1 detects a first DCI format indicating a first resource (first PUCCH resource) for PUCCH transmission with the corresponding HARQ-ACK information in a certain slot, and subsequently further detects, in the slot, a second DCI format indicating a second resource (second PUCCH resource) for PUCCH transmission with the corresponding HARQ-ACK information and that PDCCH reception including the second DCI format is not earlier than a prescribed period from the start of the first symbol of the first resource for the PUCCH transmission in the slot (in other words, the interval is shorter than the prescribed period), then the terminal apparatus 1 need not expect to multiplex the HARQ-ACK information corresponding to the second DCI format in the PUCCH transmission in the slot. The prescribed period may be determined based on the SCS configuration, and the period corresponding to the SCS (number of symbols).

In a case that the terminal apparatus 1 is provided with one active SPS PDSCH configuration and transmits HARQ-ACK information corresponding to only the PDSCH reception without corresponding PDCCH, a PUCCH resource for corresponding to the PUCCH transmission with the HARQ-ACK information may be provided by n1PUCCH-AN.

In a case of transmitting the HARQ-ACK information using PUCCH format 0, the terminal apparatus 1 determines a value $m_0$ and $m_{CS}$ for calculating the value of a cyclic shift $\alpha$. $m_0$ may be provided by initialCyclicShift of PUCCH-format0, or by an initial cyclic shift index in a case that initialCyclicShift is not provided. $m_{CS}$ may be determined from the value of one HARQ-ACK information bits, or from the values of two HARQ-ACK information bits.

In a case that the terminal apparatus 1 transmits the PUCCH with the HARQ-ACK information by using the PUCCH format 1, the terminal apparatus 1 may be provided by initialCyclicShift of PUCCH-format1 or by the initial cyclic shift index in a case that initialCyclicShift is not provided.

In a case of using PUCCH format 2 or PUCCH format 3 in a PUCCH resource including $M^{PUCCH}_{RB}$PRBs to transmit the PUCCH with $O_{ACK}$HARQ-ACK information bits and $O_{CRC}$ bits, the terminal apparatus 1 may determine the minimum number of PRBs of $M^{PUCCH}_{RB}$ based on $O_{ACK}$+$O_{CRC}$. In this case, the coding rate and the number of symbols may be considered.

In a case that the terminal apparatus 1 is provided with first interlace of $M^{PUCCH}_{Interlace,\ 0}$ by interlace0 in InterlaceAllocation-r16 and uses PUCCH format 2 or PUCCH format 3 to transmit $O_{ACK}$HARQ-ACK information bits and $O_{CRC}$ bits and that $O_{ACK}$+$O_{CRC}$ satisfies a prescribed condition, then the terminal apparatus 1 transmits the PUCCH with the first interlace. Instead, in a case of being provided with a second interlace by interlace1 included in PUCCH-format2 or PUCCH-format3, the terminal apparatus 1 transmits the PUCCH with the first interlace and the second interlace.

Now, an example of a procedure of the terminal apparatus 1 for receiving the PDSCH according to an aspect of the present embodiment will be described.

For the downlink, up to 16 HARQ processes are supported by the terminal apparatus 1 for each cell. The number of processes assumed by the terminal apparatus 1 and configured for the downlink is configured for the terminal apparatus 1 separately for each cell by the higher layer parameter nrofHARQ-ProcessesForPDSCH. In a case that the configuration is not provided, the terminal apparatus 1 may assume the number of processes to be eight as a default number.

Based on detection of the PDCCH with configured DCI format 1_0 or 1_1, the terminal apparatus 1 decodes the PDSCH indicated by the DCI format. For one of one or multiple HARQ process IDs in a certain scheduled cell, the terminal apparatus 1 is not expected to receive another PDSCH temporally overlapping with one PDSCH. The terminal apparatus 1 is not expected to receive another PDSCH of a certain HARQ process until the expected transmission of the HARQ-ACK for the HARQ process ends. In a certain scheduled cell, the terminal apparatus 1 is not expected to receive a first PDSCH in a slot i associated with the corresponding HARQ-ACK allocated to be transmitted in a slot j, and a second PDSCH that is associated with the corresponding HARQ-ACK allocated to be transmitted in a slot immediately preceding the slot j and that is started after the first PDSCH. In a case that for any two of one or multiple HARQ process IDs in a certain scheduled cell, the terminal apparatus 1 is scheduled to initiate reception of a first PDSCH started at a symbol j by the PDCCH ending later than a symbol i, the terminal apparatus 1 is not expected to be scheduled to perform reception of the PDSCH started earlier than the end of the first PDSCH with the PDCCH ending later than the symbol i. In a certain scheduled cell, for one of the PDSCHs corresponding to the SI-RNTI, the terminal apparatus 1 need not be expected to decode retransmission of earlier PDSCH with starting symbols fewer than N symbols succeeding the last symbol of the PDSCH.

In a case that the HARQ-ACK of the expected transmission is determined based on the Type-3 HARQ-ACK codebook, the terminal apparatus 1 may be expected to receive the PDSCH with a HARQ process ID other than the HARQ process ID of the PDSCH scheduled by the PDCCH received before the slot in which the PDCCH including the one shot HARQ-ACK request field is received.

In a specific scheduled cell, in a case that the terminal apparatus 1 is not expected to receive the first PDSCH in the slot i associated with the corresponding HARQ-ACK allocated to be transmitted in the slot j, and the second PDSCH that is associated with the corresponding HARQ-ACK allocated to be transmitted in the slot immediately preceding the slot j and that is started after the first PDSCH, but that the second PDSCH is not scheduled and that the corresponding HARQ-ACK allocated to be transmitted in the slot immediately preceding the slot j is determined by the Type-3 HARQ-ACK codebook, then the terminal apparatus 1 may be expected to receive the first PDSCH. In such a case, the terminal apparatus 1 may transmit the HARQ-ACK of the Type-3 HARQ-ACK codebook. In such a case, the terminal apparatus 1 may transmit the HARQ-ACK in the slot j.

In a specific scheduled cell, in a case that the terminal apparatus 1 is not expected to receive the first PDSCH in the slot i associated with the corresponding HARQ-ACK allocated to be transmitted in the slot j, and the second PDSCH that is associated with the corresponding HARQ-ACK allocated to be transmitted in the slot immediately preceding the slot j and that is started after the first PDSCH, but that the DL-SCH is indicated not to be transmitted on the second PDSCH, then the terminal apparatus 1 may be expected to receive the first PDSCH. In such a case, the terminal apparatus 1 may transmit at least the HARQ-ACK corresponding to the first PDSCH.

In a specific scheduled cell, in a case that the terminal apparatus 1 is not expected to receive the first PDSCH in the slot i associated with the corresponding HARQ-ACK allocated to be transmitted in the slot j, and the second PDSCH that is associated with the corresponding HARQ-ACK allocated to be transmitted in the slot immediately preceding the slot j and that is started after the first PDSCH, but that the DL-SCH is indicated not to be transmitted on the second PDSCH and that the corresponding HARQ-ACK allocated to be transmitted in the slot immediately preceding the slot j is determined by the Type-3 HARQ-ACK codebook, then the terminal apparatus 1 may be expected to receive the first PDSCH. In such a case, the terminal apparatus 1 may transmit the HARQ-ACK of the Type-3 HARQ-ACK codebook. In such a case, the terminal apparatus 1 may transmit the HARQ-ACK in the slot j.

Now, an example of a search space set switching (search space set group switching) according to an aspect of the present embodiment will be described.

For PDCCH monitoring in a certain serving cell indicated by searchSpaceSwitchingGroup-r16, the terminal apparatus 1 may be provided with a group index for each search space set by searchSpaceGroupIdList-r16. In a case that the terminal apparatus 1 is not provided with searchSpaceGroupIdList-r16 for a certain search space set, or for PDCCH monitoring in a serving cell not indicated by searchSpaceSwitchingGroup-r16, a procedure described below need not apply to PDCCH monitoring corresponding to the search space set.

The monitoring periodicity of the search space set (monitoringSlotPeriodicityAndOffset) may be individually configured. For example, the monitoring periodicity of a search space set with group index 0 may differ from the monitoring periodicity of a search space set with group index 1. The monitoring periodicity of the search space set with one of the group indexes may be configured to be longer or shorter.

monitoringSlotPeriodicityAndOffset indicates a slot for PDCCH monitoring configured as periodicity and offset. In a case that DCI format 2_0 is configured for the terminal apparatus 1, only a specific value needs to be configured.

The timer value provided by searchSpaceSwitching-Timer-r16 may be decremented regardless of whether the DL BWP provided with the searchSpaceSwitchingTimer-r16 is active or inactive (deactivated). Alternatively, the terminal apparatus 1 may be provided with a timer value by searchSpaceSwitchingTimer-r16. searchSpaceSwitching-Timer-r16 may be an initial value of the timer value. The timer may be used to switch a group of search space sets. For example, in a case that the timer expires, the terminal apparatus 1 can switch a search space set with a certain group index for PDCCH monitoring to a search space set with another group index.

The terminal apparatus 1 decrements the timer value by one after each slot in the active DL BWP of the serving cell in which the terminal apparatus 1 monitors the PDCCH for detection of DCI format 2_0. In a case that the timer value expires, the terminal apparatus 1 may switch to a default search space set group (e.g., a search space set with a default group index) for PDCCH monitoring in the active DL BWP of the serving cell.

In a case that the search space set switching is applied and that the terminal apparatus 1 is monitoring neither a PDCCH candidate for a search space set with group index 0 nor a PDCCH candidate for a search space set with group index 1, the terminal apparatus 1 may initiate monitoring one or multiple PDCCHs for a search space set with a predefined fixed group index (e.g., group index 0), and need not monitor one or multiple PDCCHs for a search space set with another group index (e.g., group index 1).

In a case that the search space set switching is applied, the terminal apparatus 1 may monitor one or multiple PDCCHs for the search space set with the predefined fixed group index (e.g., group index 0) until at least one of the DCI formats is detected, and need not monitor one or multiple PDCCHs for the search space set with another group index (e.g., group index 1).

In a case that the terminal apparatus 1 is provided with the timer value by searchSpaceSwitchingTimer-r16 and that the timer value is not set yet to the value provided by searchSpaceSwitchingTimer-r16 (has not been set before), the terminal apparatus 1 may monitor one or multiple PDCCHs for the search space set with the predefined fixed group index (e.g., group index 0), and need not monitor one or multiple PDCCHs for the search space set with another group index (e.g., group index 1).

In a case that the terminal apparatus 1 is provided with the timer value by searchSpaceSwitchingTimer-r16 and that the timer value is not set yet to any value (has not been set before), the terminal apparatus 1 may monitor one or multiple PDCCHs for the search space set with the predefined fixed group index (e.g., group index 0), and need not monitor one or multiple PDCCHs for the search space set with another group index (e.g., group index 1).

In a case that the search space set switching is applied, the terminal apparatus 1 may monitor one or multiple PDCCHs for the search space set with the default group index (predefined fixed group index, e.g., group index 0) until at least DCI format 2_0 is detected.

In a case that the search space set switching is applied, the terminal apparatus 1 may monitor one or multiple PDCCHs for search space sets corresponding to all group indexes as the default group index until at least DCI format 2_0 is detected.

In a case that the search space set switching is applied, the terminal apparatus 1 may monitor one or multiple PDCCHs for a search space set provided (configured) with no group index until at least DCI format 2_0 is detected.

In a case that the terminal apparatus 1 is provided with the timer value by searchSpaceSwitchingTimer-r16, the terminal apparatus 1 may monitor a PDCCH candidate for the search space set with group index 1. In a case that the timer expires, the terminal apparatus 1 may monitor one or multiple PDCCHs for the search space set with group index 0.

In a case that the terminal apparatus 1 is provided with the timer value by searchSpaceSwitchingTimer-r16 and configured with DCI format 2_0, the terminal apparatus 1 may monitor a PDCCH for the search space set with group index 1 until DCI format 2_0 is detected or until the timer expires. In a case that the timer expires, the terminal apparatus 1 may monitor one or multiple PDCCHs for the search space set with group index 0.

searchSpaceSwitchingTimer-r16 included in PDCCH-Config may be provided.

The timer value provided by searchSpaceSwitching-Timer-r16 may be decremented for each active DL BWP provided with the searchSpaceSwitchingTimer-r16.

The timer value provided by searchSpaceSwitching-Timer-r16 may be decremented for each serving cell of the active DL BWP provided with the searchSpaceSwitching-Timer-r16. In other words, the timer value may be decremented on the serving cell including the active DL BWP provided with the searchSpaceSwitchingTimer-r16.

The timer value provided by searchSpaceSwitching-Timer-r16 may be decremented for each cell group including the serving cell of the active DL BWP provided with the searchSpaceSwitchingTimer-r16. The cell group may be a set of one or multiple serving cells.

In a case that DCI format 1_1 includes a BWP indicator field and that based on the BWP indicatorfield, the active DL BWP is switched to another DL BWP, then the terminal apparatus 1 may set the timer value decremented to the value (initial value) provided by searchSpaceSwitchingTimer-r16.

In a case that BWP switching is performed on the active DL BWP, the terminal apparatus 1 may reset the timer value to the initial value.

In a case that searchSpaceSwitchingTimer-r16 is configured for each DL BWP and that BWP switching is performed on the active DL BWP, the terminal apparatus 1 may reset the timer value to the initial value. Alternatively, the terminal apparatus 1 may start the timer corresponding to the active DL BWP after BWP switching. At this time, the terminal apparatus 1 may stop the timer corresponding to the DL BWP before BWP switching, or may reset the timer value to the initial value.

In a case that one searchSpaceSwitchingTimer-r16 is configured for one or multiple DL BWPs in one serving cell and that BWP switching is performed on the active DL BWP, then the terminal apparatus 1 may decrement the timer value at the end of the DL slot.

In a case that DCI format 1_1 includes a Carrier indicator and that the carrier (serving cell) used for downlink transmission is changed based on the Carrier indicator, the terminal apparatus 1 may set the timer value decremented to the value provided by the searchSpaceSwitchingTimer-r16 of the changed serving cell.

Whether the timer value provided by searchSpaceSwitchingTimer-r16 is decremented at the end of a certain slot may be determined based on whether the DL BWP provided with searchSpaceSwitchingTimer-r16 is active. In a case that the DL BWP provided with searchSpaceSwitchingTimer-r16 is not active, the terminal apparatus 1 need not decrement the timer value at the end of the slot.

Whether the timer value provided by searchSpaceSwitchingTimer-r16 is decremented at the end of a certain slot may be determined based on whether the serving cell of the DL BWP provided with searchSpaceSwitchingTimer-r16 is activated. In a case that the serving cell of the DL BWP provided with searchSpaceSwitchingTimer-r16 is not activated, the terminal apparatus 1 need not decrement the timer value at the end of the slot.

Whether the timer value provided by searchSpaceSwitchingTimer-r16 is decremented at the end of a certain slot may be determined based on whether at least one serving cell belonging to the same cell group as that of the serving cell of the DL BWP provided with searchSpaceSwitchingTimer-r16 is activated. In a case that all of the serving cells belonging to the same cell group as that of the serving cell of the DL BWP provided with searchSpaceSwitchingTimer-r16 are not activated, the terminal apparatus 1 need not decrement the timer value at the end of the slot.

Whether the timer value provided by searchSpaceSwitchingTimer-r16 is decremented at the end of a certain slot may be determined based on whether the DL BWP provided with searchSpaceSwitchingTimer-r16 is active and whether at least one search space for detecting DCI format 2_0 is configured in the DL BWP.

Whether the timer value provided by searchSpaceSwitchingTimer-r16 is decremented at the end of a certain slot may be determined based on whether the serving cell of the DL BWP provided with searchSpaceSwitchingTimer-r16 is activated, and whether at least one search space for detecting DCI format 2_0 is configured in the DL BWP.

Whether the timer value provided by searchSpaceSwitchingTimer-r16 is decremented at the end of a certain slot may be determined based on whether at least one serving cell belonging to the same cell group as that of the serving cell of the DL BWP provided with searchSpaceSwitchingTimer-r16 is activated and whether at least one search space for detecting DCI format 2_0 is configured in the active DL BWP of the at least one serving cell of the serving cells.

In a case of being configured with no search space for detecting DCI format 2_0, the terminal apparatus 1 need not be expected to decrement the timer value.

In a case of being configured with no search space for detecting DCI format 2_0, the terminal apparatus 1 may be expected to decrement the timer value for the active DL BWP.

In a case of being configured with no search space for detecting DCI format 2_0, the terminal apparatus 1 may be expected to decrement the timer value for the serving cell including the active DL BWP.

In a case of being configured with no search space for detecting DCI format 2_0, the terminal apparatus 1 may be expected to decrement the timer value for the cell group including the serving cell including the active DL BWP.

In a case of being configured with no search space for detecting DCI format 2_0, the terminal apparatus 1 may be expected to decrement the timer value based on whether the value of searchSpaceGroupIdList-r16 has been changed.

In a case of being configured with no search space for detecting DCI format 2_0, the terminal apparatus 1 may reset the timer value to the initial value based on the fact that the active DL BWP is changed by the BWP indicator field.

In a case of being configured with no search space for detecting DCI format 2_0, the terminal apparatus 1 may monitor the PDCCH of the search space set with group index 1 based on the fact that the active DL BWP is changed by the BWP indicator field.

In a case that the terminal apparatus 1 is configured with no search space for detecting DCI format 2_0 and that the group index of the search space set corresponding to the DL BWP is changed based on the fact that the active DL BWP is changed by the BWP indicator field, then the terminal apparatus 1 may reset the timer value to the initial value.

In a case that the terminal apparatus 1 is provided with the timer value by searchSpaceSwitchingTimer-r16 but configured with no serving cell (or higher layer parameter PDCCH-Config) monitoring the PDCCH for detecting DCI format 2_0 or configured with no search space set (higher layer parameter SearchSpace) for detecting DCI format 2_0, then the terminal apparatus 1 may determine a group (group index) of search space sets for monitoring the PDCCH next based on which group index is included in the search space set of the detected DCI format.

In a case that the terminal apparatus 1 is provided with the timer value by searchSpaceSwitchingTimer-r16 but configured with no serving cell monitoring the PDCCH for detecting DCI format 2_0 or configured with no search space set for detecting DCI format 2_0, then the terminal apparatus 1 need not decrement the timer value.

In a case of being provided with the timer value by searchSpaceSwitchingTimer-r16, the terminal apparatus 1 may be expected to be configured with at least one serving cell monitoring the PDCCH for detecting DCI format 2_0 and/or configured with at least one search space set for detecting DCI format 2_0. In other words, in such a case, the terminal apparatus 1 may be expected to detect DCI format 2_0 in the active DL BWP of the at least one serving cell.

For the terminal apparatus 1, in a case that more than one serving cell of the DL BWP is provided with the timer value by searchSpaceSwitchingTimer-r16 and that the timer value is decremented in one serving cell, the serving cell may be determined based on some or all of the following A1 to A7:

A1) Whether the serving cell is a primary cell;

A2) Whether the serving cell has the largest or smallest index in the cell group;

A3) Number of search space sets of group 1 and/or group 2 provided to the serving cell;

A4) Periodicity of the search space set of group 1 and/or group 2 provided to the serving cell;

A5) Whether the serving cell has the largest or smallest numerology in the cell group;

A6) Whether the serving cell is indicated based on an RRC parameter (higher layer parameter);

A7) Whether monitoring of DCI format 2_0 is configured for the serving cell and/or for the PDCCH configuration of the serving cell.

For the terminal apparatus 1, in a case that more than one serving cell monitors the PDCCH for detecting DCI format 2_0 and that the timer value is decremented in one serving cell, the serving cell may be determined based on some or all of the following B1 to B7:

B1) Whether the serving cell is a primary cell;

B2) Whether the serving cell has the largest or smallest index in the cell group;

B3) Number of search space sets of group 1 and/or group 2 provided to the serving cell;

B4) Periodicity of the search space set of group 1 and/or group 2 provided to the serving cell;

B5) Whether the serving cell has the largest or smallest numerology in the cell group;

B6) Whether the serving cell is indicated based on the RRC parameter (higher layer parameter);

B7) Whether the serving cell has the largest or smallest reference numerology with respect to DCI format 2_0.

In another aspect, the terminal apparatus 1 can be provided with the timer value by searchSpaceSwitchingTimer-r16. The higher layer parameter searchSpaceSwitching-Timer-r16 may be configured for a certain DL BWP in a certain serving cell. Alternatively, the higher layer parameter searchSpaceSwitchingTimer-r16 may be configured for a certain serving cell. Alternatively, the higher layer parameter searchSpaceSwitchingTimer-r16 may be configured for a certain serving cell group. The terminal apparatus 1 may decrement the timer value by one after each slot in the active DL BWP in the serving cell (serving cell #2) in which the terminal apparatus 1 monitors the PDCCH for detecting the DCI format 2_0. Alternatively, the terminal apparatus 1 may decrement the timer value by one after each slot in the active DL BWP in the serving cell (serving cell #2) in which the terminal apparatus 1 monitors the PDCCH for detecting one of the DCI formats. Note that, the serving cell #1 and the serving cell #2 may be the same serving cell, or may be different serving cells. Alternatively, the terminal apparatus 1 may decrement the timer value by one after each slot. At this time, the slot referenced to decrement the timer may be determined based on some or all of the following C1 to C7:

C1) A slot (e.g., a slot in the prescribed BWP of the primary cell) based on numerology in a prescribed BWP (e.g., an initial DL BWP or active DL BWP) of a primary cell;

C2) A slot (e.g., a slot in the prescribed BWP of serving cell #3) based on numerology in a prescribed BWP of a serving cell (serving cell #3) having the largest or smallest index in a cell group including serving cell #1;

C3) A slot (e.g., a slot in the prescribed BWP of serving cell #3) based on numerology in a prescribed BWP of a serving cell (serving cell #3) having the largest or smallest numerology in a cell group including serving cell #1;

C4) A slot (e.g., a slot in the prescribed BWP of serving cell #3) based on numerology in a prescribed BWP of a serving cell (serving cell #3) indicated based on an RRC parameter (higher layer parameter);

C5) A slot (e.g., a slot in BWP #1) based on numerology in a BWP (BWP #1) indicated based on an RRC parameter (higher layer parameter);

C6) A slot based on numerology indicated based on an RRC parameter (higher layer parameter);

C7) A slot (e.g., a slot in the prescribed BWP of serving cell #3) based on numerology in a prescribed BWP of a serving cell (serving cell #3) that is included in a cell group including serving cell #1 and that is configured with monitoring of DCI format 2_0;

C8) A slot based on a reference numerology for DCI format 2_0 monitored for serving cell 1 (e.g., a slot in which DCI format 2_0 is a unit for indication of the slot format).

Note that, in the present embodiment, numerology may be defined as a slot length. The numerology may be a value used for SCS configuration.

In a case that a PDCCH configuration (higher layer parameter PDCCH-Config) is provided that includes a search space and/or a search space set (higher layer parameter SearchSpace) for detecting DCI format 2_0 and that the same PDCCH configuration includes searchSpaceSwitch-ingTimer-r16 and that the DL BWP associated with the PDCCH configuration is active, then the terminal apparatus 1 may decrement the timer value by one each time a slot in the DL BWP elapses. In a case that the DL BWP is deactivated (i.e., in a case that the DL BWP is not active), the terminal apparatus 1 need not decrement the timer value for the DL BWP. Note that, in a cell to which a frame structure type is applied in which DL transmission and UL transmission are separated from each other by the time domain as in Time Division Duplex (TDD), the terminal apparatus 1 need not decrement the timer value at the end of the slot used for the UL transmission (UL slot).

In a case that the terminal apparatus 1 is provided, by SearchSpaceSwitchTrigger-r16, with a location of a search space set switching field for a serving cell in DCI format 2_0, and detects DCI format 2_0 in a certain slot and that the terminal apparatus 1 is not monitoring the PDCCH corresponding to one or multiple search space sets with group index 0 and that the search space set switching field has a value of 0, then the terminal apparatus 1 starts monitoring the PDCCH corresponding to one or multiple search space sets with group index 0, and in the serving cell in the first slot at least P1 symbols after a slot in the active DL BWP of the serving cell, stops monitoring the PDCCH corresponding to one or multiple search space sets with group index 1.

In a case that the terminal apparatus 1 is provided, by SearchSpaceSwitchTrigger-r16, with the location of the search space set switching field for the serving cell in DCI format 2_0, and detects DCI format 2_0 in a certain slot and that the terminal apparatus 1 is not monitoring the PDCCH corresponding to one or multiple search space sets with group index 1 and that the search space set switching field has a value of 1, then the terminal apparatus 1 starts monitoring the PDCCH corresponding to one or multiple search space sets with group index 1, and in the serving cell in the first slot at least P1 symbols after a slot in the active DL BWP of the serving cell, stops monitoring the PDCCH corresponding to one or multiple search space sets with group index 0, and the terminal apparatus 1 may set the timer value to the value provided by searchSpaceSwitchingTimer-r16.

In a case that the terminal apparatus 1 is provided, by SearchSpaceSwitchTrigger-r16, with the location of the search space set switching field for the serving cell in DCI format 2_0, and detects DCI format 2_0 in a certain slot and that the terminal apparatus 1 is monitoring the PDCCH in the serving cell corresponding to one or multiple search space sets with group index 1, then in the serving cell at the beginning of the first slot at least P1 symbols after the slot in which the timer elapses or after the last slot during the remaining channel occupancy period for the serving cell indicated by DCI format 2_0, the terminal apparatus 1 starts monitoring the PDCCH corresponding to one or multiple search space sets with group index 0, and stops monitoring the PDCCH corresponding to one or multiple search space sets with group index 1.

In a case that the terminal apparatus 1 is provided with SearchSpaceSwitchTrigger-r16 in the higher layer parameter SlotFormatIndicator, the terminal apparatus 1 may be expected to be configured with at least one PDCCH configuration including a search space set for detecting DCI format 2_0. In other words, in such a case, the terminal apparatus 1 may be expected to detect DCI format 2_0 in the active DL BWP of the at least one serving cell.

In a case that the terminal apparatus 1 is not provided with SearchSpaceSwitchTrigger-r16 for a certain serving cell and that the terminal apparatus 1 detects the DCI format by monitoring the PDCCH corresponding to a search space set with group index 0 in a certain slot, then in the serving cell in the first slot at least P2 symbols after a certain slot in the active DL BWP of the serving cell, the terminal apparatus 1 starts monitoring the PDCCH corresponding to one or multiple search space sets with group index 1 and stops the monitoring. In a case that the terminal apparatus 1 detects a certain DCI format by monitoring the PDCCH in any of the search space sets, the terminal apparatus 1 may set the timer value to the value provided by searchSpaceSwitchingTimer-r16.

In a case that the terminal apparatus 1 is not provided with SearchSpaceSwitchTrigger-r16 for a certain serving cell and that the terminal apparatus 1 monitors the PDCCH in the serving cell corresponding to one or multiple search space sets with group index 1, then in the serving cell at the beginning of the first slot at least P2 symbols after the slot in which the timer expires or after the last slot during the remaining channel occupancy period for the serving cell indicated by DCI format 2_0 in a case that the terminal apparatus 1 is provided with a search space set for monitoring the PDCCH for detecting DCI format 2_0, the terminal apparatus 1 starts monitoring the PDCCH in the serving cell corresponding to one or multiple search space sets with group index 0, and stops monitoring the PDCCH corresponding to one or multiple search space sets with group index 1.

Various aspects of apparatuses according to an aspect of the present embodiment will be described below.

(1) In order to accomplish the object described above, an aspect of the present invention is contrived to provide the following means. In other words, a first aspect of the present embodiment of the present invention is a terminal apparatus including a higher layer configured to configure a configuration related to a search space set and a configuration related to a PDCCH, and a receiver configured to monitor the PDCCH based on the search space set, wherein in a case that one or multiple group indexes are allocated to the search space set, the receiver monitors the PDCCH in the search space set corresponding to the group index and sets a timer value based on configuration of searchSpaceSwitchingTimer-r16, and in a case that the PDCCH is not used to detect DCI format 2_0, the receiver decrements the timer value by one at an end of a slot in an active DL BWP for monitoring the PDCCH provided with the searchSpaceSwitchingTimer-r16.

(2) A second aspect of the present embodiment of the present invention is the terminal apparatus according to the first aspect, wherein, in a case that the PDCCH is used to detect DCI format 2_0, the timer value is decremented by one at the end of the slot in the active DL BWP of the serving cell for monitoring the PDCCH for detecting the DCI format 2_0.

(3) A third aspect of the present embodiment of the present invention is the terminal apparatus according to the first aspect, wherein, in a case that the PDCCH includes a BWP indicator field, the timer value is reset to an initial value based on a change in a value of the BWP indicator field.

(4) A fourth aspect of the present embodiment of the present invention is a method used in a terminal apparatus, the method including the steps of configuring a configuration related to a search space set and a configuration related to a PDCCH, monitoring the PDCCH based on the search space set, monitoring, in a case that one or multiple group indexes are allocated to the search space set, the PDCCH in the search space set corresponding to the group index, setting a timer value based on configuration of searchSpaceSwitchingTimer-r16, and in a case that the PDCCH is not used to detect DCI format 2_0, decrementing the timer value by one at an end of a slot in an active DL BWP for monitoring the PDCCH provided with the searchSpaceSwitchingTimer-r16.

(5) A fifth aspect of the present embodiment of the present invention is a terminal apparatus including a higher layer configured to configure a configuration related to a search space set and a configuration related to a PDCCH, and a receiver configured to monitor the PDCCH based on the search space set, wherein in a case that one or multiple group indexes are allocated to the search space set and that neither monitoring of the PDCCH corresponding to the search space set with a group index of 0 among the one or multiple group indexes nor monitoring of the PDCCH corresponding to the search space set with a group index of 1 among the one or multiple group indexes is performed, the receiver initiates monitoring of the PDCCH corresponding to the search space set with a group index 0 among the one or multiple group indexes.

(6) A sixth aspect of the present embodiment of the present invention is a terminal apparatus including a higher layer configured to configure a configuration related to a search space set and a configuration related to a PDCCH, and a receiver configured to monitor the PDCCH based on the search space set, wherein in a case that searchSpaceSwitchingTimer-r16 is provided and that a value provided by the searchSpaceSwitchingTimer-r16 is not set to a timer value, the receiver initiates monitoring of the PDCCH corresponding to the search space set with a group index 0.

(7) A seventh aspect of the present embodiment of the present invention is a base station apparatus for communicating with a terminal apparatus, the base station apparatus including a higher layer configured to notify a configuration related to a search space set and a configuration related to a PDCCH, and a transmitter configured to transmit the PDCCH based on the search space set, wherein in a case that one or multiple group indexes are allocated to the search space sets in the terminal apparatus and that the terminal apparatus is performing neither monitoring of the PDCCH corresponding to the search space set with a group index of 0 among the one or multiple group indexes nor monitoring of the PDCCH corresponding to the search space set with a group index of 1 among the one or multiple group indexes, the transmitter initiates transmission of the PDCCH corresponding to the search space set with a group index of 0 among the one or multiple group indexes.

(8) An eighth aspect of the present embodiment of the present invention is a base station apparatus for communicating with a terminal apparatus, the base station apparatus for communicating with a terminal apparatus, the base station apparatus including a higher layer configured to notify a configuration related to a search space set and a configuration related to a PDCCH, and a transmitter configured to monitor the PDCCH based on the search space set, wherein in a case that searchSpaceSwitchingTimer-r16 is provided to the terminal apparatus and that in the terminal apparatus, a value provided by the searchSpaceSwitchingTimer-r16 is not set to a timer value, the transmitter initiates transmission of the PDCCH corresponding to the search space set with a group index of 0.

(9) A ninth aspect of the present embodiment of the present invention is a communication method used in a terminal apparatus, the communication method including the steps of configuring a configuration related to a search space set and a configuration related to a PDCCH, and monitoring the PDCCH based on the search space set, wherein in the configuring, in a case that one or multiple group indexes are allocated to the search space set and that neither monitoring of the PDCCH corresponding to the search space set with a group index of 0 among the one or multiple group indexes nor monitoring of the PDCCH corresponding to the search space set with a group index of 1 among the one or multiple group indexes is performed, monitoring of the PDCCH corresponding to the search space set with a group index of 0 among the one or multiple group indexes is initiated.

(10) A tenth aspect of the present embodiment of the present invention is a communication method used in a terminal apparatus, the communication method including the steps of configuring a configuration related to a search space set and a configuration related to a PDCCH, and monitoring the PDCCH based on the search space set, wherein in the monitoring, in a case that searchSpaceSwitchingTimer-r16 is provided and that a value provided by the searchSpaceSwitchingTimer-r16 is not set to a timer value, monitoring of the PDCCH corresponding to the search space set with a group index of 0 is initiated.

(11) An eleventh aspect of the present embodiment of the present invention is a communication method used in a base station apparatus for communicating with a terminal apparatus, the communication method including the steps of notifying a configuration related to a search space set and a configuration related to a PDCCH, and transmitting the PDCCH based on the search space set, wherein in the transmitting, in a case that in the terminal apparatus, one or multiple group indexes are allocated to the search space set and that the terminal apparatus is performing neither monitoring of the PDCCH corresponding to the search space set with a group index of 0 among the one or multiple group indexes nor monitoring of the PDCCH corresponding to the search space set with a group index of 1 among the one or multiple group indexes, transmission of the PDCCH corresponding to the search space set with a group index of 0 among the one or multiple group indexes is initiated.

(12) A twelfth aspect of the present embodiment of the present invention is a communication method used in a base station apparatus for communicating with a terminal apparatus, the communication method including the steps of notifying a configuration related to a search space set and a configuration related to a PDCCH, and monitoring the PDCCH based on the search space set, wherein in the monitoring, in a case that searchSpaceSwitchingTimer-r16 is provided to the terminal apparatus and that in the terminal apparatus, a value provided by the searchSpaceSwitchingTimer-r16 is not set to a timer value, transmission of the PDCCH corresponding to the search space set with a group index of 0 is initiated.

A program running on the base station apparatus 3 and the terminal apparatus 1 according to an aspect of the present invention may be a program (program that causes a computer to function) that controls a Central Processing Unit (CPU) and the like, such that the program realizes the functions of the above-described embodiment according to an aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the aforementioned embodiment may be partially implemented by a computer. In such a case, a program for implementing such control functions may be recorded on a computer-readable recording medium to cause a computer system to read and execute the program recorded on this recording medium.

Note that it is assumed that the "computer system" mentioned here refers to a computer system built into the terminal apparatus 1 or the base station apparatus 3, and the computer system includes an OS and hardware components such as a peripheral device. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be realized with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, for an aspect of the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit

The invention claimed is:

1. A terminal apparatus comprising:
higher layer processing circuitry configured to be provided with a searchSpaceGroupIdList-r16 associated with a group index for each search space set per BandWidth Part (BWP); and
receiving circuitry configured to monitor a physical downlink control channel (PDCCH) based on each search space set, wherein
the searchSpaceGroupIdList-r16 comprises information for setting the group index for each search space set according to a value given by a searchSpaceSwitchingTimer-r16, and
the receiving circuitry monitors the PDCCH for a search space set per BWP corresponding to a group index 0 in a case that the searchSpaceGroupIdList-r16 is provided.

2. A base station apparatus for communicating with a terminal apparatus, the base station apparatus comprising:
higher layer processing circuitry configured to transmit a searchSpaceGroupIdList-r16 associated with a group index for each search space set per BandWidth Part (BWP); and
transmission circuitry configured to transmit a physical downlink control channel (PDCCH) based on each search space set, wherein
the searchSpaceGroupIdList-r16 comprises information for setting the group index for each search space set according to a value given by a searchSpaceSwitchingTimer-r16, and
the transmission circuitry transmits the PDCCH for a search space set per BWP corresponding to a group index 0 in a case that the searchSpaceGroupIdList-r16 is transmitted.

3. A communication method comprising:
being provided with a searchSpaceGroupIdList-r16 associated with a group index for each search space set per BandWidth Part (BWP); and
monitoring a physical downlink control channel (PDCCH) based on each search space set, wherein
the searchSpaceGroupIdList-r16 comprises information for setting the group index for each search space set according to a value given by a searchSpaceSwitchingTimer-r16, and
the monitoring of the PDCCH comprises:
monitoring the PDCCH for a search space set per BWP corresponding to a group index 0 in a case that the searchSpaceGroupIdList-r16 is provided.

* * * * *